US008379080B2

(12) United States Patent
Russell et al.

(10) Patent No.: US 8,379,080 B2
(45) Date of Patent: Feb. 19, 2013

(54) METHOD FOR REDUCING STEREOSCOPIC PHASE-LAG DISTORTION UNDER MOTION IN A 3-DIMENSIONAL VIDEO DISPLAY

(75) Inventors: Andrew Ian Russell, Plano, TX (US); Bradley William Walker, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1532 days.

(21) Appl. No.: 11/825,450

(22) Filed: Jul. 6, 2007

(65) Prior Publication Data

US 2009/0009590 A1 Jan. 8, 2009

(51) Int. Cl.
*H04N 13/00* (2006.01)

(52) U.S. Cl. ........................................................ 348/43

(58) Field of Classification Search .................... 348/43, 348/46, 51
See application file for complete search history.

(56) References Cited

U.S. PATENT DOCUMENTS

| | | | |
|---|---|---|---|
| 4,393,400 A | | 7/1983 | Ikushima et al. |
| 5,162,817 A * | | 11/1992 | Tajika et al. .................. 347/7 |
| 5,726,703 A * | | 3/1998 | Izawa et al. .................. 348/46 |
| 6,417,886 B1 * | | 7/2002 | Tariki ...................... 348/384.1 |
| 2001/0033327 A1 * | | 10/2001 | Uomori et al. ................ 348/47 |

OTHER PUBLICATIONS

Perry, David., Digital Light Processing—Magic with Mirrors, AVTech, www.hifinews.co.uk, May 2004, pp. 10-15.
Hutchison, David C., Introducing DLP(R) 3D TV, Texas Instruments Technical Report, Oct. 2007, pp. 1-5.

* cited by examiner

*Primary Examiner* — Robert B Harrell
(74) *Attorney, Agent, or Firm* — Warren L. Franz; Wade J. Brady, III; Frederick J. Telecky, Jr.

(57) ABSTRACT

According to various illustrative embodiments, a device, system, and method for reducing stereoscopic phase-lag distortion under motion in a 3-dimensional video display are described. In one aspect, a method comprises reducing a phase difference between a first image and a second image in a portion of a frame time of the 3-dimensional video display. The method also comprises redistributing respective bit sequences of at least portions of the first image and the second image by respective amounts arranged to effect the reduction of the phase difference between the first image and the second image. The method also comprises displaying the redistributed respective bit sequences of the portions of the first image and the second image during the frame time of the 3-dimensional video display.

22 Claims, 46 Drawing Sheets

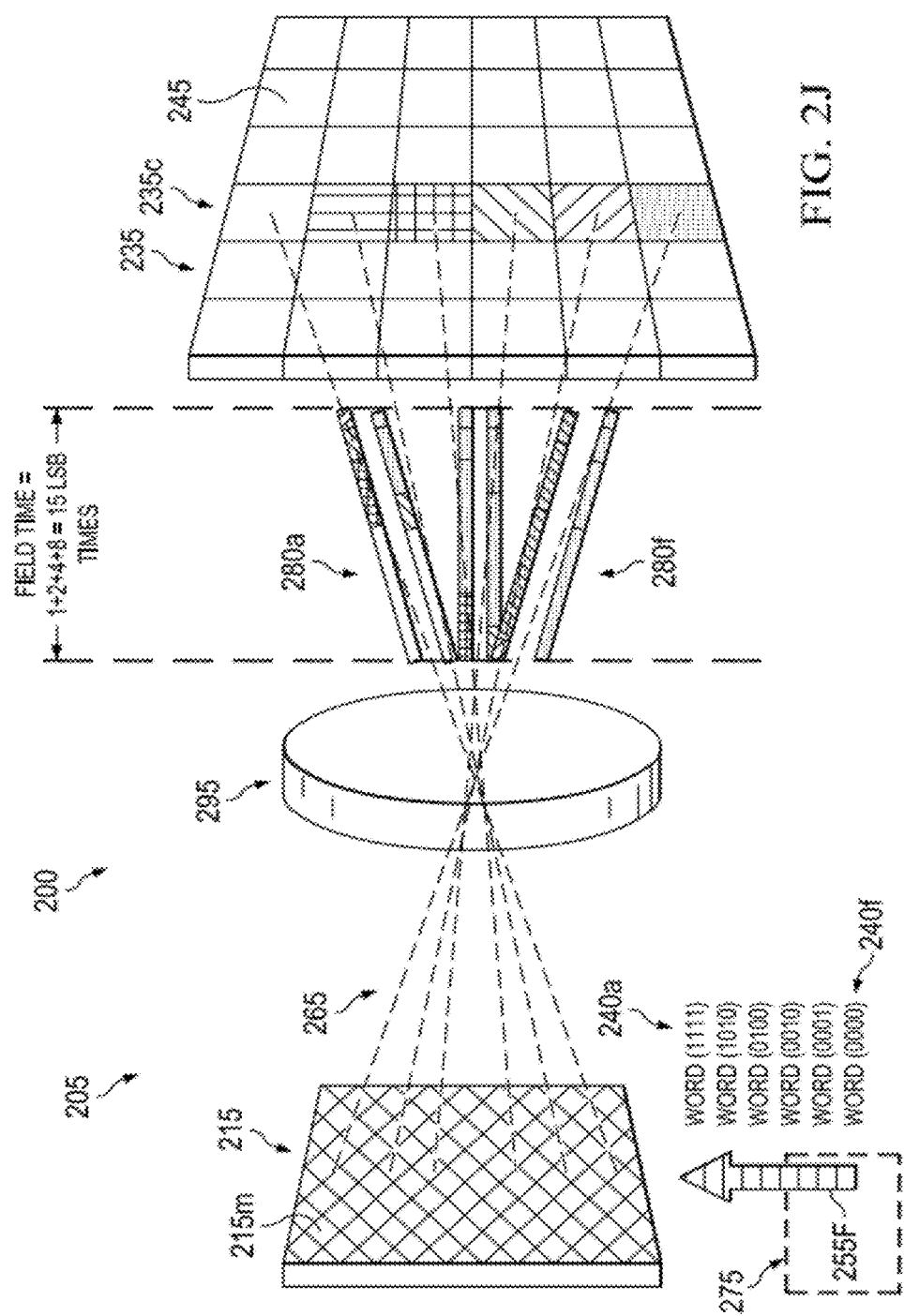

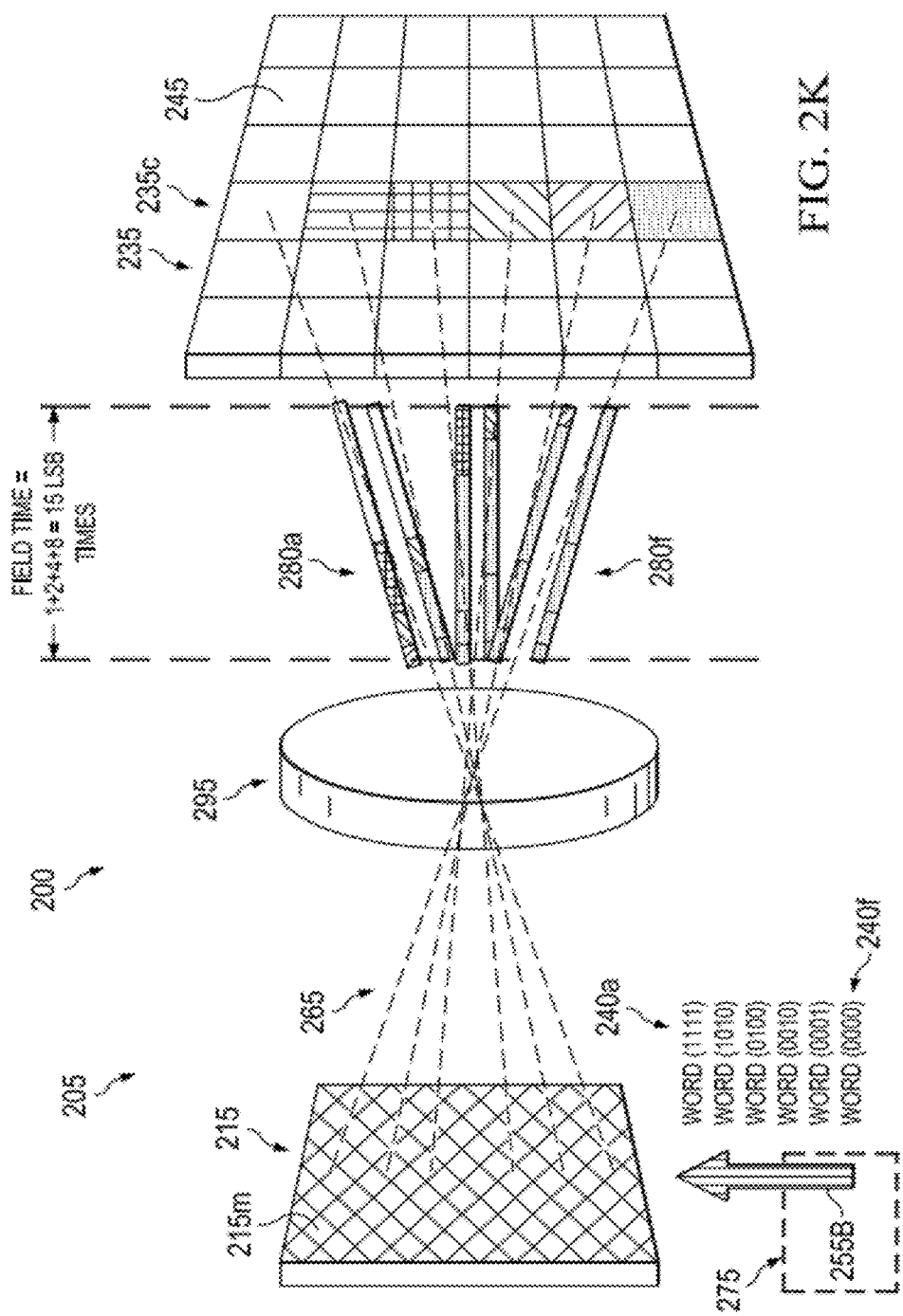

FIG. 6I

LEFT-11 (k=2)

FIG. 6J

LEFT-11 (k=3)

FIG. 6K

RIGHT-11 (k=2)

FIG. 6L

RIGHT-11 (k=3)

FIG. 6M

LEFT-11 (k=4)

FIG. 6N

LEFT-11 (k=5)

RIGHT-11 (k=4)

FIG. 6O

RIGHT-11 (k=5)

FIG. 6P

LEFT-11 (k=6)

FIG. 6Q

LEFT-11 (k=7)

RIGHT-11 (k=8)

FIG. 6X

RIGHT-11 (k=9)

RIGHT-11 (k=10)

FIG. 6BB

RIGHT-11 (k=11)

FIG. 6CC

LEFT-11 (k=12)

FIG. 6DD

LEFT-11 (k=13)

|   | 1 | 2 | 3 | 4 | 5 | 6 | 7 | 8 |
|---|---|---|---|---|---|---|---|---|
| 1 | 0 | 3 | 0 | 3 | 1 | 0 | 0 | 0 |
| 2 | 0 | 3 | 0 | 3 | 1 | 0 | 0 | 0 |
| 3 | 0 | 3 | 0 | 3 | 1 | 0 | 0 | 0 |
| 4 | 0 | 3 | 0 | 3 | 1 | 0 | 0 | 0 |
| 5 | 3 | 3 | 3 | 3 | 3 | 1 | 0 | 0 |
| 6 | 3 | 0 | 0 | 3 | 3 | 1 | 0 | 0 |
| 7 | 3 | 0 | 0 | 3 | 3 | 1 | 0 | 0 |
| 8 | 3 | 3 | 3 | 3 | 3 | 1 | 0 | 0 |

RIGHT-11 (k=12)

FIG. 6EE

|   | 1 | 2 | 3 | 4 | 5 | 6 | 7 | 8 |
|---|---|---|---|---|---|---|---|---|
| 1 | 0 | 2 | 0 | 2 | 0 | 0 | 0 | 0 |
| 2 | 0 | 2 | 0 | 2 | 1 | 0 | 0 | 0 |
| 3 | 0 | 2 | 0 | 2 | 1 | 0 | 0 | 0 |
| 4 | 0 | 2 | 0 | 2 | 1 | 0 | 0 | 0 |
| 5 | 2 | 2 | 2 | 2 | 2 | 0 | 0 | 0 |
| 6 | 2 | 0 | 0 | 2 | 2 | 1 | 0 | 0 |
| 7 | 2 | 0 | 0 | 2 | 2 | 1 | 0 | 0 |
| 8 | 2 | 2 | 2 | 2 | 2 | 0 | 0 | 0 |

RIGHT-11 (k=13)

FIG. 6FF

LEFT-11 (k=14)

FIG. 6GG

LEFT-11 (k=15)

FIG. 6HH

|   | 1 | 2 | 3 | 4 | 5 | 6 | 7 | 8 |
|---|---|---|---|---|---|---|---|---|
| 1 | 0 | 1 | 0 | 1 | 0 | 0 | 0 | 0 |
| 2 | 0 | 1 | 0 | 1 | 0 | 0 | 0 | 0 |
| 3 | 0 | 1 | 0 | 1 | 0 | 0 | 0 | 0 |
| 4 | 0 | 1 | 0 | 1 | 1 | 0 | 0 | 0 |
| 5 | 1 | 1 | 1 | 1 | 1 | 0 | 0 | 0 |
| 6 | 1 | 0 | 0 | 1 | 1 | 0 | 0 | 0 |
| 7 | 1 | 0 | 0 | 1 | 1 | 0 | 0 | 0 |
| 8 | 1 | 1 | 1 | 1 | 1 | 0 | 0 | 0 |

RIGHT-11 (k=14)

FIG. 6II

|   | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

RIGHT-11 (k=15)

FIG. 6JJ

METHOD FOR REDUCING STEREOSCOPIC PHASE-LAG DISTORTION UNDER MOTION IN A 3-DIMENSIONAL VIDEO DISPLAY

TECHNICAL FIELD OF THE PRESENT DISCLOSURE

The present disclosure relates generally to devices, systems, and methods for improving 3-dimensional video display applications. More particularly, the present disclosure describes a method and a system useful for reducing stereoscopic phase-lag distortion under motion in a 3-dimensional video display.

BACKGROUND OF THE PRESENT DISCLOSURE

There are very bad motion artifacts associated with current three-dimensional (3-D) projectors that are caused by a phase difference between the projected images presented to the left and right eyes, respectively. Moving objects may appear at the wrong depths, depending on the direction the respective moving objects are moving. Even worse, if the moving objects happen to be moving vertically, there may be a visually disconcerting "twisting" caused by the projected images presented to the left and right eyes, respectively. The left and right eyes may not even be able to converge on the respective vertically moving object. There may also be a z-direction pulsing introduced for 24 Hz source material because of the combined effect of the phase difference and the retrograde motion caused by showing each frame twice.

As shown, for example, in FIG. 1A, with two projectors, the left (L) and right (R) images for the left and right eyes, respectively, may be shown on the screen at the same time, as indicated at 110, so there is no relative delay, corresponding to a phase difference of 0 degrees (PD=0, as shown at 125). As shown, for example, in FIG. 1A, the field time is the same as the frame time. However, there is a significant additional cost associated with using an extra projector, as well as the added complexity of increased optical alignment, and the like.

As shown, for example, in FIG. 1B, with only one projector, the left (L) image 120 and right (R) image 130 may be shown on the screen sequentially. If one image, such as the left (L) image 120 (as shown in FIG. 1B), is shown on the screen first and then the other image, such as the right (R) image 130 (as shown in FIG. 1B), is shown on the screen second, there is a maximal relative delay, corresponding to a phase difference of 180 degrees (PD=180, as shown at 125). As shown, for example, in FIG. 1B, the field time is one half of the frame time.

As shown, for example, in FIG. 1C, for 24 Hz source material, each of the left (L) and right (R) images 120, 130 is shown twice, corresponding to a phase difference of 90 degrees (PD =90, as shown at 125). In this case, the field time is one quarter of the frame time.

As shown, for example, in FIG. 1D, with very fast polarized switching devices, each of the images 120, 130 could be shown three or more times (four times in FIG. 1D), corresponding to a phase difference of 60 degrees or less (45 degrees in FIG. 1D, PD =45, as shown at 125), depending on the number of times per frame each of the left (L) and right (R) images 120, 130 is shown. In these cases, the field times would be one sixth or less of the frame times. Generally, with sufficiently fast polarized switching devices, each of the left (L) and right (R) images 120, 130 could be shown n times, corresponding to a phase difference of 180/n degrees (PD = 180/n), where n is the number of times per frame each of the left (L) and right (R) images 120, 130 is shown. In this case, the field time would be (1/[2n])-th of the frame time. However, there is a significant extra cost associated with switching faster in terms of bandwidth, brightness, the higher cost of the faster switching device, and the like.

If an object is moving at a speed of K pixels per frame, this causes a relative shift of $(\Delta\phi/360°)\times K$ pixels in the direction of motion, where $\Delta\phi$ is the phase difference (PD) 125. In other words, one eye will see the object displaced by $(\Delta\phi/360°)\times K$ pixels in the direction of motion, relative to where that eye should see the object. For example, as shown in FIGS. 9A-9D, the object (a man looking through a camera on a tripod) shown therein is moving to the right at 12 pixels per frame. A phase difference $\Delta\phi=90°$ may cause a relative shift of about $(\Delta\phi/360°)\times K=(90°/360°)\times 12=3$, so that one eye will see the man looking through the camera on the tripod displaced by about 3 pixels in the direction of motion, relative to where that eye should see the man looking through the camera on the tripod.

Side-to-side motion of near-field objects may cause the near-field objects (such as things in the foreground) to appear closer or farther than the near-field objects should appear. This may not usually be a big problem. However, for a far-field object (such as the distant background as the camera pans across a scene), movement to one side may cause the far-field object to appear nearer, but movement in the opposite direction may cause the far-field object to appear "farther than infinity." In other words, the left and the right eyes may have to point away from each other, which is not normal and may be very disorienting or even painful for the viewer.

For any object moving up or down vertically (or, indeed, any direction other than perfectly horizontally), one eye must look at a point either higher or lower than the other eye. Again, this is not normal and may be disconcerting and very undesirable. The various types of stereoscopic phase-lag distortion under motion in a 3-dimensional video display described above may be proportional to the phase difference between the projected images presented to the left and right eyes, respectively.

SUMMARY OF THE PRESENT DISCLOSURE

In accordance with the present disclosure, a device, a system, and a method are disclosed that are useful for reducing stereoscopic phase-lag distortion under motion in a 3-dimensional video display. According to various illustrative embodiments, a device, system, and method for reducing stereoscopic phase-lag distortion under motion in a 3-dimensional video display are described. In one aspect, a method comprises reducing a phase difference between a first image and a second image in a portion of a frame time of the 3-dimensional video display. The method also comprises redistributing respective bit sequences of at least portions of the first image and the second image by respective amounts arranged to effect the reduction of the phase difference between the first image and the second image. The method also comprises displaying the redistributed respective bit sequences of the portions of the first image and the second image during the frame time of the 3-dimensional video display.

In another aspect, a method of reducing stereoscopic phase-lag distortion under motion in a 3-dimensional video display comprises reducing a plurality of phase differences between a plurality of first images and a corresponding plurality of second images in a plurality of portions of a plurality of frame times of the 3-dimensional video display. The method also comprises redistributing respective pluralities of bit sequences comprising bit planes of at least portions of the plurality of the first images and the corresponding plurality of the second images by respective amounts arranged to effect the reduction of the plurality of the phase differences between the plurality of the first images and the corresponding plurality of the second images. The method also comprises displaying the redistributed respective pluralities of the bit sequences comprising the bit planes of the portions of the plurality of the first images and the corresponding plurality of the second images during the plurality of the frame times of the 3-dimensional video display.

In yet another aspect, a 3-dimensional video display system for reducing stereoscopic phase-lag distortion under motion is provided, the 3-dimensional video display system comprising a device arranged to reduce a phase difference between a first image and a second image in a portion of a frame time of the 3-dimensional video display, the device comprising a bit sequence redistributor arranged to redistribute respective bit sequences of at least portions of the first image and the second image by respective amounts arranged to effect the reduction of the phase difference between the first image and the second image and a spatial light modulator arranged to spatially modulate the redistributed respective bit sequences. The 3-dimensional video display system also comprises a display device arranged to display the spatially modulated redistributed respective bit sequences of the portions of the first image and the second image during the frame time of the 3-dimensional video display.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein:

FIGS. 1E-1L schematically illustrate particular examples of bit sequences associated with various left and right images in one or more portions of the frame time of the 3-dimensional video display with a phase difference as shown in FIG. 1C;

FIGS. 2I-2K schematically illustrate particular examples of a system useful for reducing stereoscopic phase-lag distortion under motion in a 3-dimensional video display, according to the present disclosure, the system arranged to display the redistributed bit sequences associated with various left and right images in one or more portions of the frame time of the 3-dimensional video display, as shown in FIGS. 2A-2H;

FIGS. 6A-6LL schematically illustrate yet another particular example representative of various illustrative embodiments of a method and system useful for reducing stereoscopic phase-lag distortion under motion in a 3-dimensional video display, according to the present disclosure;

It is to be noted, however, that the appended drawings illustrate only typical embodiments of the present claimed subject matter and are, therefore, not to be considered limiting of the scope of the present claimed subject matter, as the present claimed subject matter may admit to other equally effective embodiments.

DETAILED DESCRIPTION OF ILLUSTRATIVE EMBODIMENTS

Illustrative embodiments of the present claimed subject matter are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

In various illustrative embodiments, a thermometer scale may be used to reduce the phase difference 125. For example, as shown in FIGS. 2A-2H, 2J-2K, and FIG. 7A, and as described in more detail below, a front-weighted thermometer scale may be used for the for the right (R) image 230, 730 and a back-weighted thermometer scale may be used for the left (L) image 220, 720. The front-weighted thermometer scale may turn on at a fixed time and turn off at a variable time. The back-weighted thermometer scale may turn on at a variable time and turn off at a fixed time. The phase difference 225 may depend on the gray scale value being displayed, but the phase difference 225 will never be greater than 90 degrees. Most image data in a movie, including a 3-D movie, appear at very low gray scale values, so the average phase difference 225, 825 will be much less than 90 degrees.

Figure 1A:
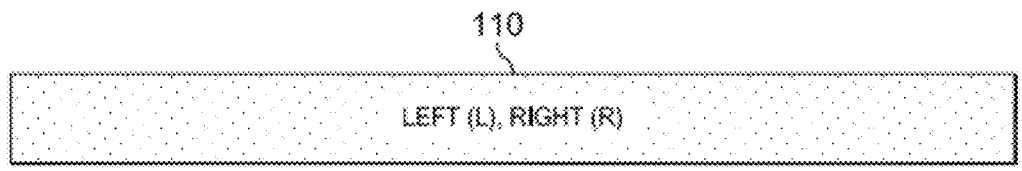
FIGS. 1A-1D schematically illustrate particular examples of phase differences associated with various left and right images in one or more portions of a frame time of a 3-dimensional video display.
Figure 1B:
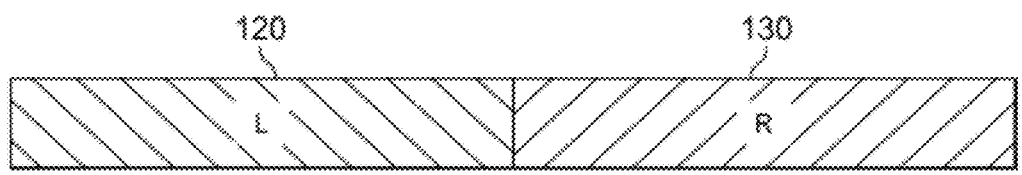
Figure 1C:
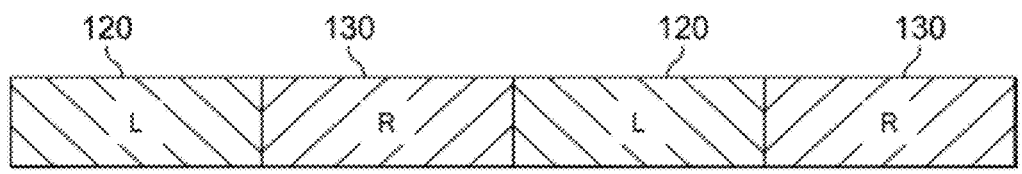
Figure 1D:
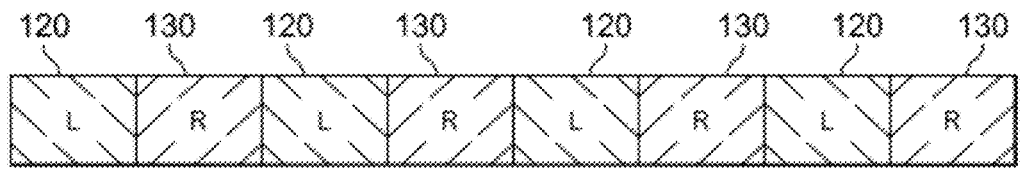

In various illustrative embodiments using a thermometer scale, the switching device, such as a polarized switching device, does not have to switch any faster than before, quite unlike the cases illustrated schematically in FIG. 1D, as described above Moreover, various illustrative embodiments using a thermometer scale may be very cheap to implement, since very little or substantially no processing of the images may be required, and only an architectural change to do the thermometer scales may be required. Some distortion may be introduced because the phase difference (phase shift) 225 may depend on the gray level, perhaps not just eye-to-eye, but also pixel-to-pixel for one eye.

Because these shifts are proportional to the phase difference, we reduce or eliminate these problems by reducing or eliminating the phase difference.

In various illustrative embodiments, a more advanced algorithm may be used to reduce the phase difference 125. For example, as shown in FIGS. 2A-2H, 2J-2K, and FIG. 8, and as described in more detail below, the higher-frequency (higher sub-band, more detailed, less blurry) spatial components of the image may be treated differently than the lower-frequency (lower sub-band, less detailed, more blurry) spatial components of the image. The higher-frequency (higher sub-band, more detailed, less blurry) spatial components of the right (R) image 230, 830 may be placed as close together as possible with the higher-frequency (higher sub-band, more detailed, less blurry) spatial components of the left (L) image 220, 820, as indicated by the arrows at 840, to reduce the phase difference 825 as much as possible for those higher-frequency (higher sub-band, more detailed, less blurry) spatial components. The phase difference 225 of the lower-frequency (lower sub-band, less detailed, more blurry) spatial components of the right (R) image 230, 830 from the lower-frequency (lower sub-band, less detailed, more blurry) spatial components of the left (L) image 220, 820 may be allowed to be larger than the phase difference 825, as indicated (in phantom) by the arrows at 850, but this may not matter much since the shifting of something blurry is not as noticeable as the shifting of something detailed.

The phase difference 825 may be almost zero for the highest-frequency (highest sub-band, most detailed, least blurry) spatial components and may increase as the frequency of the spatial components decreases. However, since the shifting of a blurry sub-image is not as noticeable as the shifting of a detailed sub-image, the overall effect is an apparent phase difference 825 of something very close to zero and/or substantially zero for the entire image 820, 830.

There may be more expenses involved in the implementation of various illustrative embodiments using more advanced algorithms than various illustrative embodiments using only the thermometer scale, because of the filtering involved in decomposing the images 820, 830 into the higher-frequency (higher sub-band, more detailed, less blurry) spatial components and the lower-frequency (lower sub-band, less detailed, more blurry) spatial components. However, less distortion may be introduced in various illustrative embodiments using more advanced algorithms than in various illustrative embodiments using only the thermometer scale, because various illustrative embodiments using more advanced algorithms may not introduce distortion caused by the phase difference (phase shift) 225 depending on the gray level, perhaps not just eye-to-eye, but also pixel-to-pixel for one eye, in various illustrative embodiments using only the thermometer scale, as described above. There are many ways to accomplish this decomposition of the images 820, 830 into the higher-frequency (higher sub-band, more detailed, less blurry) spatial components and the lower-frequency (lower sub-band, less detailed, more blurry) spatial components, as described in more detail below.

FIGS. 1E-1L schematically illustrate particular examples of bit sequences 180 associated with various left and right images 120, 130 in one or more portions of the frame time of the 3-dimensional video display with a phase difference 125 of 90 degrees, as shown in FIG. 1C, for example. Note that the left and right images in one or more portions of the frame time of the 3-dimensional video display may represent particular examples in various illustrative embodiments of first and second images, respectively, that have a phase difference. In various alternative illustrative embodiments, the right and left images in one or more portions of the frame time of the 3-dimensional video display may represent particular examples of first and second images, respectively, that have a phase difference. For the sake of convenience, most of the drawings herein show the left images coming before the right images in time, but one of ordinary skill in the respective art, having the benefit of the present disclosure, would recognize that the right images could just as well come before the left images in time, as shown, for example, in FIGS. 7C, 7D, and 8B, which are substantially identical, except for switching the order of displaying the right and left images, to FIGS. 7A, 7B, and 8A, respectively, which are described in more detail below.

Figure 1E:
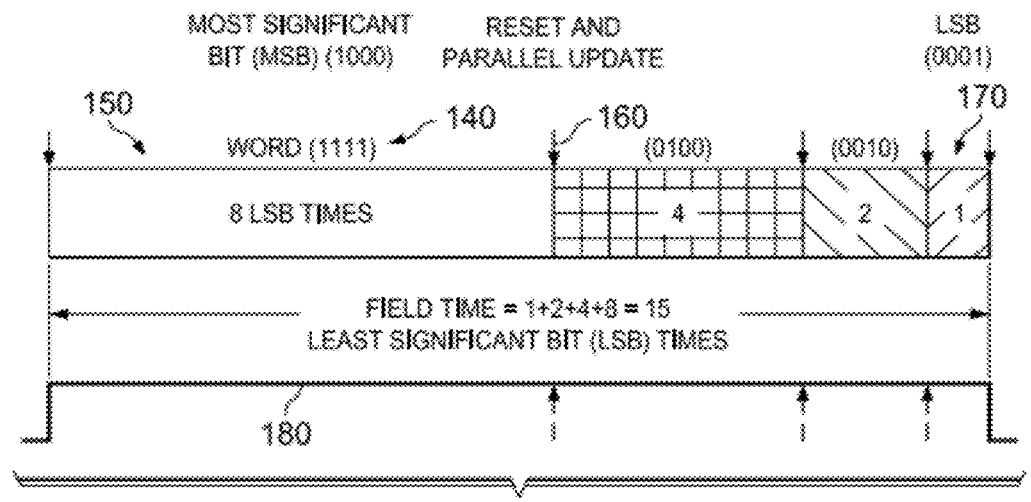

FIG. 1E shows the pulse width modulation (PWM) for the 4-bit binary word 140 (1111), with the corresponding bit sequence 180 (1111). Using 4 bits, $2^4=16$ different words may be encoded: 0=(0000),1=(0001),2=(0010), 3=(0011), 4=(0100), 5=(0101), 6=(0110), 7=(0111), 8=(1000), 9=(1001), 10=(1010), 11=(1011), 12=(1100), 13=(1101), 14=(1110), and 15=(1111). The frame time may be divided into one or more field times, with each of the field times divided into $2^4-1=15=1+2+4+8$ least significant bit (LSB) times, as shown in FIG. 1E, for example. The 4-bit binary word 140 (1111) has a most significant bit 150 (1000) and a least significant bit 170 (0001).

There may be a myriad of ways of representing a gray scale value encoded by the 4-bit binary word 140 (1111), and the corresponding bit sequence 180 (1111), using a spatial light modulator (SLM) 215 (as shown, for example, in FIGS. 2I, 3, and 4) and wholly distributed bit sequences, such as the bit sequences 180, and/or bit sequences 280 (as shown, for example, in FIGS. 2A-2H). For example, to indicate the bit-value (1), the spatial light modulator (SLM) 215 may reflect light from a source, as indicated by the arrow at 255, from each respective micro-mirror 215m onto the corresponding pixel 245, for an appropriate period of time, such as some number of LSB times. Similarly, to indicate the bit-value (0), the spatial light modulator 215 may not reflect light from the source 255, from each respective micro-mirror 215m onto the corresponding pixel 245, for an appropriate period of time, such as a certain number of LSB times.

The longer the amount of time that light from the source 255 is reflected onto the pixel 245, the brighter the pixel 245 will be. Likewise, the shorter the amount of time that light from the source 255 is reflected onto the pixel 245, the darker the pixel 245 will be. For example, reading the bits in order from left to right, the most significant bit 150 (1000) may correspond to reflecting light from the source 255 onto the pixel 245 for 8 LSB times, (0100) may correspond to reflecting light from the source 255 onto the pixel 245 for 4 LSB times, (0010) may correspond to reflecting light from the source 255 onto the pixel 245 for 2 LSB times, and the least significant bit 170 (0001) may correspond to reflecting light from the source 255 onto the pixel 245 for 1 LSB time, as shown in FIG. 1E. The 4-bit binary word 140 (1111), and the corresponding bit sequence 180 (1111), may represent an intensity of 15/15=100% on a 4-bit gray scale, for example.

As shown by the arrows 160 in FIG. 1E, after 8 LSB times, each mirror 215m of the spatial light modulator 215 may be reset and updated in parallel with the next less significant bit in the corresponding bit sequence 180 for the respective word 140. Similarly, after 4 LSB times, each mirror 215m of the spatial light modulator 215 may again be reset and updated in parallel with the next less significant bit in the corresponding bit sequence 180 for the respective word 140. Likewise, after 2 LSB times, each mirror 215m of the spatial light modulator 215 may again be reset and updated in parallel with the least significant bit 170 in the corresponding bit sequence 180 for the respective word 140. Finally, after 1 LSB time, each mirror 215m of the spatial light modulator 215 may again be reset and updated in parallel with the most significant bit 150 in the next corresponding bit sequence 180 for the next respective word 140.

Figure 1F:
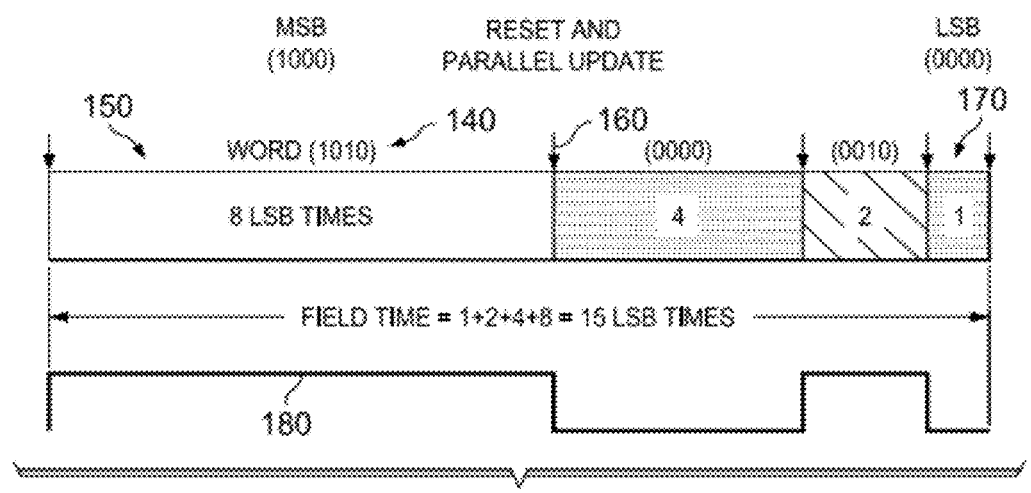

FIG. 1F shows the pulse width modulation (PWM) for the 4-bit binary word 140 (1010), with a corresponding bit sequence 180 (1010). The field time may again be divided into $2^4-1=15=1+2+4+8$ least significant bit (LSB) times, as shown in FIG. 1F, for example. The 4-bit binary word 140 (1010) has a most significant bit 150 (1000) and a least significant bit 170 (0000). Reading the bits in order from left to right, the most significant bit 150 (1000) may correspond to reflecting light from the source 255 onto the pixel 245 for 8 LSB times, (0000) may correspond to not reflecting light from the source 255 onto the pixel 245 for 4 LSB times, (0010) may correspond to reflecting light from the source 255 onto the pixel 245 for 2 LSB times, and the least significant bit 170 (0000) may correspond to not reflecting light from the source 255 onto the pixel 245 for 1 LSB time, as shown in FIG. 1F. The 4-bit binary word 140 (1010), and the corresponding bit sequence 180 (1010), may represent an intensity of 10/15=67% on this 4-bit gray scale, for example.

Figure 1G:
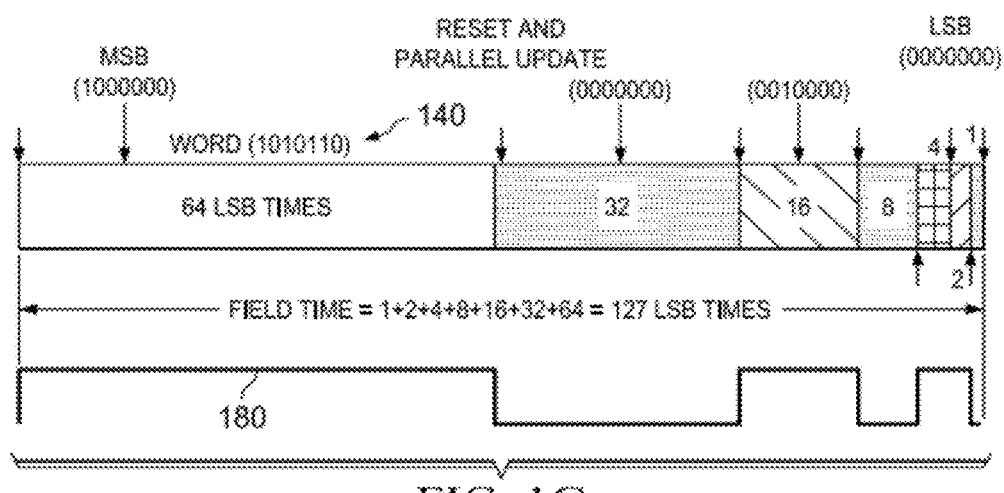

FIG. 1G shows the pulse width modulation (PWM) for the 7-bit binary word 140 (101010110), with a corresponding bit sequence 180 (1010110). Using 7 bits, $2^7=128$ different words may be encoded: 0=(0000000), 1=(0000001), 2=(0000010), 3=(0000011), 4=(0000100), . . . , 125=(1111101), 126=(1111110), and 127=(1111111). The frame time may be divided into one or more field times, with each of the field times divided into $2^7-127=1+2+4+8+16+32+64$ least significant bit (LSB) times, as shown in FIG. 1G, for example. The 7-bit binary word 140 (101010110) has a most significant bit 150 (1000000) and a least significant bit 170 (0000000).

Reading the bits in order from left to right, the most significant bit 150 (1000000) may correspond to reflecting light from the source 255 onto the pixel 245 for 64 LSB times, (0000000) may correspond to not reflecting light from the source 255 onto the pixel 245 for 32 LSB times, (0010000) may correspond to reflecting light from the source 255 onto the pixel 245 for 16 LSB times, (0000000) may correspond to not reflecting light from the source 255 onto the pixel 245 for 8 LSB times, (0000100) may correspond to reflecting light from the source 255 onto the pixel 245 for 4 LSB times, (0000010) may correspond to reflecting light from the source 255 onto the pixel 245 for 2 LSB times, and the least significant bit 170 (0000000) may correspond to not reflecting light from the source 255 onto the pixel 245 for 1 LSB time, as shown in FIG. 1G. The 7-bit binary word 140 (1010110), and the corresponding bit sequence 180 (1010110), may represent an intensity of 86/127=68% on a 7-bit gray scale, for example.

Figure 1H:
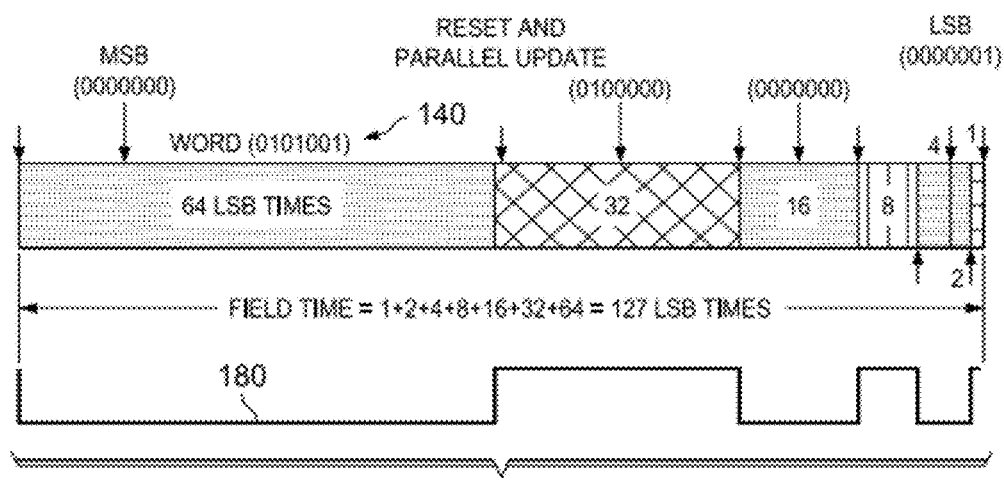
Figure 11:
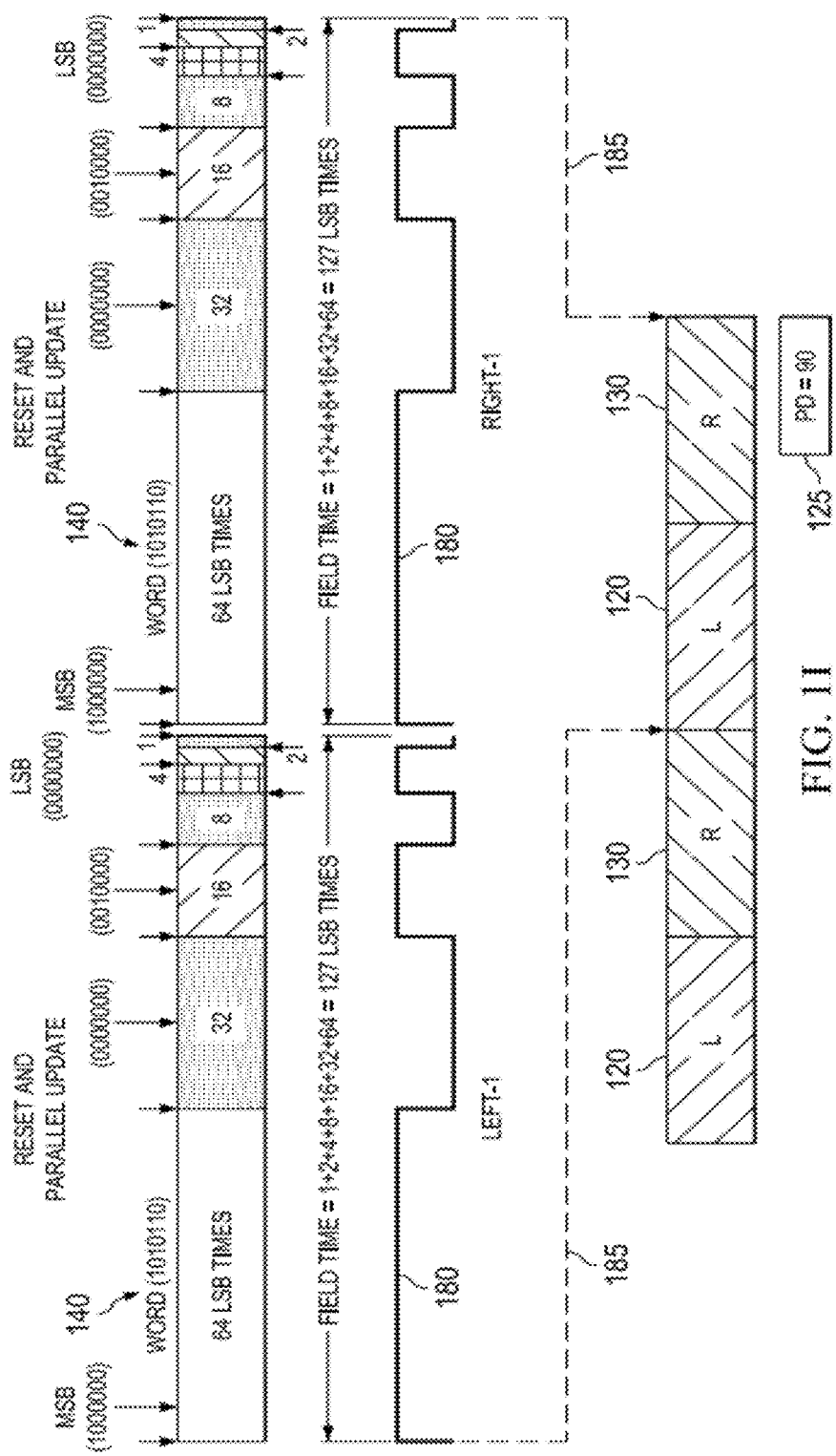

FIG. 1H shows the pulse width modulation (PWM) for the 7-bit binary word 140 (0101001), the complement of the 7-bit binary word 140 (1010110) shown in FIG. 1G. The 7-bit binary word 140 (0101001) has a corresponding bit sequence 180 (0101001). Reading the bits in order from left to right, the most significant bit 150 (0000000) may correspond to not reflecting light from the source 255 onto the pixel 245 for 64 LSB times, (0100000) may correspond to reflecting light from the source 255 onto the pixel 245 for 32 LSB times, (0000000) may correspond to not reflecting light from the source 255 onto the pixel 245 for 16 LSB times, (0001000) may correspond to reflecting light from the source 255 onto the pixel 245 for 8 LSB times, (0000000) may correspond to not reflecting light from the source 255 onto the pixel 245 for 4 LSB times, (0000000) may correspond to not reflecting light from the source 255 onto the pixel 245 for 2 LSB times, and the least significant bit 170 (0000001) may correspond to not reflecting light from the source 255 onto the pixel 245 for 1 LSB time, as shown in FIG. 1H. The 7-bit binary word 140 (0101001), and the corresponding bit sequence 180 (0101001), may represent an intensity of 41/127=32% on a 7-bit gray scale, for example.

More generally, the pulse width modulation (PWM) for an N-bit binary word 140 ($b_N, b_{N-1}, b_{N-2}, \ldots, b_3, b_2, b_1$), using N-bits, may involve encoding $2^N$ different words: $0=(b_N=0, b_{N-1}=0, \ldots, b_2=0, b_1=0), b_k=0 \forall k=1, \ldots, N$; $1=(b_N=0, b_{N-1}=0, \ldots, b_2=0, b_1=1), b_1=1, b_k=0 \forall k=2, \ldots, N$; $2=(b_N=0, b_{N-1}=0, \ldots, b_2=1, b_1=0), b_1=0, b_2=1, b_k=0 \forall k=3, \ldots, N$; $3=(b_N=0, b_{N-1}=0, \ldots, b_2=1, b_1=1), b_1=1, b_2=1, b_k=0 \forall k=3, \ldots, N$; $4=(b_N=0, b_{N-1}=0, \ldots, b_3=1, b_2=0, b_1=0), b_1=0, b_2=0, b_3=1, b_k=0 \forall k=4, \ldots, N$; $\ldots$; $2^N-3=(b_N=1, b_{N-1}=1, \ldots, b_3=1, b_2=0, b_1=0), b_1=0, b_2=0, b_k=1 \forall k=3, \ldots, N$; $2^N-2=(b_N=1, b_{N-1}=1, \ldots, b_3=1, b_2=0, b_1=1), b_1=1, b_2=0, b_k=1 \forall k=3, \ldots, N$; and $2^N-1=(b_N=1, b_{N-1}=1, \ldots, b_3=1, b_2=1, b_1=1), b_k=1 \forall k=1, \ldots, N$. The frame time may be divided into one or more field times, with each of the field times divided into $$2^N - 1 = 1 + 2 + 4 + 8 + \ldots + 2^{N-1} = \sum_{k=0}^{k=N-1} 2^k = \frac{1-2^N}{1-2}$$

least significant bit (LSB) times, as shown in FIG. 1G, for example, when N=7. The N-bit binary word 140 ($b_N, b_{N-1}$, $b_{N-2}, \ldots, b_3, b_2, b_1$) has a most significant bit 150 ($b_N, b_{N-1}=0, \ldots, b_2=0, b_1=0$), $b_k=0 \forall k=1, \ldots, N-1$ and a least significant bit 170 ($b_N=0, b_{N-1}=0, \ldots, b_2=0, b_1$), $b_k=0 \forall k=2, \ldots, N$.

Reading the bits in order from left to right, the most significant bit 150 ($b_N, b_{N-1}=0, \ldots, b_2=0, b_1=0$), where $b_k=0 \forall k=1, \ldots, N-1$, may correspond to reflecting (not reflecting) light from the source 255 onto the pixel 245 for $2^{N-1}$ LSB times, depending on whether $b_N=1(b_N=0), \ldots$, the k-th bit ($b_N=0, b_{N-1}=0, \ldots, b_{k+1}=0, b_k, b_{k-1}=0, \ldots, b_2=0, b_1=0$), where $b_m=0 \forall m \neq k$, may correspond to reflecting (not reflecting) light from the source 255 onto the pixel 245 for $2^{k-1}$ LSB times, if $b_k=1(b_k=0), \ldots$, and the least significant bit 170 ($b_N=0, b_{N-1}=0, \ldots, b_2=0, b_1$), where $b_k=0 \forall k=2, \ldots, N$, may correspond to reflecting (not reflecting) light from the source 255 onto the pixel 245 for $2^0=1$ LSB time, if $b_1=1$ ($b_1=0$). The N-bit binary word 140 ($b_N, b_{N-1}, b_{N-2}, \ldots, b_3, b_2, b_1$) may represent an intensity of $(b_N 2^{N-1} + b_{N-1} 2^{N-2} + \ldots + b_3 2^2 + b_2 2^1 + b_1 2^0)/(2^N-1)$, which is given more succinctly as $$\left( \sum_{k=0}^{k=N-1} b_{k+1} 2^k \right) / (2^N - 1),$$

on an N-bit gray scale, for example.

Figure 1J:
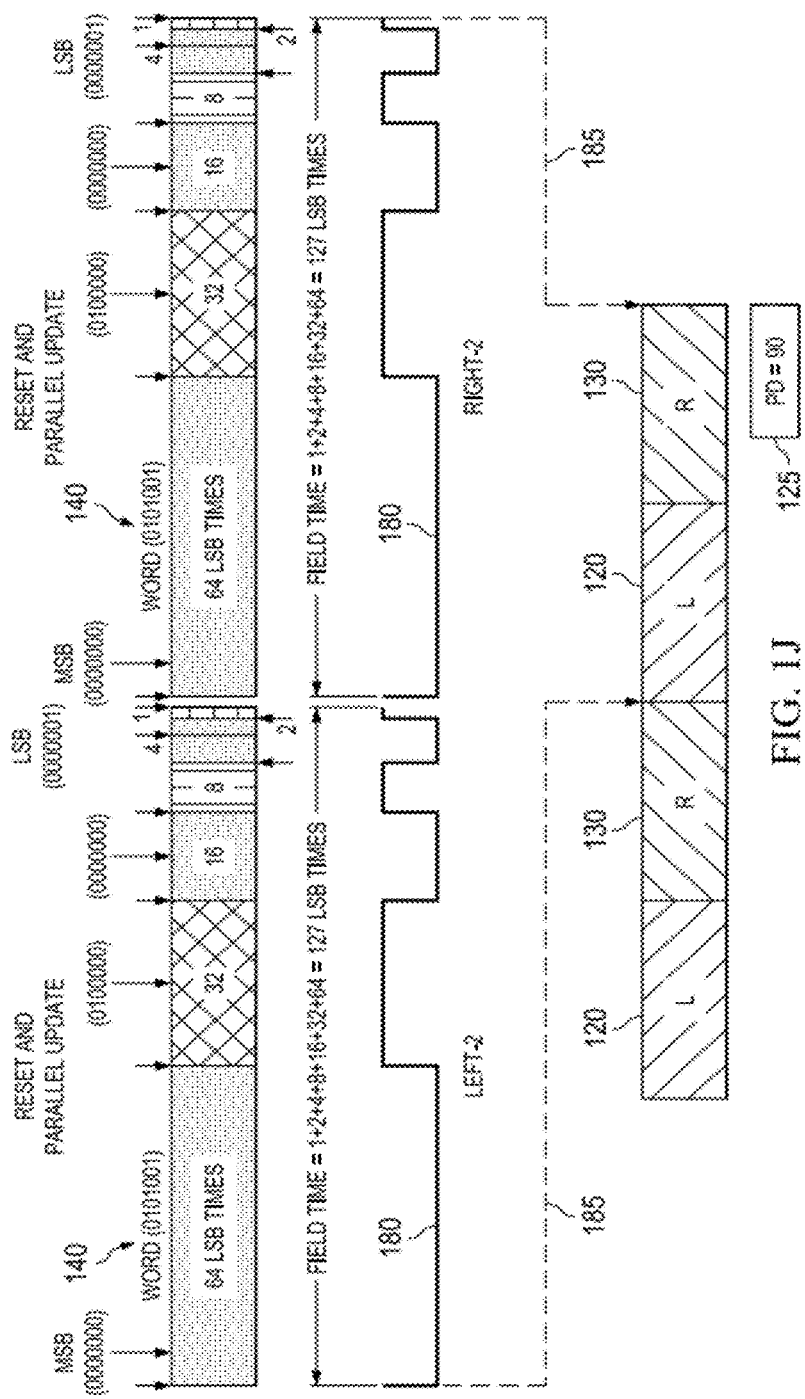

FIGS. 1I-1L schematically illustrate particular examples of bit sequences 180 associated with various left and right images 120, 130 in one or more portions of the frame time of the 3-dimensional video display with a phase difference 125 of 90 degrees, as shown in FIG. 1C, for example. FIG. 1I shows the bit sequence 180 (101010110) for the word 140 (1010110), as shown in FIG. 1G, for example, displayed as the left and right images 120, 130, Left-1 and Right-1, respectively, as indicated (in phantom) by the arrows 185, in two field portions of the four field portions of the frame time of the 3-dimensional video display with the phase difference (PD) 125 of 90 degrees. FIG. 1J shows the bit sequence 180 (0101001) for the word 140 (0101001), as shown in FIG. 1H, for example, displayed as the left and right images 120, 130, Left-2 and Right-2, respectively, as indicated (in phantom) by the arrows 185, in two field portions of the four field portions of the frame time of the 3-dimensional video display with the phase difference (PD) 125 of 90 degrees.

Figure 1K:
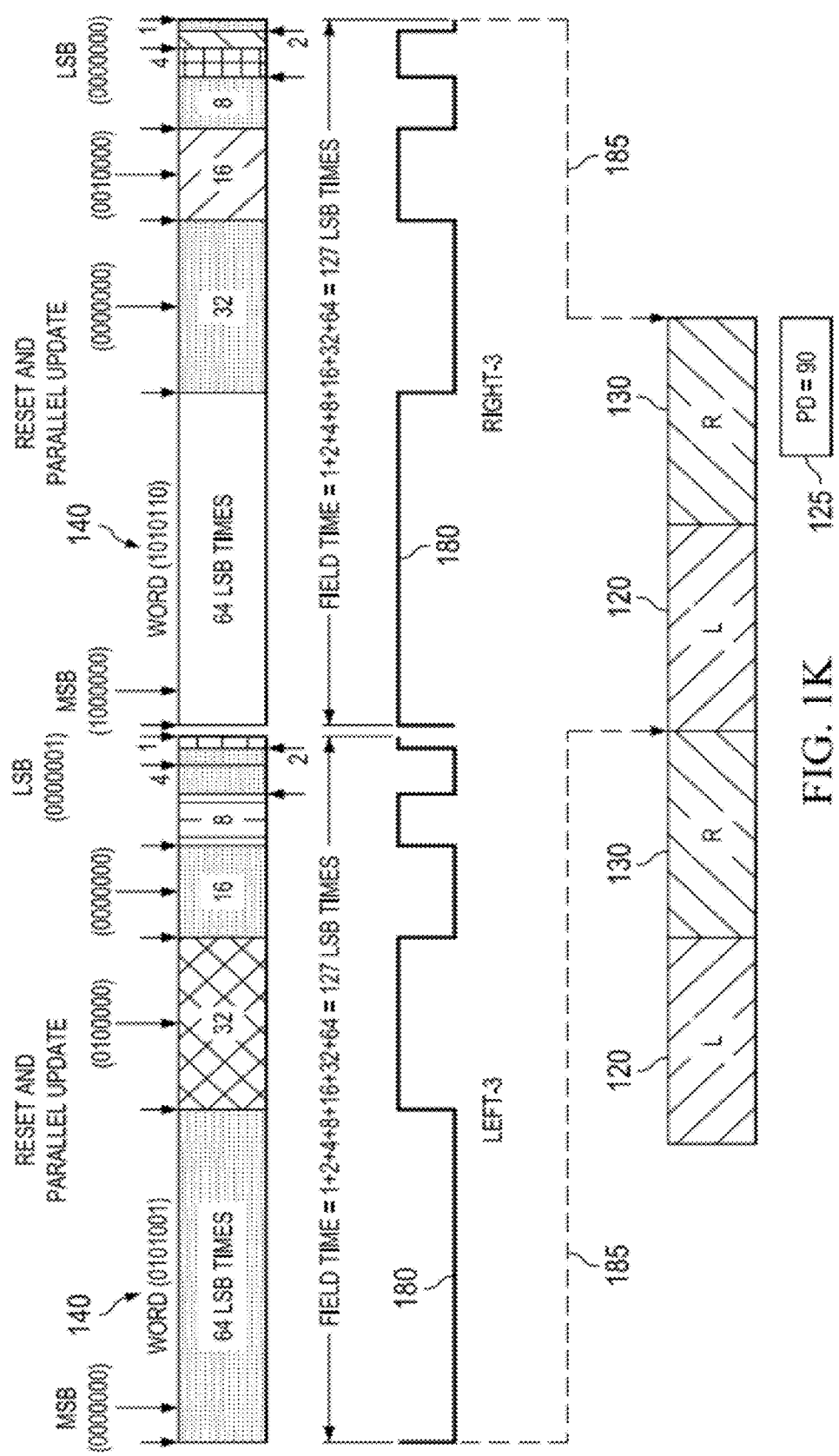
Figure 1L:
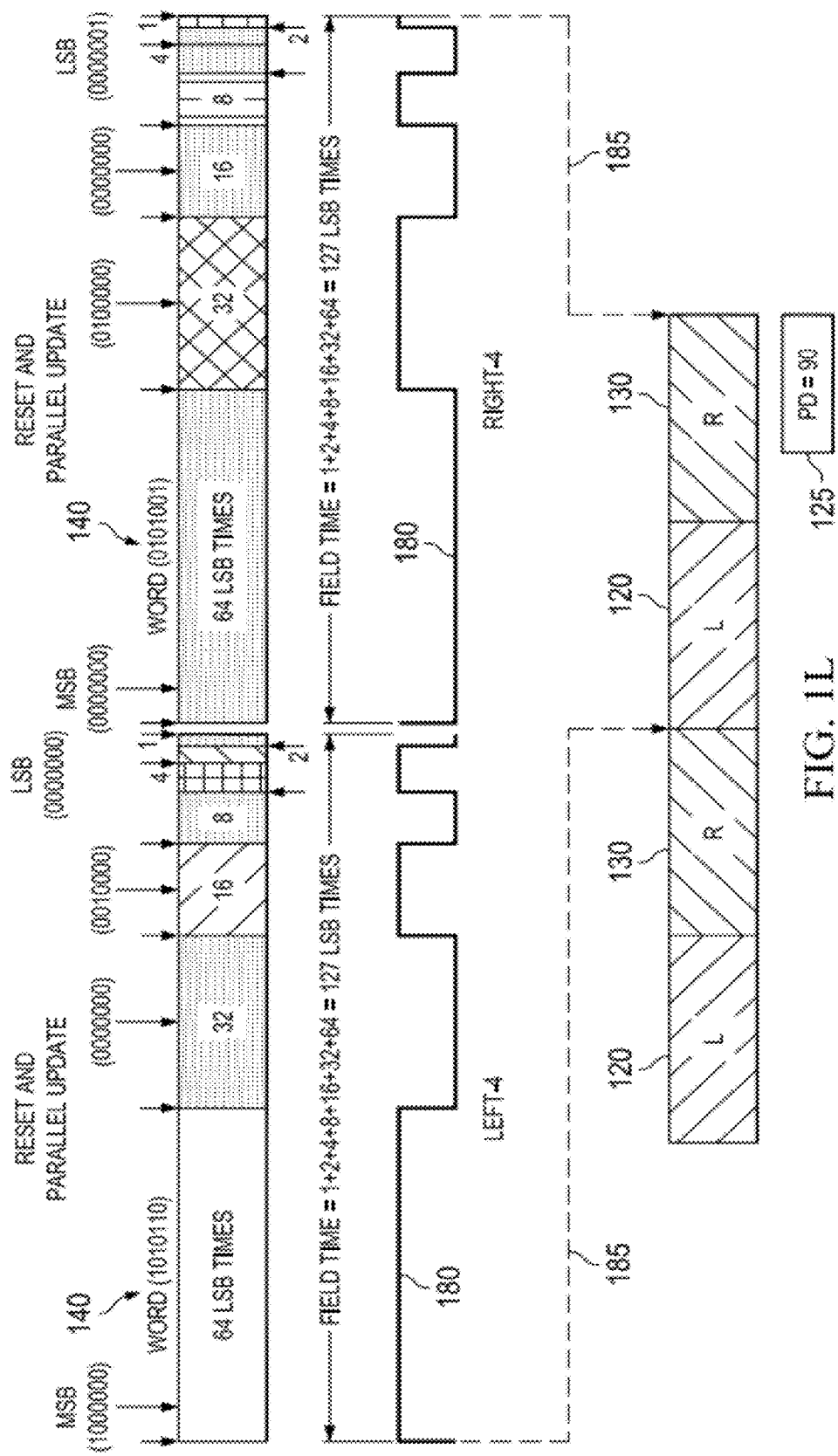

FIG. 1K shows the bit sequence 180 (0101001) for the word 140 (0101001), as shown in FIG. 1H, for example, displayed as the left image 120, Left-3, and shows the bit sequence 180 (101010110) for the word 140 (1010110), as shown in FIG. 1G, for example, displayed as the right image 130, Right-3, respectively, as indicated (in phantom) by the arrows 185, in two field portions of the four field portions of the frame time of the 3-dimensional video display with the phase difference (PD) 125 of 90 degrees. FIG. 1L shows the bit sequence 180 (1010110) for the word 140 (1010110), as shown in FIG. 1G, for example, displayed as the left image 120, Left-4, and shows the bit sequence 180 (0101001) for the word 140 (0101001), as shown in FIG. 1H, for example, displayed as the right image 130, Right-4, respectively, as indicated (in phantom) by the arrows 185, in two field portions of the four field portions of the frame time of the 3-dimensional video display with the phase difference (PD) 125 of 90 degrees.

Figure 2A:
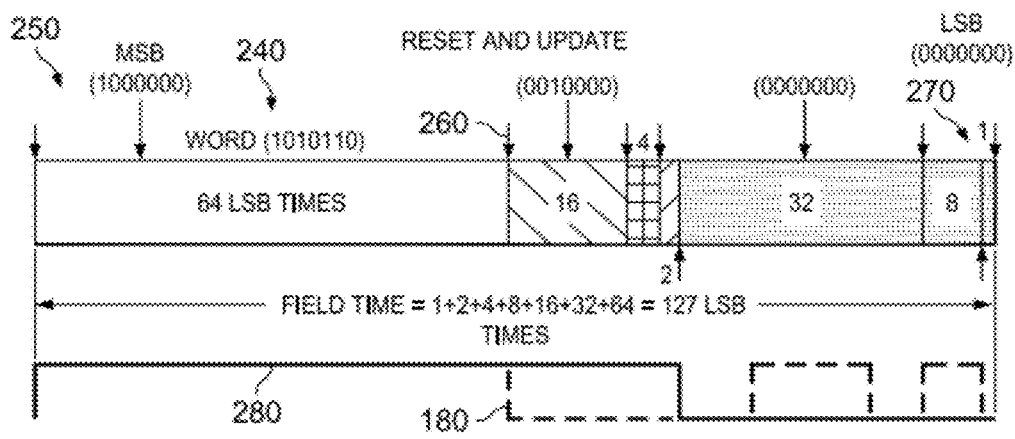
FIGS. 2A-2H schematically illustrate particular examples of redistributed bit sequences associated with various left and right images in one or more portions of the frame time of the 3-dimensional video display, the redistributed bit sequences providing a reduced phase difference (relative to the phase difference shown in FIG. 1C), representative of various illustrative embodiments of a method useful for reducing stereoscopic phase-lag distortion under motion in a 3-dimensional video display, according to the present disclosure.

FIGS. 2A-2H schematically illustrate particular examples of redistributed bit sequences 280 associated with various left and right images 220, 230 in one or more portions of the frame time of the 3-dimensional video display, the redistributed bit sequences 280 providing a reduced phase difference 225 (relative to the phase difference 125 shown, for example, in FIG. 1C), representative of various illustrative embodiments of a method useful for reducing stereoscopic phase-lag distortion under motion in a 3-dimensional video display, according to the present disclosure. FIG. 2A shows a particular example representative of various illustrative embodiments of pulse width modulation (PWM) for the 7-bit binary word 240 (1010110) using a front-weighted thermometer scale, with a corresponding redistributed bit sequence 280 (1010110), which differs from the corresponding bit sequence 180 (1010110) of FIG. 1G. The corresponding bit sequence 180 (1010110) is shown (in phantom) in FIG. 2A. The 7-bit binary word 240 (1010110) has a most significant bit 250 (1000000) and a least significant bit 270 (0000000). For the front-weighted thermometer scale, the non-zero bit values may be displayed before substantially any of the zero bit values, for example.

Reading the non-zero bits in order from left to right, the most significant bit 250 (1000000) may still correspond to reflecting light from the source 255 onto the pixel 245 for 64 LSB times, (0010000) may still correspond to reflecting light from the source 255 onto the pixel 245 for 16 LSB times, (0000100) may still correspond to reflecting light from the source 255 onto the pixel 245 for 4 LSB times, and (0000010) may still correspond to reflecting light from the source 255 onto the pixel 245 for 2 LSB times. Reading the zero bits in order from left to right, (0000000) may still correspond to not reflecting light from the source 255 onto the pixel 245 for 32 LSB times, (0000000) may still correspond to not reflecting light from the source 255 onto the pixel 245 for 8 LSB times, and the least significant bit 270 (0000000) may still correspond to not reflecting light from the source 255 onto the pixel 245 for 1 LSB time, as shown in FIG. 2A. Note that arrows 260 do not represent blanking intervals, in various illustrative embodiments, and that the front-weighted thermometer scale schematically illustrated in FIG. 2A may be achieved by reflecting light from the source 255 onto the pixel 245 for a total of 64+16+4+2=86 LSB times, followed by not reflecting light from the source 255 onto the pixel 245 for a total of 32+8+1=41 LSB times, according to a suitable architecture. The 7-bit binary word 240 (1010110), and the corresponding redistributed bit sequence 280 (1010110), may still represent an intensity of 86/127=68% on a 7-bit gray scale, for example.

In various alternative illustrative embodiments, as shown by the arrows 260 in FIG. 2A, after 64 LSB times, appropriate mirrors 215m of the spatial light modulator 215 may be reset and updated, according to a suitable architecture, with the next less significant non-zero bit in the corresponding redistributed bit sequence 280 for the respective word 240. Note that the resetting and/or updating need not be in parallel, in various illustrative embodiments. Similarly, after 16 LSB times, appropriate mirrors 215m of the spatial light modulator 215 may again be reset and updated with the next less significant non-zero bit in the corresponding redistributed bit sequence 280 for the respective word 240. Likewise, after 4 LSB times, appropriate mirrors 215m of the spatial light modulator 215 may again be reset and updated with the last non-zero bit in the corresponding redistributed bit sequence 280 for the respective word 240. Similarly, after 2 LSB times, appropriate mirrors 215m of the spatial light modulator 215 may again be reset and updated with the most significant zero bit in the corresponding redistributed bit sequence 280 for the respective word 240. Then, after 32 LSB times, appropriate mirrors 215m of the spatial light modulator 215 may again be reset and updated with the next less significant zero bit in the corresponding redistributed bit sequence 280 for the respective word 240. Likewise, after 8 LSB times, appropriate mirrors 215m of the spatial light modulator 215 may again be reset and updated with the last zero bit, the least significant bit 270, in the corresponding redistributed bit sequence 280 for the respective word 240. Finally, after 1 LSB time, each mirror 215m of the spatial light modulator 215 may again be reset and updated (in parallel, if appropriate) with the next bit in the next corresponding redistributed bit sequence 280 for the next respective word 240.

Figure 2B:
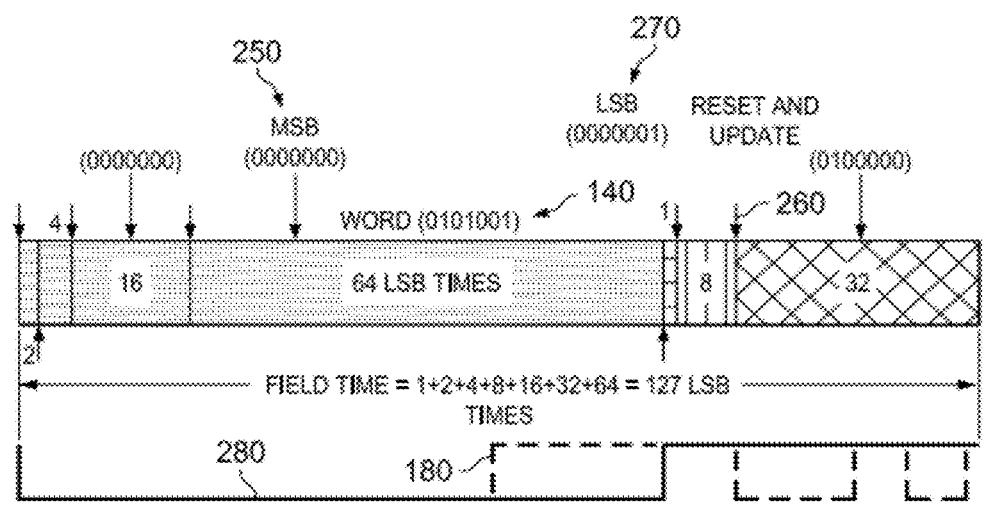

FIG. 2B shows a particular example representative of various illustrative embodiments of pulse width modulation (PWM) for the 7-bit binary word 240 (0101001), the complement of the 7-bit binary word 240 (1010110) shown in FIG. 2A, using a back-weighted thermometer scale, with a corresponding redistributed bit sequence 280 (0101001), which differs from the corresponding bit sequence 180 (0101001) of FIG. 1H. The corresponding bit sequence 180 (0101001) is shown (in phantom) in FIG. 2B. The 7-bit binary word 240 (0101001) has a most significant bit 250 (0000000) and a least significant bit 270 (0000001). For the back-weighted thermometer scale, the non-zero bit values may be displayed after substantially all of the zero bit values, for example.

Reading the bits in order from left to right, the most significant bit 250 (0000000) may still correspond to not reflecting light from the source 255 onto the pixel 245 for 64 LSB times, (0100000) may still correspond to reflecting light from the source 255 onto the pixel 245 for 32 LSB times, (0000000) may still correspond to not reflecting light from the source 255 onto the pixel 245 for 16 LSB times, (0001000) may still correspond to reflecting light from the source 255 onto the pixel 245 for 8 LSB times, (0000000) may still correspond to not reflecting light from the source 255 onto the pixel 245 for 4 LSB times, (0000000) may still correspond to not reflecting light from the source 255 onto the pixel 245 for 2 LSB times, and the least significant bit 270 (0000001) may still correspond to reflecting light from the source 255 onto the pixel 245 for 1 LSB time, as shown in FIG. 2B. The 7-bit binary word 240 (0101001), and the corresponding redistributed bit sequence 280 (0101001), may still represent an intensity of 41/127=32% on a 7-bit gray scale, for example.

As shown by the arrows 260 in FIG. 2B, after 2 LSB times, appropriate mirrors 215m of the spatial light modulator 215 may be reset and updated, according to a suitable architecture, with the next more significant zero bit in the corresponding redistributed bit sequence 280 for the respective word 240. Note that again the resetting and/or updating need not be in parallel, in various illustrative embodiments. Similarly, after 4 LSB times, appropriate mirrors 215m of the spatial light modulator 215 may again be reset and updated with the next more significant zero bit in the corresponding redistributed bit sequence 280 for the respective word 240. Likewise, after 16 LSB times, appropriate mirrors 215m of the spatial light modulator 215 may again be reset and updated with the last zero bit, the most significant bit 250, in the corresponding redistributed bit sequence 280 for the respective word 240. Similarly, after 64 LSB times, appropriate mirrors 215m of the spatial light modulator 215 may again be reset and updated with the least significant non-zero bit, the least significant bit 270, in the corresponding redistributed bit sequence 280 for the respective word 240. Then, after 1 LSB time, appropriate mirrors 215m of the spatial light modulator 215 may again be reset and updated with the next more significant non-zero bit in the corresponding redistributed bit sequence 280 for the respective word 240. Likewise, after 8 LSB times, appropriate mirrors 215m of the spatial light modulator 215 may again be reset and updated with the last non-zero bit, the most significant non-zero bit, in the corresponding redistributed bit sequence 280 for the respective word 240. Finally, after 32 LSB times, each mirror 215m of the spatial light modulator 215 may again be reset and updated (in parallel, if appropriate) with the next bit in the next corresponding redistributed bit sequence 280 for the next respective word 240.

Figure 2C:
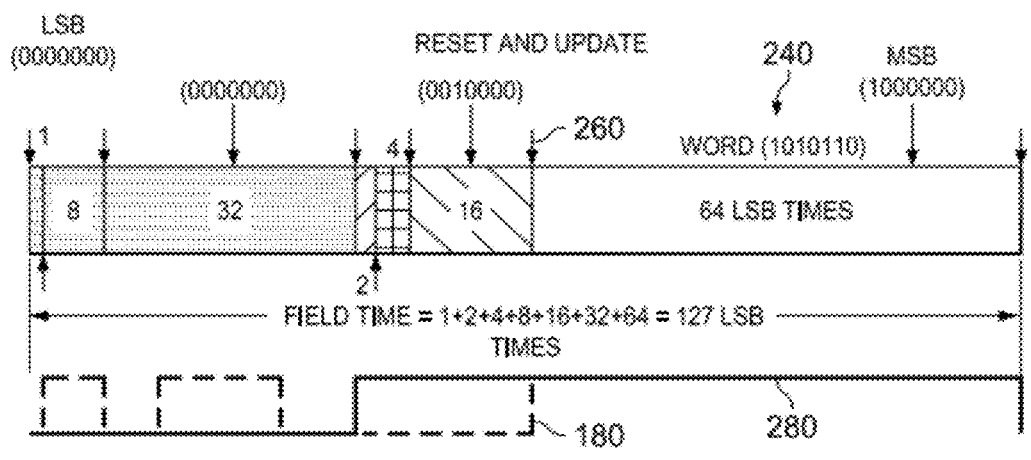

FIG. 2C shows another particular example representative of various illustrative embodiments of pulse width modulation (PWM) for the 7-bit binary word 240 (1010110) shown in FIG. 2A, but using a back-weighted thermometer scale, with a corresponding redistributed bit sequence 280 (1010110), which differs from the corresponding bit sequence 180 (1010110) of FIG. 1G, and may be substantially a mirror image of the 7-bit binary word 240 (1010110) shown in FIG. 2A, which uses a front-weighted thermometer scale. The corresponding bit sequence 180 (1010110) is shown (in phantom) in FIG. 2C. The 7-bit binary word 240 (1010110) still has a most significant bit 250 (1000000) and a least significant bit 270 (0000000). For the back-weighted thermometer scale, the non-zero bit values may be displayed after substantially all of the zero bit values, for example.

Reading the bits in order from left to right, the most significant bit 250 (1000000) may still correspond to reflecting light from the source 255 onto the pixel 245 for 64 LSB times, (0000000) may still correspond to not reflecting light from the source 255 onto the pixel 245 for 32 LSB times, (0010000) may still correspond to reflecting light from the source 255 onto the pixel 245 for 16 LSB times, (0000000) may still correspond to not reflecting light from the source 255 onto the pixel 245 for 8 LSB times, (0000100) may still correspond to reflecting light from the source 255 onto the pixel 245 for 4 LSB times, (0000010) may still correspond to reflecting light from the source 255 onto the pixel 245 for 2 LSB times, and the least significant bit 270 (0000000) may still correspond to not reflecting light from the source 255 onto the pixel 245 for 1 LSB time, as shown in FIG. 2C. The 7-bit binary word 240 (1010110), and the corresponding redistributed bit sequence 280 (1010110), may still represent an intensity of 86/127=68% on a 7-bit gray scale, for example.

As shown by the arrows 260 in FIG. 2C, after 1 LSB time, appropriate mirrors 215m of the spatial light modulator 215 may be reset and updated, according to a suitable architecture, with the next more significant zero bit in the corresponding redistributed bit sequence 280 for the respective word 240. Note that again the resetting and/or updating need not be in parallel, in various illustrative embodiments. Similarly, after 8 LSB times, appropriate mirrors 215m of the spatial light modulator 215 may again be reset and updated with the last zero bit, the most significant zero bit, in the corresponding redistributed bit sequence 280 for the respective word 240. Likewise, after 32 LSB times, appropriate mirrors 215m of the spatial light modulator 215 may again be reset and updated with the least significant non-zero bit in the corresponding redistributed bit sequence 280 for the respective word 240. Similarly, after 2 LSB times, appropriate mirrors 215m of the spatial light modulator 215 may again be reset and updated with the next more significant non-zero bit in the corresponding redistributed bit sequence 280 for the respective word 240. Then, after 4 LSB times, appropriate mirrors 215m of the spatial light modulator 215 may again be reset and updated with the next more significant non-zero bit in the corresponding redistributed bit sequence 280 for the respective word 240. Likewise, after 16 LSB times, appropriate mirrors 215m of the spatial light modulator 215 may again be reset and updated with the last non-zero bit, the most significant bit 250, in the corresponding redistributed bit sequence 280 for the respective word 240. Finally, after 64 LSB times, each mirror 215m of the spatial light modulator 215 may again be reset and updated (in parallel, if appropriate) with the next bit in the next corresponding redistributed bit sequence 280 for the next respective word 240.

Figure 2D:
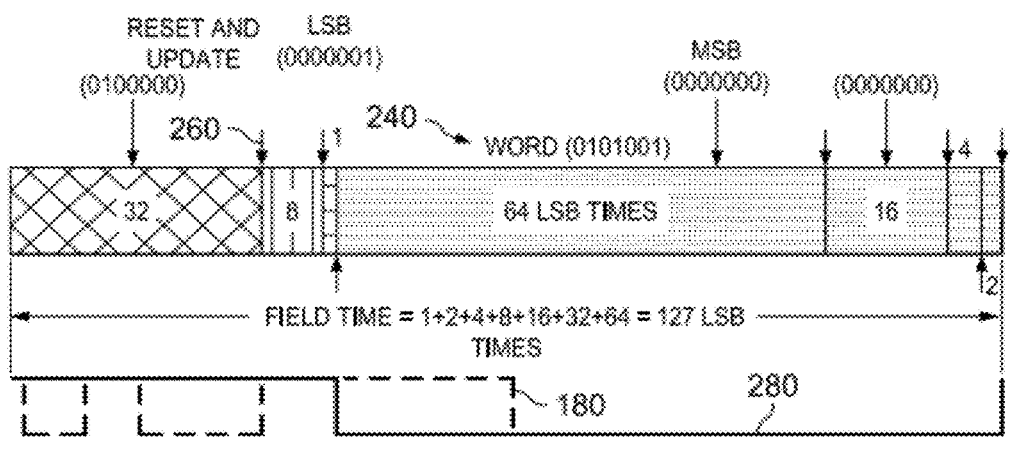

FIG. 2D shows another particular example representative of various illustrative embodiments of pulse width modulation (PWM) for the 7-bit binary word 240 (0101001) shown in FIG. 2B, but using a front-weighted thermometer scale, with a corresponding redistributed bit sequence 280 (0101001), which differs from the corresponding bit sequence 180 (0101001) of FIG. 1H, and may be substantially a mirror image of the 7-bit binary word 240 (0101001) shown in FIG. 2B, which uses a back-weighted thermometer scale. The corresponding bit sequence 180 (0101001) is shown (in phantom) in FIG. 2D. The 7-bit binary word 240 (0101001) still has a most significant bit 250 (0000000) and a least significant bit 270 (0000001). For the front-weighted thermometer scale, the non-zero bit values may be displayed before substantially any of the zero bit values, for example.

Reading the bits in order from left to right, the most significant bit 250 (0000000) may still correspond to not reflecting light from the source 255 onto the pixel 245 for 64 LSB times, (0100000) may still correspond to reflecting light from the source 255 onto the pixel 245 for 32 LSB times, (0000000) may still correspond to not reflecting light from the source 255 onto the pixel 245 for 16 LSB times, (0001000) may still correspond to reflecting light from the source 255 onto the pixel 245 for 8 LSB times, (0000000) may still correspond to not reflecting light from the source 255 onto the pixel 245 for 4 LSB times, (0000000) may still correspond to not reflecting light from the source 255 onto the pixel 245 for 2 LSB times, and the least significant bit 270 (0000001) may still correspond to reflecting light from the source 255 onto the pixel 245 for 1 LSB time, as shown in FIG. 2D. The 7-bit binary word 240 (0101001), and the corresponding redistributed bit sequence 280 (0101001), may still represent an intensity of 41/127=32% on a 7-bit gray scale, for example.

As shown by the arrows 260 in FIG. 2D, after 32 LSB times, appropriate mirrors 215m of the spatial light modulator 215 may be reset and updated, according to a suitable architecture, with the next less significant non-zero bit in the corresponding redistributed bit sequence 280 for the respective word 240. Note that again the resetting and/or updating need not be in parallel, in various illustrative embodiments. Similarly, after 8 LSB times, appropriate mirrors 215m of the spatial light modulator 215 may again be reset and updated with the last non-zero bit, the least significant bit 270, in the corresponding redistributed bit sequence 280 for the respective word 240. Likewise, after 1 LSB time, appropriate mirrors 215m of the spatial light modulator 215 may again be reset and updated with the most significant zero bit, the most significant bit 250, in the corresponding redistributed bit sequence 280 for the respective word 240. Similarly, after 64 LSB times, appropriate mirrors 215m of the spatial light modulator 215 may again be reset and updated with the next less significant zero bit in the corresponding redistributed bit sequence 280 for the respective word 240. Then, after 16 LSB times, appropriate mirrors 215m of the spatial light modulator 215 may again be reset and updated with the next less significant zero bit in the corresponding redistributed bit sequence 280 for the respective word 240. Likewise, after 4 LSB times, appropriate mirrors 215m of the spatial light modulator 215 may again be reset and updated with the last zero bit, the least significant zero bit, in the corresponding redistributed bit sequence 280 for the respective word 240. Finally, after 2 LSB times, each mirror 215m of the spatial light modulator 215 may again be reset and updated (in parallel, if appropriate) with the next bit in the next corresponding redistributed bit sequence 280 for the next respective word 240.

Figure 2E:
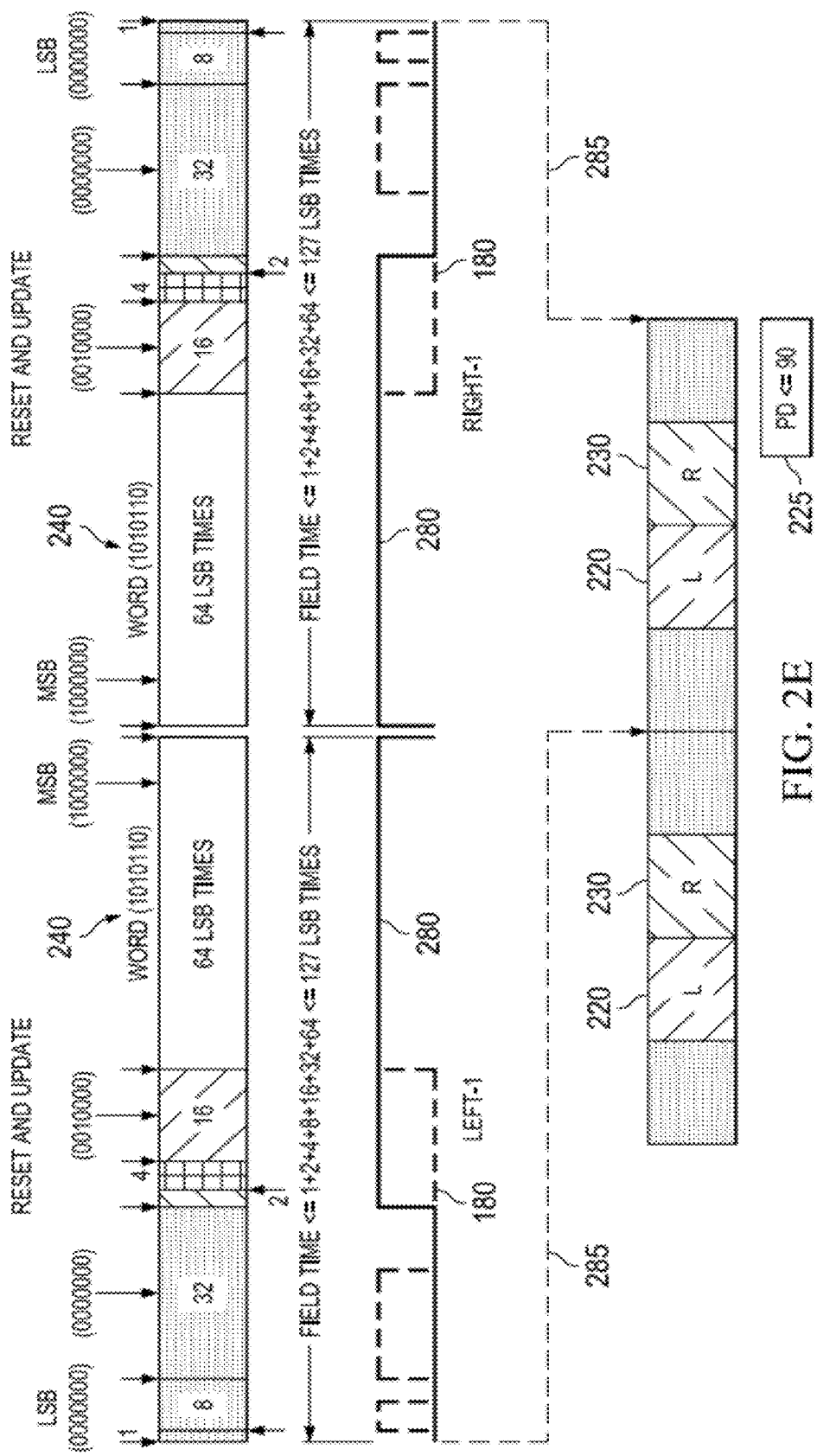
Figure 2F:
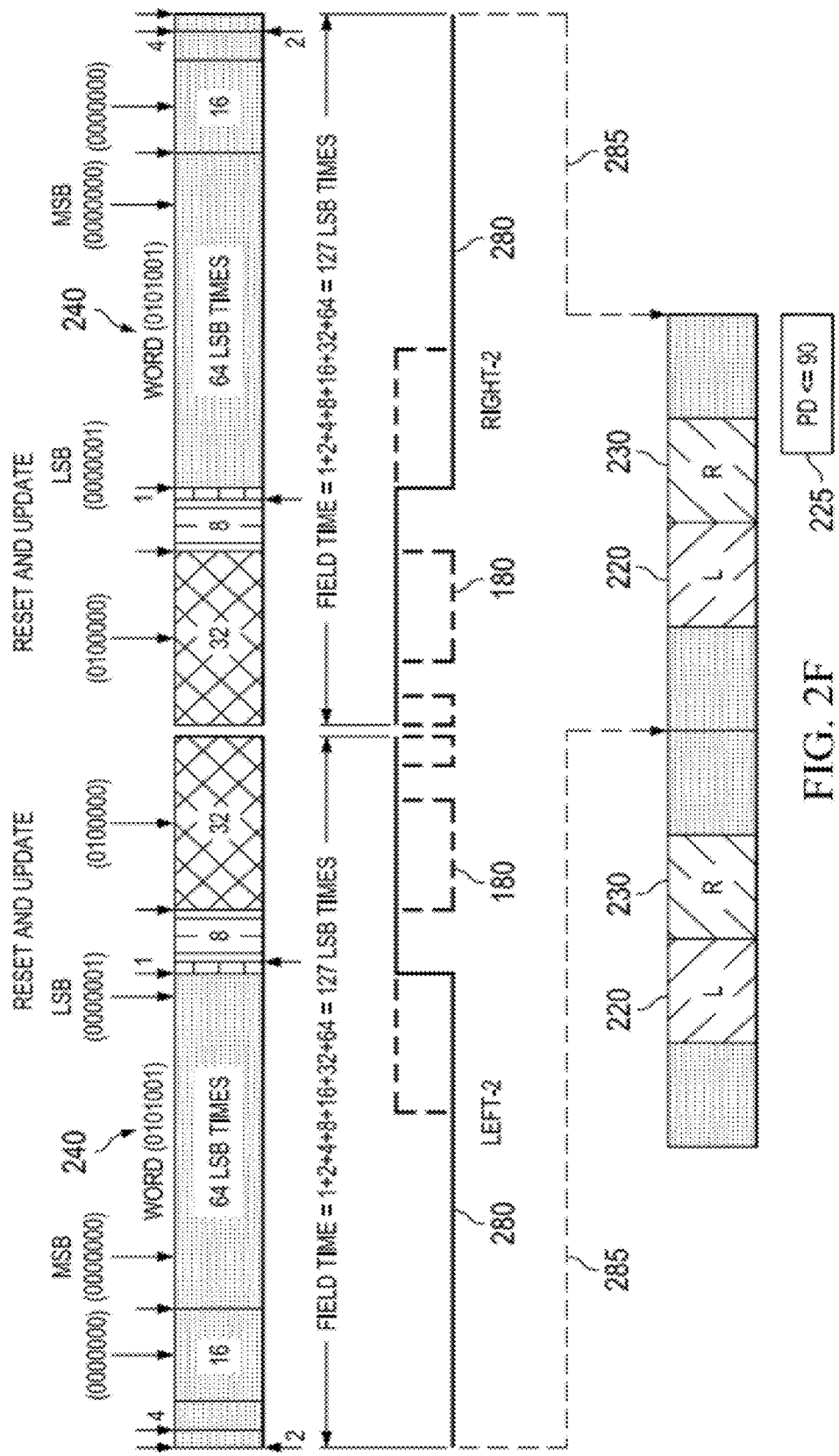

FIGS. 2E-2H schematically illustrate particular examples of various illustrative embodiments of the redistributed bit sequences 280 associated with various left and right images 220, 230 in one or more portions of the frame time of the 3-dimensional video display with a phase difference 225 less than (and/or often substantially less than and/or rarely equal to) the phase difference 125 of 90 degrees, as shown in FIG. 1C, for example. FIG. 2E shows the redistributed bit sequence 280 (1010110) for the word 240 (1010110), using the back-weighted thermometer scale, as shown in FIG. 2C, for example, displayed as the left image 220, Left-1, and the redistributed bit sequence 280 (1010110) for the word 240 (1010110), using the front-weighted thermometer scale, as shown in FIG. 2A, for example, displayed as the right image 230, Right-1, respectively, as indicated (in phantom) by the arrows 285, in two field portions of the four field portions of the frame time of the 3-dimensional video display with the phase difference (PD) 225 of less than (or equal to) about 90 degrees. FIG. 2F shows the redistributed bit sequence 280 (0101001) for the word 240 (0101001), using the back-weighted thermometer scale, as shown in FIG. 2B, for example, displayed as the left image 220, Left-2, and the redistributed bit sequence 280 (0101001) for the word 240 (0101001), using the front-weighted thermometer scale, as shown in FIG. 2D, for example, displayed as the right image 230, Right-2, respectively, as indicated (in phantom) by the arrows 285, in two field portions of the four field portions of the frame time of the 3-dimensional video display with the phase difference (PD) 225 of less than (or equal to) about 90 degrees.

Figure 2G:
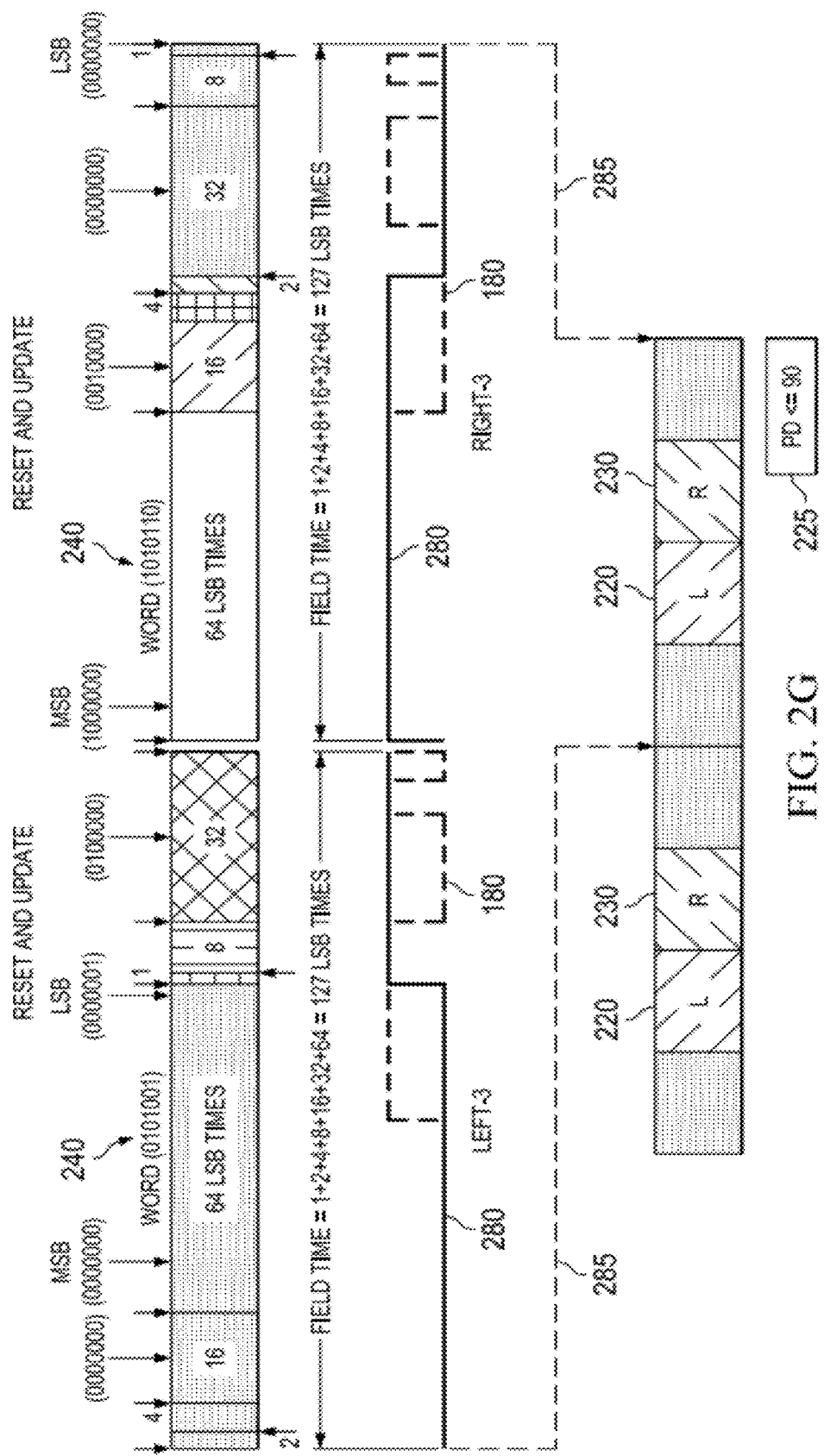
Figure 2H:
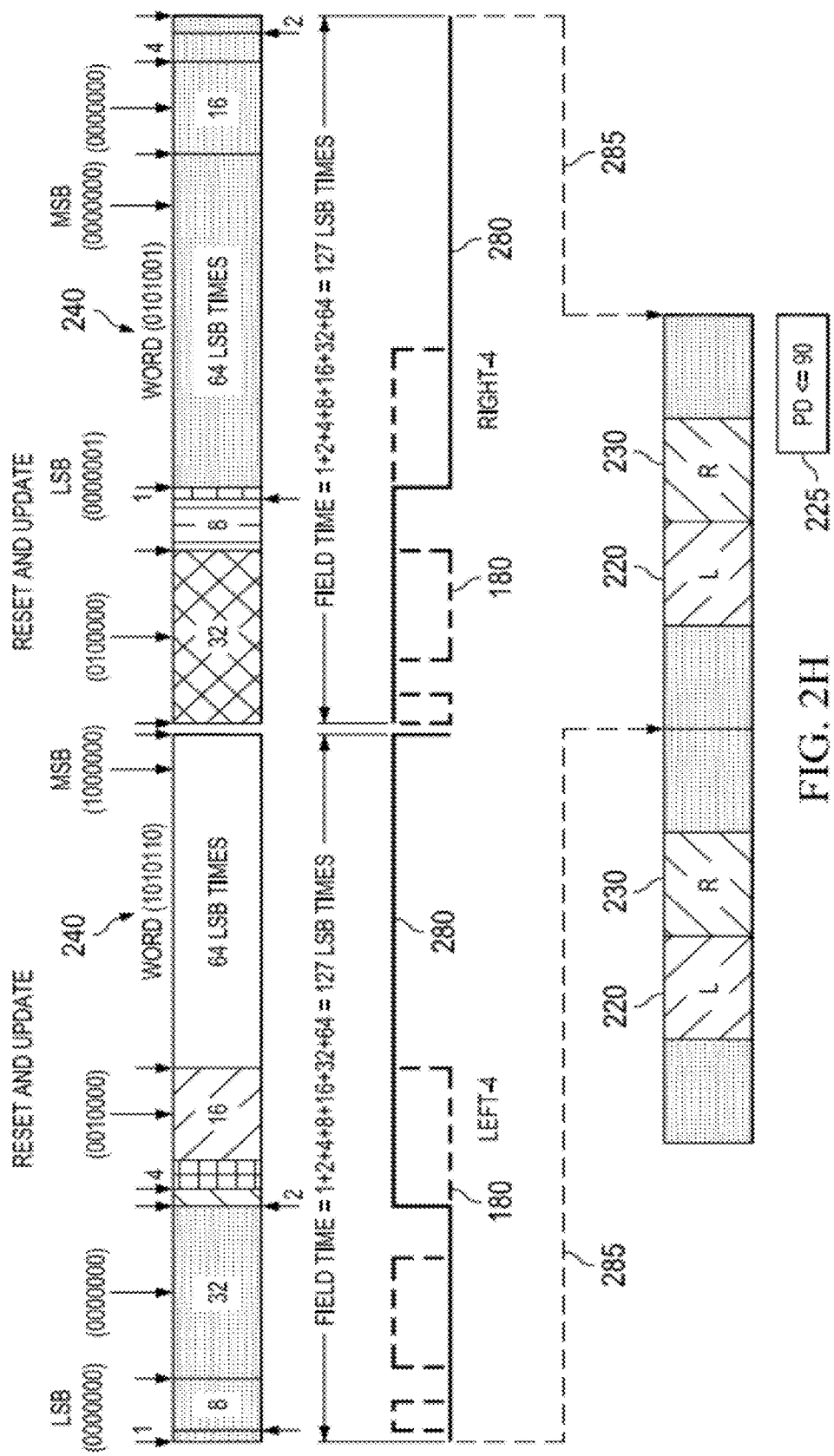

FIG. 2G shows the redistributed bit sequence 280 (0101001) for the word 240 (0101001), using the back-weighted thermometer scale, as shown in FIG. 2B, for example, displayed as the left image 220, Left-3, and the redistributed bit sequence 280 (1010110) for the word 240 (1010110), using the front-weighted thermometer scale, as shown in FIG. 2A, for example, displayed as the right image 230, Right-3, respectively, as indicated (in phantom) by the arrows 285, in two field portions of the four field portions of the frame time of the 3-dimensional video display with the phase difference (PD) 225 of less than (or equal to) about 90 degrees. FIG. 2H shows the redistributed bit sequence 280 (1010110) for the word 240 (1010110), using the back-weighted thermometer scale, as shown in FIG. 2C, for example, displayed as the left image 220, Left-4, and the redistributed bit sequence 280 (0101001) for the word 240 (0101001), using the front-weighted thermometer scale, as shown in FIG. 2D, for example, displayed as the right image 230, Right-4, respectively, as indicated (in phantom) by the arrows 285, in two field portions of the four field portions of the frame time of the 3-dimensional video display with the phase difference (PD) 225 of less than (or equal to) about 90 degrees.

Figure 2I:
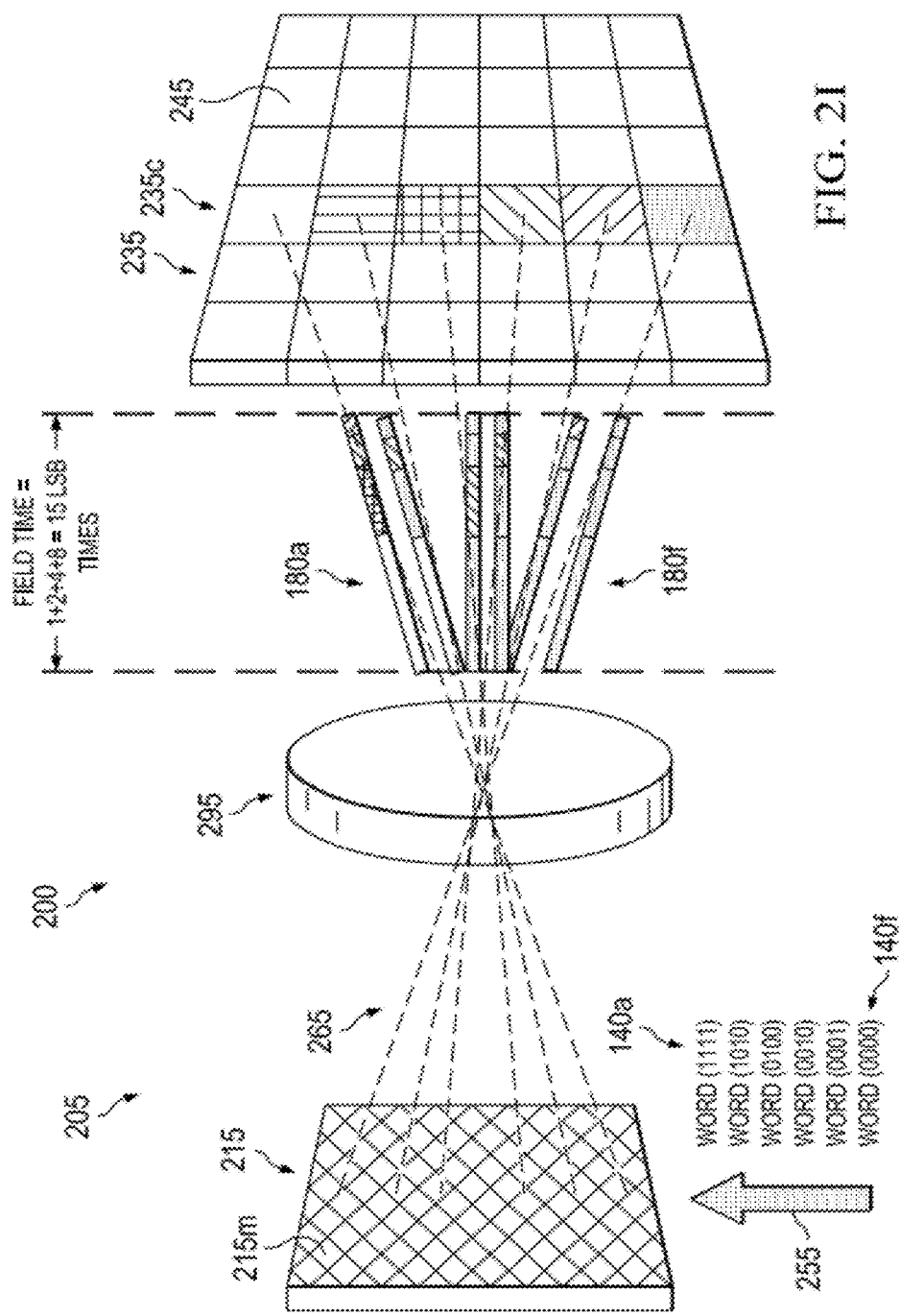

FIGS. 2I-2K schematically illustrate particular examples of a system 200 useful for reducing stereoscopic phase-lag distortion under motion in a 3-dimensional video display, according to the present disclosure, the system 200 arranged to display the redistributed bit sequences 280 associated with various left and right images 220, 230 in one or more portions of the frame time of the 3-dimensional video display, as shown in FIGS. 2A-2H, for example. The system 200 may be arranged with a projector system 205 comprising the spatial light modulator (SLM) 215 that may reflect light from the light source 255 (optionally part of the projector system 205) off of each respective micro-mirror 215m, through a projection display lens system 295 (optionally also part of the projector system 205), and onto (or not onto, as may be appropriate) the corresponding pixel 245 of a display device, such as a projection display screen 235.

As shown in FIGS. 2I-2K, words 240a-240f may be loaded into the spatial light modulator (SLM) 215 array that cause each of the respective micro-mirrors 215m, one or more for each of the corresponding pixels 245, to reflect (or to not reflect, as may be appropriate) light from the light source 255, as indicated (in phantom) at 265. For the sake of simplicity of demonstration in FIGS. 2I-2K, only 4-bit words 240a-240f, are shown, and only for one column 235c of a 6×6 pixel 245 array display screen 235, as if the word 240f (0000) were being projected onto all the pixels 245 not in the column 235c. Generally, N-bit words may be loaded into the spatial light modulator (SLM) 215 array for projection onto an P×Q pixel 245 array display screen 235, where N=8 for 256 gray levels, P=848 and Q=600 in VGA, NTSC, PAL, and SVGA formats, and P=1280 and Q=1024 in XGA and SXGA formats, for example.

FIG. 2I schematically illustrates the bit sequence 180a (1111), as shown in FIG. 1E for the word 140a (1111) and the bit sequence 180b (1010), as shown in FIG. 1F for the word 140b (1010), along with the bit sequences 180c-f (0100), (0010), (0001), and (0000) for the words 140c-f (0100), (0010), (0001), and (0000), respectively, being projected onto respective pixels 245 of the column 235c during the 15 LSB field time. FIG. 2J schematically illustrates the redistributed bit sequence 280a (1111) for the word 240a (1111), similar to the redistributed bit sequences 280 (1010110), (0101001), for example, as shown in FIGS. 2A, and 2C, for the words 240 (1010110), (0101001), respectively, and the redistributed bit sequence 280b (1010) for the word 240b (1010), also similar to the redistributed bit sequences 280 (1010110), (0101001), for example, as shown in FIGS. 2A, and 2C, for the words 240 (1010110), (0101001), respectively, being projected onto respective pixels 245 of the column 235c during the 15 LSB field time.

FIG. 2J also schematically illustrates the redistributed bit sequences 280c-f (0100), (0010), (0001), and (0000) for the words 240c-f (0100), (0010), (0001), and (0000), respectively, being projected onto respective pixels 245 of the column 235c during the 15 LSB field time. The redistributed bit sequences 280a-f (1111), (1010), (0100), (0010), (0001), and (0000) for the words 240a-f (1111), (1010), (0100), (0010), (0001), and (0000), respectively, have been redistributed by a redistributor, as indicated (in phantom) at 275, such as one or more appropriate information handling systems (one or more suitable processors, for example), according to a front-weighted thermometer scale, as indicated schematically at 255f.

FIG. 2K schematically illustrates the redistributed bit sequence 280a (1111) for the word 240a (1111), similar to the redistributed bit sequences 280 (1010110), (0101001), for example, as shown in FIGS. 2B, and 2D, for the words 240 (1010110), (0101001), respectively, and the redistributed bit sequence 280b (1010) for the word 240b (1010), also similar to the redistributed bit sequences 280 (1010110), (0101001), for example, as shown in FIGS. 2B, and 2D, for the words 240 (1010110), (0101001), respectively, being projected onto respective pixels 245 of the column 235c during the 15 LSB field time.

FIG. 2K also schematically illustrates the redistributed bit sequences 280c-f (0100), (0010), (0001), and (0000) for the words 240c-f (0100), (0010), (0001), and (0000), respectively, being projected onto respective pixels 245 of the column 235c during the 15 LSB field time. The redistributed bit sequences 280a-f (1111), (1010), (0100), (0010), (0001), and (0000) for the words 240a-f (1111), (1010), (0100), (0010), (0001), and (0000), respectively, have been redistributed by the redistributor 275 according to a back-weighted thermometer scale, as indicated schematically at 255b.

Figure 3:
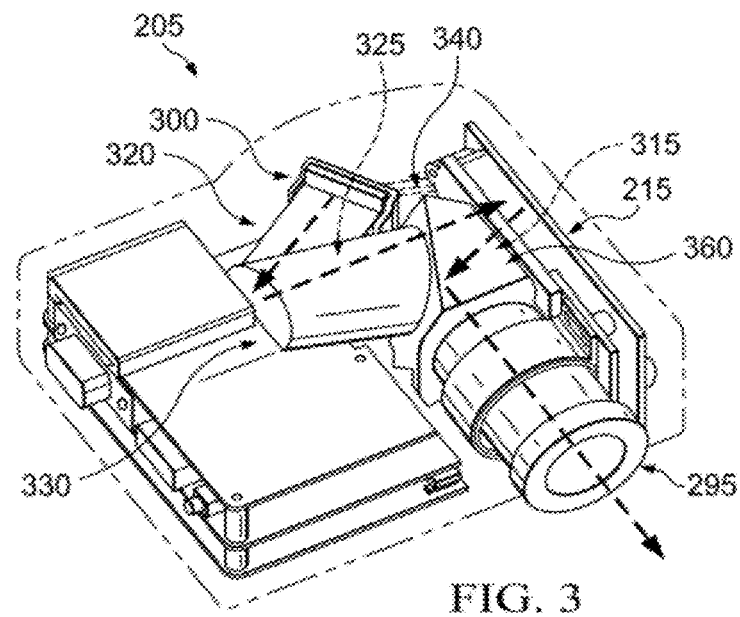
FIG. 3 schematically illustrates an optical system, arranged to spatially modulate an output beam (comprising visible laser light), using one or more spatial light modulators, and to display the spatially modulated output beam, suitable for use with various illustrative embodiments, according to the present disclosure.

FIG. 3 schematically illustrates a particular example of a projector 205 suitable for use in the system 200, arranged to spatially modulate an output beam 325, output by a light source 300, such as the light source 255, for example, using one or more of the spatial light modulators 215, and to display the spatially modulated output beam 315, appropriate for use with various illustrative embodiments, according to the present disclosure. The projector 205 of the system 200 may also optionally comprise one or more light collection, integration, and/or etendue-matching optical elements 320 arranged to collect and/or to integrate spatially substantially all light emitted by the light source 300. Etendue, as one of ordinary skill in the art having the benefit of the present disclosure would know, may be the product of the area of emission and the solid angle into which the emission is emitted. The projector 205 of the system 200 may also optionally comprise a telecentric relay 330 using one or more aspherical refractive and/or reflective spatial components (not shown), and/or a pupil (not shown) for controlling stray light. The projector 205 of the system 200 may also optionally comprise an illumination wedge prism 340. The projector 205 of the system 200 may also comprise the spatial light modulator (SLM) 215, such as the digital micromirror device (DMD®), arranged to modulate spatially substantially all the light emitted by the light source 255.

The projector 205 of the system 200 may also optionally comprise a projection total internal reflection (TIR) prism 360, the projection total internal reflection (TIR) prism 360 disposed between the illumination wedge prism 340 and the digital micromirror device (DMD) 215. In various illustrative embodiments, the projection total internal reflection (TIR) prism 360 may be separated by an air gap (not shown) from the illumination wedge prism 340. The projector 205 of the system 200 may also comprise the projection lens 295, with the telecentric relay 330 providing substantially all the light emitted by the light source 255 through the illumination wedge prism 340 and through the projection total internal reflection (TIR) prism 360 to the digital micromirror device (DMD) 215 that reflects the spatially modulated light 315 back through the projection total internal reflection (TIR) prism 360 that totally internally reflects the spatially modulated light 315 through the projection lens 295 onto the projection display screen 235, for example.

Figure 4:
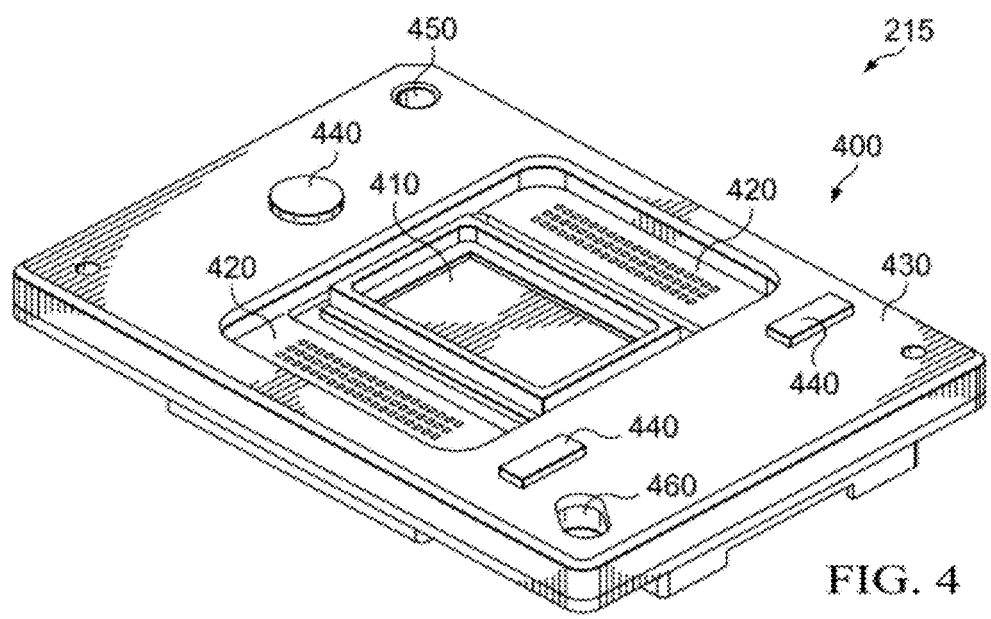
FIG. 4 schematically illustrates a spatial light modulator suitable for use with various illustrative embodiments, including the light projection optical systems of FIGS. 2I-2K and FIG. 3, according to the present disclosure.

FIG. 4 schematically illustrates a particular example of the spatial light modulator 215 suitable for use with various illustrative embodiments, including the light projection optical systems 200 of FIGS. 2I-2K and FIG. 3, according to the present disclosure. The spatial light modulator (SLM) 215 suitable for use with various illustrative embodiments, including the light projection optical system 200 with the projector 205 of FIGS. 2I-2K and FIG. 3, for example, is schematically illustrated, showing, in particular, a top perspective view of a device 400 for an integrated circuit (IC), such as the micro-electro-mechanical system (MEMS) spatial light modulator (SLM) 215 integrated circuit (IC), the device 400 shown having a wafer level package (WLP) digital micromirror device (DMD) chip 410 bonded thereon. One of ordinary skill in the art having the benefit of the present disclosure would appreciate that the device 400 could be used with any suitable integrated circuit (IC), and the micro-electro-mechanical system (MEMS) spatial light modulator (SLM) 215 integrated circuit (IC) described herein is but one of many suitable types of integrated circuits (ICs) with which the device 400 may be used. In various illustrative embodiments, the device 400 may have the wafer level package (WLP) digital micromirror device (DMD) chip 410 wire-bonded on two sides to bond pad area 420. A top surface 430 may provide a substantially flat area for a system aperture and gasket all around (not shown). The device 400 may also have one or more primary datum ('A') alignment features 440 (three are shown in FIG. 4), one or more secondary datum ('B') alignment features 450, and one or more tertiary datum ('C') alignment features 460 disposed on the top surface 430, for example.

Figure 8A:
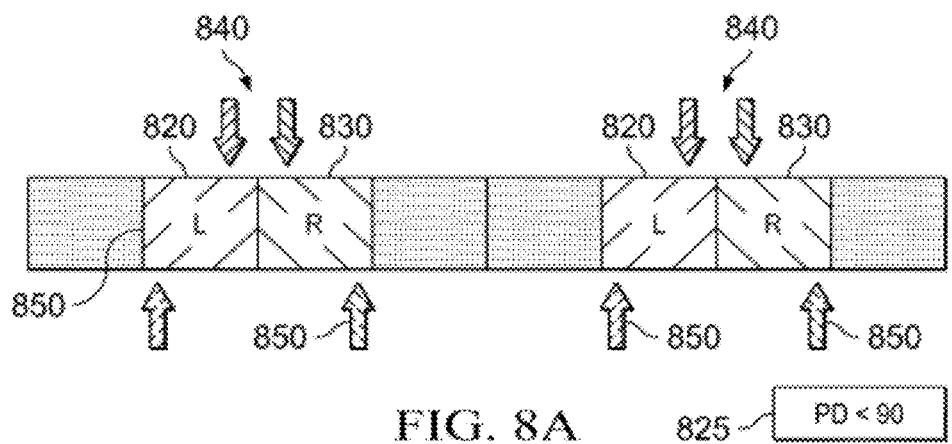
FIGS. 8A-8B schematically illustrates various alternative illustrative embodiments of a method and system useful for reducing stereoscopic phase-lag distortion under motion in a 3-dimensional video display, according to the present disclosure, by treating a first portion of higher-frequency (higher sub-band, more detailed) spatial components of the left image and the right image differently than a second portion of lower-frequency (lower sub-band, less detailed) spatial components of the left image and the right image by having the first portion of the higher-frequency spatial components of the left image placed as close together as possible to the first portion of the higher-frequency spatial components of the right image.
Figure 8B:
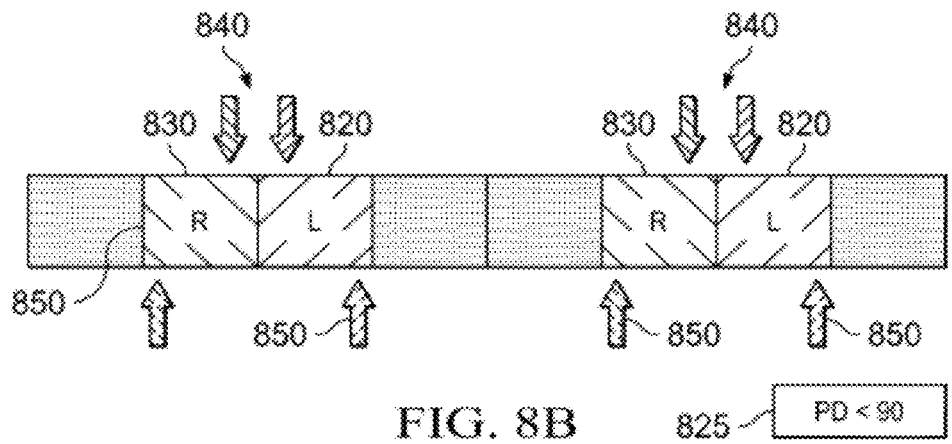

FIGS. 5A-5H schematically illustrate another particular example representative of various illustrative embodiments of a method and system useful for reducing stereoscopic phase-lag distortion under motion in a 3-dimensional video display, according to the present disclosure. As described above, in various illustrative embodiments, a more advanced algorithm may be used to reduce the phase difference 125. For example, as shown in FIGS. 8A and 8B, and as described in more detail below, the higher-frequency (higher sub-band, more detailed, less blurry) spatial components of the image may be treated differently than the lower-frequency (lower sub-band, less detailed, more blurry) spatial components of the image.

The higher-frequency (higher sub-band, more detailed, less blurry) spatial components of the right (R) image 830 may be placed as close together as possible with the higher-frequency (higher sub-band, more detailed, less blurry) spatial components of the left (L) image 820, as indicated by the arrows at 840, to reduce the phase difference 825 as much as possible for those higher-frequency (higher sub-band, more detailed, less blurry) spatial components. The phase difference 225 of the lower-frequency (lower sub-band, less detailed, more blurry) spatial components of the right (R) image 830 from the lower-frequency (lower sub-band, less detailed, more blurry) spatial components of the left (L) image 820 may be allowed to be larger than the phase difference 825, as indicated (in phantom) by the arrows at 850, but this may not matter much since the shifting of something blurry is not as noticeable as the shifting of something detailed.

The phase difference 825 may be almost zero for the highest-frequency (highest sub-band, most detailed, least blurry) spatial components and may increase as the frequency of the spatial components decreases. However, since the shifting of a blurry sub-image is not as noticeable as the shifting of a detailed sub-image, the overall effect is an apparent phase difference 825 of something very close to zero and/or substantially zero for the entire image 820, 830.

There are many ways to accomplish this decomposition of the left and right images 820, 830, respectively, into the higher-frequency (higher sub-band, more detailed, less blurry) spatial components and the lower-frequency (lower sub-band, less detailed, more blurry) spatial components, and localizing the higher-frequency (higher sub-band, more detailed, less blurry) spatial components closer together in the respective field time of each frame time. For example, assuming that the display system 200 can show $2M = M_L + M_R$ equally weighted bit-planes in one frame time, $M = M_L$ bit-planes may be calculated for the left image and $M = M_R$ bit-planes may be calculated for the right image, and then the bit-planes calculated for the left image and the bit-planes calculated for the right image may be shown in a "symmetrical" fashion (symmetrical with respect to the indices k of the respective bit-planes) centered around the middle of the frame time. The image x[i,j] may be assumed to be scaled and quantized appropriately so that at each pixel 245, $0 \leq x[i,j] \leq M$. Each pixel 245, may be labeled by row i and column j, where $i=1,2,3,\ldots,P$ and $j=1,2,3,\ldots,Q$ for the P×Q array 235 of the pixels 245, with M, P, and Q each being one of any of the finite, non-zero integers.

Figure 5A:
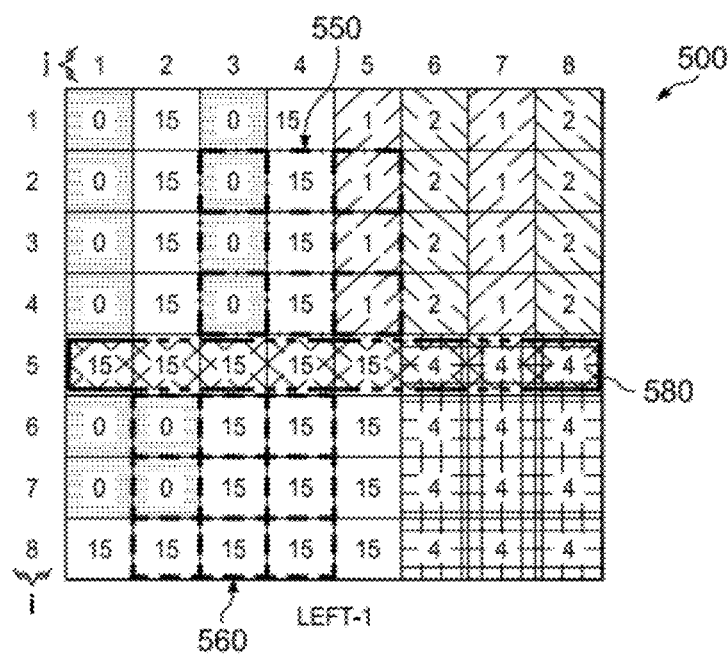
FIGS. 5A-5H schematically illustrate another particular example representative of various illustrative embodiments of a method and system useful for reducing stereoscopic phase-lag distortion under motion in a 3-dimensional video display, according to the present disclosure.

The bit-planes $b_k[i,j]$ may be calculated using an algorithm such as the following:

```
k = 1
while k ≤ M
  b_k[i,j] = (L_h{x[i,j]} ≤ x[i,j] ∩ 1 ≤ x[i,j]), ∀1 ≤ i ≤ P, 1 ≤ j ≤ Q
  x[i,j] = x[i,j] − b_k[i,j], ∀1 ≤ i ≤ P, 1 ≤ j ≤ Q
  k = k + 1
end while
``` where $(y \cap z)$ is the logical AND operation, which only returns a value of 1 when both y and z are true, and otherwise returns a value of 0, and the operator $L_h\{x[i,j]\}$ calculates a local average around the pixel 245 x[i,j] based on some kernel h. The kernel h may be chosen to be something simple like a 3×3 square, as indicated (in phantom) at 550, 560, 650, and 660, for example, as shown in FIGS. 5A, 5E, and FIG. 6A. For the simulated example, as shown in FIGS. 9A, 9B, and 9D, the kernel $$h = \begin{array}{|c|c|c|c|c|} \hline 0 & 1 & 1 & 1 & 0 \\ \hline 1 & 1 & 1 & 1 & 1 \\ \hline 0 & 1 & 1 & 1 & 0 \\ \hline \end{array}$$

may be used. The operator $L_h\{x[i,j]\}$ may be just regular convolution or some other known average. For the simulated example, as shown in FIGS. 9A, 9B, and 9D, the operator $L_h\{x[i,j]\}$ may be chosen to take the mean of maximum and minimum pixel 245 values x[i,j] over the neighborhood defined by the kernel $$h = \begin{array}{|c|c|c|c|c|} \hline 0 & 1 & 1 & 1 & 0 \\ \hline 1 & 1 & 1 & 1 & 1 \\ \hline 0 & 1 & 1 & 1 & 0 \\ \hline \end{array},$$

for example.

Figure 9A:
FIGS. 9A-9D schematically illustrate a 2-dimensional image of an object (a man looking through a camera on a tripod) moving to the right at 12 pixels per frame, providing a simulated example with elements that are representative of various illustrative embodiments of a method and system useful for reducing stereoscopic phase-lag distortion under motion in a 3-dimensional video display, according to the present disclosure.
Figure 9B:
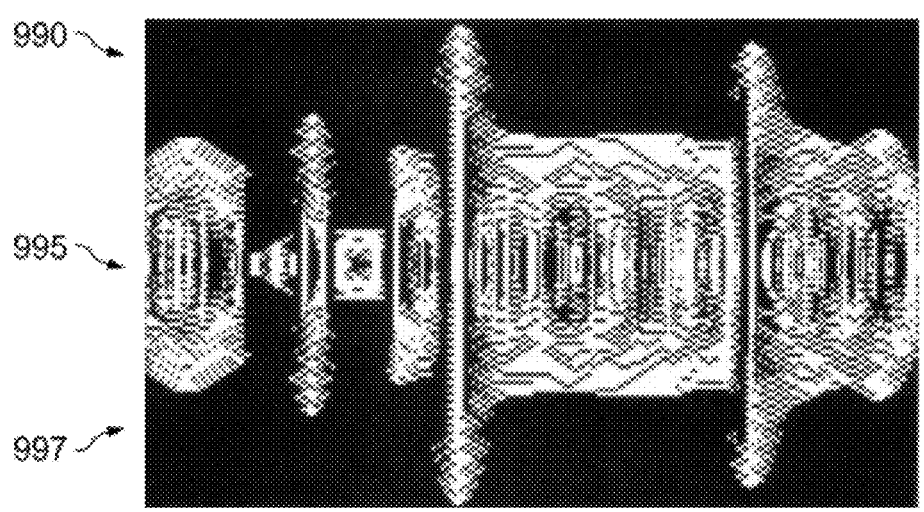
Figure 9C:
Figure 9D:

FIGS. 5A-5H schematically illustrate a simplified example showing a simpler algorithm than that used in the simulated example shown in FIGS. 9A, 9B, and 9D. FIGS. 5A-5H schematically illustrate images 500 of a background object 530, a dark 2×2 square, moving from left to right behind foreground objects including two sets of stripes 510 and 520, and one stationary object 540. As shown in FIGS. 5A and 5E, for example, each of the images 500 includes an array of 8×8 pixels 245, labeled by row and column indices i and j, respectively. Also shown in FIGS. 5A and 5E, for example, are the pixel 245 values x[i,j] according to a 4-bit gray scale arranged to encode 16 different gray scale values, as shown in FIGS. 1E-1H and FIGS. 2I-2K, for example.

Figure 5B:
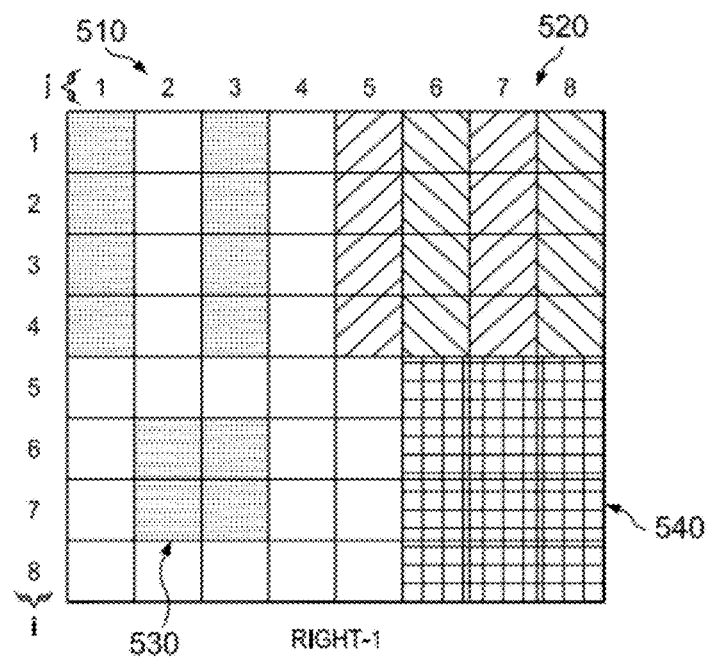
Figure 5C:
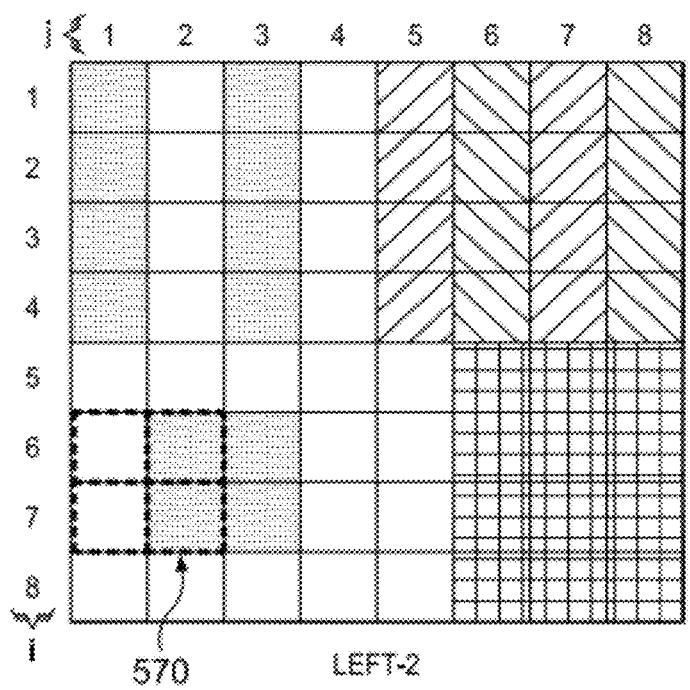
Figure 5D:
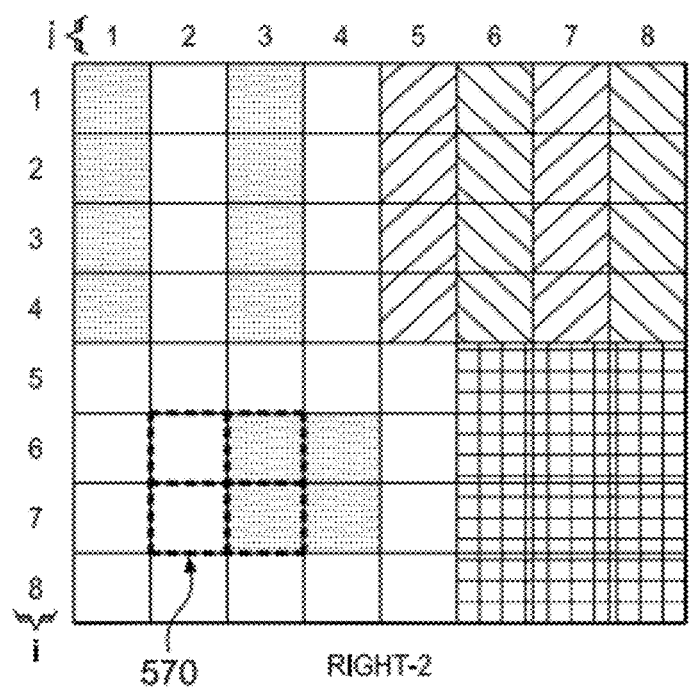
Figure 5E:
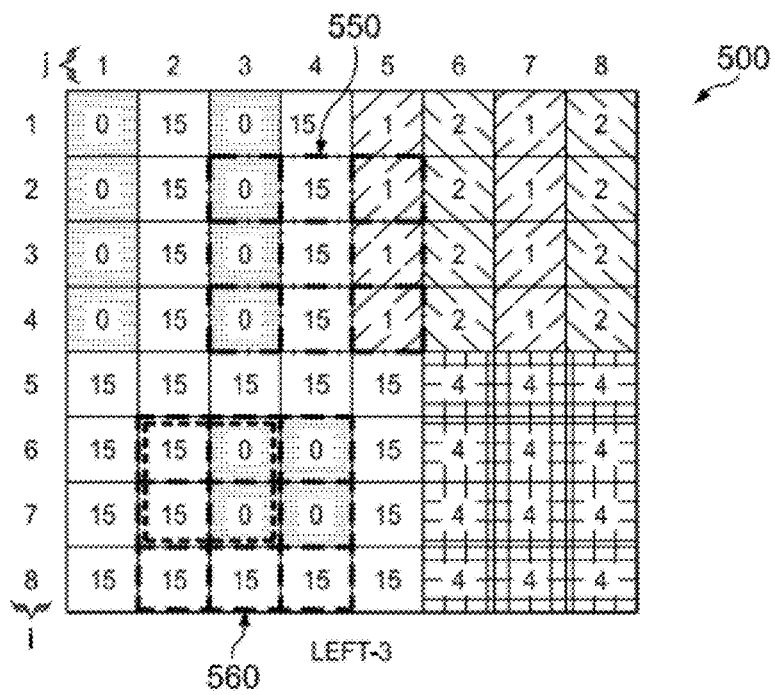
Figure 5F:
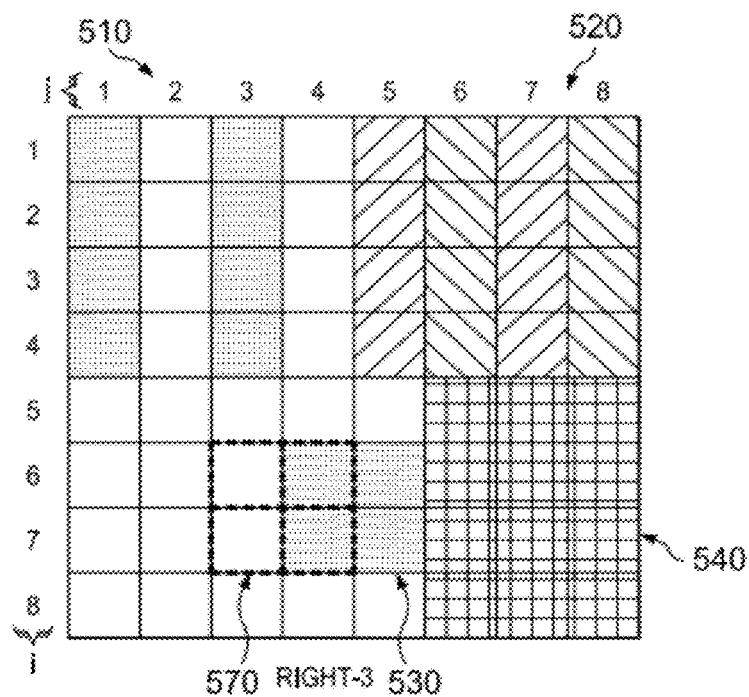
Figure 5G:
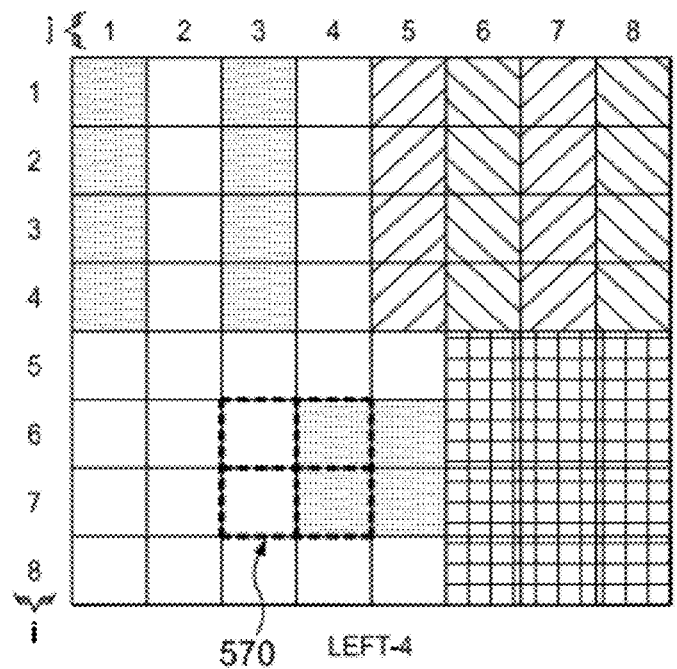
Figure 5H:
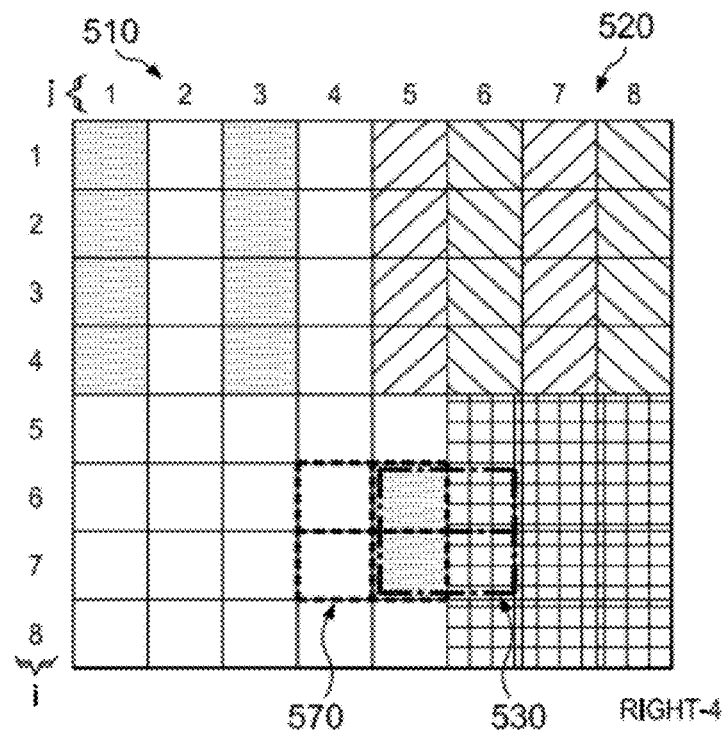
Figure 6A:
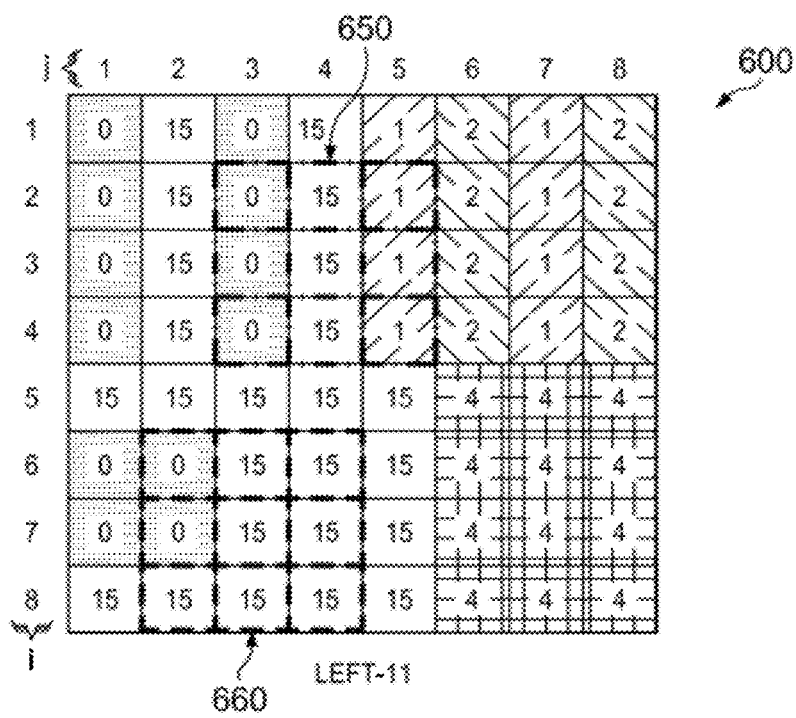

The object 530 is moving at a speed of about 1 pixel 245 per time frame, as may be seen by comparing FIGS. 5A, 5C, 5E, and 5G, showing left images Left-1, Left-2, Left-3, and Left-4, respectively, and/or by comparing FIGS. 5B, 5D, 5F, and 5H, showing right images Right-1, Right-2, Right-3, and Right-4, respectively, where the position of the object 530 in the previous time frame is indicated (in phantom) at 570. That the object 530 is a background object relative to the foreground objects 510, 520, and 540 may be seen by observing the parallax shift seen upon comparing FIGS. 5A and 5B, showing Left-1 and Right-1, and/or FIGS. 5C and 5D, showing Left-2 and Right-2, and/or FIGS. 5E and 5F, showing Left-3 and Right-3, and/or FIGS. 5G and 5H, showing Left-4 and Right-4, for example. Comparing FIGS. 5A and 5B, showing Left-1 and Right-1, for example, the left two pixels 245 x[6,1] and x[7,1] of the object 530 in Left-1 appear to be directly underneath the left four pixels 245 x[1,1] through x[4,1] of the left dark stripe of the higher contrast stripes 510 in Left-1, whereas the right two pixels 245 x[6,2] and x[7,2] of the object 530 in Left-1 appear to be directly underneath the left four pixels 245 x[1,2] through x[4,2] of the left light stripe of the higher contrast stripes 510 in Left-1. By way of contrast (due to stereoscopic parallax), the left two pixels 245 x[6,2] and x[7,2] of the object 530 in Right-1 appear to be directly underneath the left four pixels 245 x[1,2] through x[4,2] of the left light stripe of the higher contrast stripes 510 in Right-1, whereas the right two pixels 245 x[6,3] and x[7,3] of the object 530 in Right-1 appear to be directly underneath the right four pixels 245 x[1,3] through x[4,3] of the right dark stripe of the higher contrast stripes 510 in Right-1. Due to stereoscopic parallax, switching from Left-1 to Right-1, Left-2 to Right-2, Left-3 to Right-3, and/or Left-4 to Right-4, appears to cause the background object 530 to move from left to right relative to the foreground object 510 and/or appears to cause the foreground object 510 to move from right to left relative to the background object 530.

The respective bit-planes $b_k[i,j]$, for k=1 to k=M=15, may be calculated using the algorithm:

```
k = 1
x_k[i,j] = x[i,j] , ∀1 ≤ i ≤ P, 1 ≤ j ≤ Q
while k ≤ M
  b_k[i,j] = (L_h{x[i,j]} ≤ x_k[i,j] ∩ 1 ≤ x_k[i,j]) , ∀1 ≤ i ≤ P, 1 ≤ j ≤ Q
  x_{k+1}[i,j]=x_k[i,j]-b_k[i,j] , ∀1 ≤ i ≤ P, 1 ≤ j ≤ Q
  k = k + 1
``` with the kernel $$h = \begin{bmatrix} 1 & 1 & 1 \\ 1 & 0 & 1 \\ 1 & 1 & 1 \end{bmatrix},$$

where $L_h\{x[i,j]\}$ may be chosen to take the mean of the pixel 245 values x[i,j] over the neighborhood defined by $$h = \begin{bmatrix} 1 & 1 & 1 \\ 1 & 0 & 1 \\ 1 & 1 & 1 \end{bmatrix}.$$

For example, for the 3'3 kernel 550 centered on the pixel 245 x[3,4]=8, $$L_h\{x[3, 4]\} = \frac{15+1+1+15+1}{8} = \frac{33}{8},$$

and $b_1[3,4]=1$, since both $$L_h\{x[3, 4]\} = \frac{33}{8} \le x_1[3, 4] = 15$$

and $1 \le x_1[3,4]=15$ are true. Subtracting $b_1[3,4]=1$, from $x_1[3,4]=15$, in accord with the algorithm given above, gives the "new" value $x_2[3,4]=14$ to be used to calculate $b_2[3,4]$. Similarly, for the 3×3 kernel 560 centered on the pixel 245 x[7,3], $$L_h\{x[7, 3]\} = \frac{6 \times 15}{8} = \frac{45}{4},$$

and $b_1[7,3]=1$, since both $$L_h\{x[7, 3]\} = \frac{45}{4} \le x_1[7, 3] = 15$$

and $1 \le x_1[7,3]=15$ are true. Subtracting $b_1[7,3]=1$ from $x_1[7,3]=15$, in accord with the algorithm given above, gives the "new" value $x_2[7,3]=14$ to be used to calculate $b_2[7,3]$.

The M bit-planes $b_k[5,j]$ may be calculated for every pixel 245 along the $5^{th}$ row, for example, as indicated (in phantom) at 580, where the M bit-planes $b_k[i,j]$ for the other rows may be similarly calculated. The M bit-planes $b_k[i,j]$ calculated for every pixel 245 for every portion of every field time of every frame time may be further examples of redistributed bit sequences 280 for the corresponding words 240.

FIGS. 6A-6D schematically illustrate another simplified example showing a simpler algorithm than that used in the simulated example shown in FIGS. 9A, 9B, and 9D. FIGS. 6A-6D schematically illustrate images 600 of a background object 630, a dark 2×2 square, moving from left to right behind foreground objects including two sets of stripes 610 and 620, and one stationary object 640. As shown in FIG. 6A, for example, each of the images 600 includes an array of 8×8 pixels 245, labeled by row and column indices i and j, respectively. Also shown in FIG. 6A, for example, are the pixel 245 values x[i,j] according to a 4-bit gray scale arranged to encode 16 different gray scale values, as shown in FIGS. 1E-1H and FIGS. 2I-2K, for example.

Figure 6B:
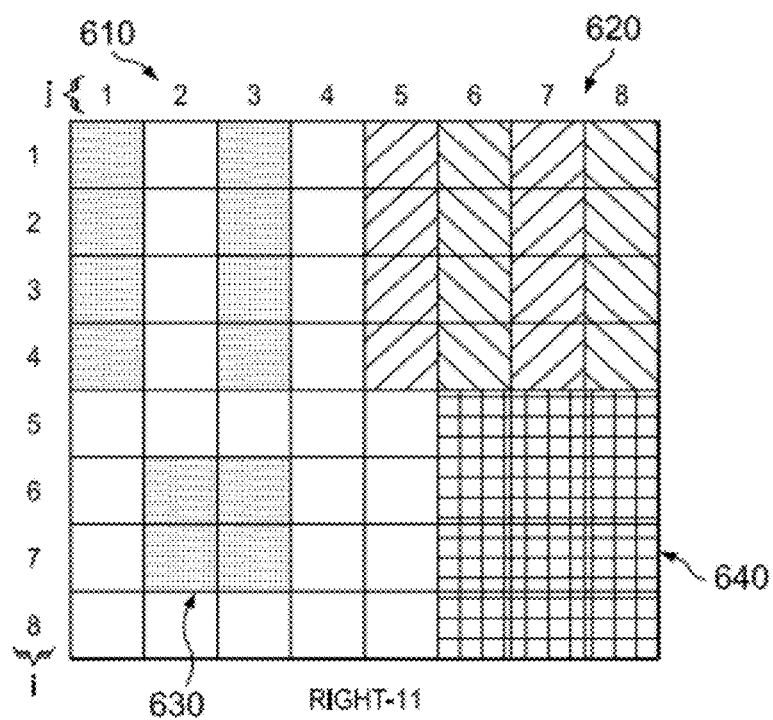
Figure 6C:
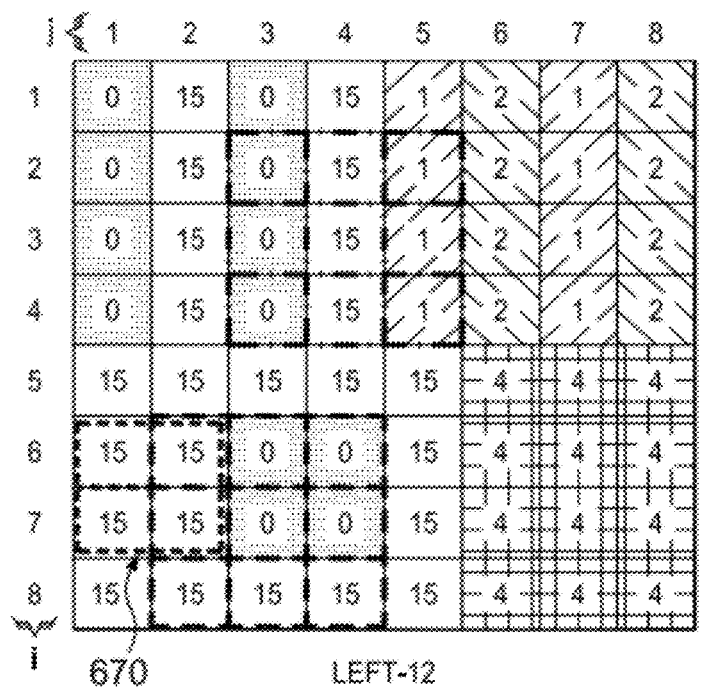
Figure 6D:
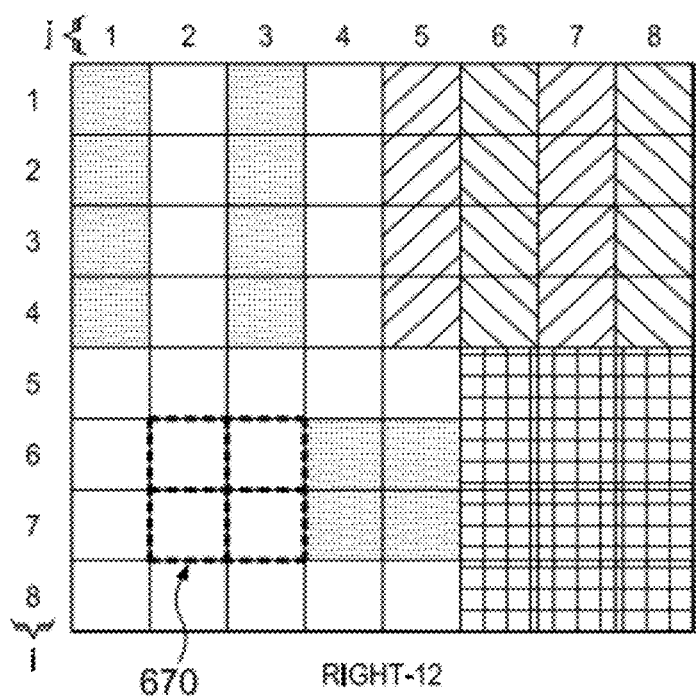

The object 630 is moving at a speed of about 2 pixels 245 per time frame, as may be seen by comparing FIGS. 6A and 6C, showing left images Left-11 and Left-12, respectively, and/or by comparing FIGS. 6B and 6D, showing right images Right-11 and Right-12, respectively, where the position of the object 630 in the previous time frame is indicated (in phantom) at 670. That the object 630 is a background object relative to the foreground objects 610, 620, and 640 may be seen by observing the parallax shift seen upon comparing FIGS. 6A and 6B, showing Left-11 and Right-12, and/or FIGS. 6C and 6D, showing Left-12 and Right-12, for example. Comparing FIGS. 6A and 6B, showing Left-11 and Right-11, for example, the left two pixels 245 x[6,1] and x[7,1] of the object 630 in Left-11 appear to be directly underneath the left four pixels 245 x[1,1] through x[4,1] of the left dark stripe of the higher contrast stripes 610 in Left-11, whereas the right two pixels 245 x[6,2] and x[7,2] of the object 630 in Left-11 appear to be directly underneath the left four pixels 245 x[1,2] through x[4,2] of the left light stripe of the higher contrast stripes 610 in Left-11. By way of contrast (due to stereoscopic parallax), the left two pixels 245 x[6,2] and x[7,2] of the object 630 in Right-11 appear to be directly underneath the left four pixels 245 x[1,2] through x[4,2] of the left light stripe of the higher contrast stripes 610 in Right-11, whereas the right two pixels 245 x[6,3] and x[7,3] of the object 630 in Right-11 appear to be directly underneath the right four pixels 245 x[1,3] through x[4,3] of the right dark stripe of the higher contrast stripes 610 in Right-11. Due to stereoscopic parallax, switching from Left-11 to Right-11 and/or Left-12 to Right-12, appears to cause the background object 630 to move from left to right relative to the foreground object 610 and/or appears to cause the foreground object 610 to move from right to left relative to the background object 630.

The respective bit-planes $b_k[i,j]$, for k=1 to k=M=15, may be calculated using the algorithm:

```
k = 1
x_k[i,j] = x[i,j] , ∀1 ≤ i ≤ P,1 ≤ j ≤ Q
while k ≤ M
  b_k[i,j] = (L_h{x[i,j]} ≤ x_k[i,j]∩1 ≤ x_k[i,j]) ,∀1 ≤ i ≤ P,1 ≤ j ≤ Q
  x_{k+1}[i,j] = x_k[i,j]−b_k[i,j] ,∀1 ≤ i ≤ P,1 ≤ j ≤ Q
  k = k + 1
end while
``` with the kernel $$h = \begin{bmatrix} 1 & 1 & 1 \\ 1 & 0 & 1 \\ 1 & 1 & 1 \end{bmatrix},$$

where $L_h\{x[i,j]\}$ may be chosen to take the mean of the pixel 245 values x[i,j] over the neighborhood defined by $$h = \begin{bmatrix} 1 & 1 & 1 \\ 1 & 0 & 1 \\ 1 & 1 & 1 \end{bmatrix}.$$

For example, for the 3×3 kernel 650 centered on the pixel 245 x[3,4]=15, $$L_h\{x[3,4]\} = \frac{15+1+1+15+1}{8} = \frac{33}{8} = 4.125,$$

and $b_1[3,4]=1$, since both $$L_h\{x[3,4]\} = \frac{33}{8} = 4.125 \le x_1[3,4] = 15$$

and $1 \le x_1[3,4]=15$ are true. Subtracting $b_1[3,4]=1$ from $x_1[3,4]=15$, in accord with the algorithm given above, gives the "new" value $x_2[3,4]=14$ to be used to calculate $b_2[3,4]$. Similarly, for the 3×3 kernel 660 centered on the pixel 245 x[7,3], $$L_h\{x[7,3]\} = \frac{6 \times 15}{8} = 11.25,$$

and $b_1[7,3]=1$, since both $$L_h\{x[7,3]\} = \frac{45}{4} = 11.25 \le x_1[7,3] = 15$$

and $1 \le x_1[7,3]=15$ are true. Subtracting $b_1[7,3]=1$ from $x_1[7,3]=15$, in accord with the algorithm given above, gives the "new" value $x_2[7,3]=14$ to be used to calculate $b_2[7,3]$.

Figure 6E:
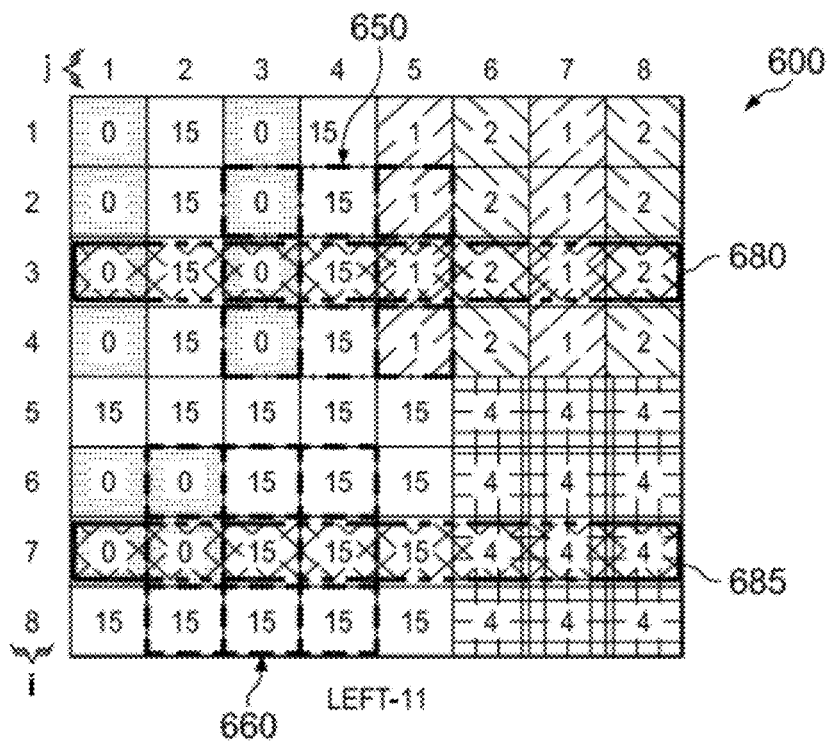
Figure 6F:
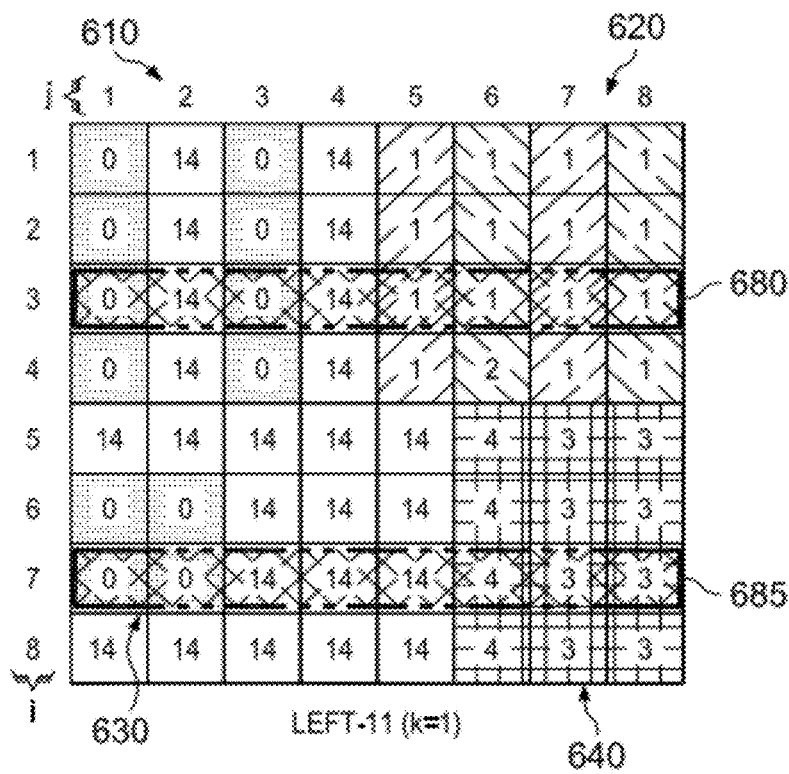

Note that the bit-plane values $b_1[i,j]$ for all the rows and columns $1 \le i \le P, 1 \le j \le Q$ are subtracted from $x_1[i,j]$ for all the rows and columns, according to the algorithm given above. In other words, the algorithm given above involves the simultaneous global updating of the entire image at each step of the process. For example, FIG. 6F shows what the image Left-11 of FIG. 6E would look like at the k=1 level, after the bit-plane values $b_1[i,j]$ for all the rows and columns $1 \le i \le P, 1 \le j \le Q$ are subtracted from $x_1[i,j]$ for all the rows i and columns j, according to the algorithm given above. Similarly, FIG. 6H shows what the image Right-11 of FIG. 6G would look like at the k=1 level. Likewise, FIGS. 6I-6JJ show what the image Left-11 of FIG. 6E and the image Right-11 of FIG. 6G would look like (algorithmically) at the k=2 level through the k=15 level, respectively.

Figure 6G:
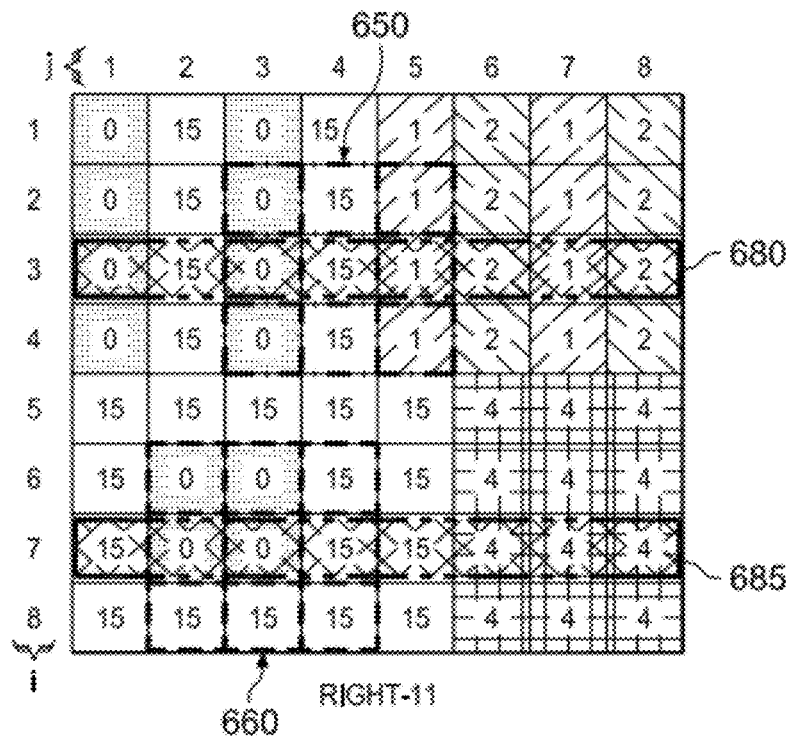
Figure 6H:
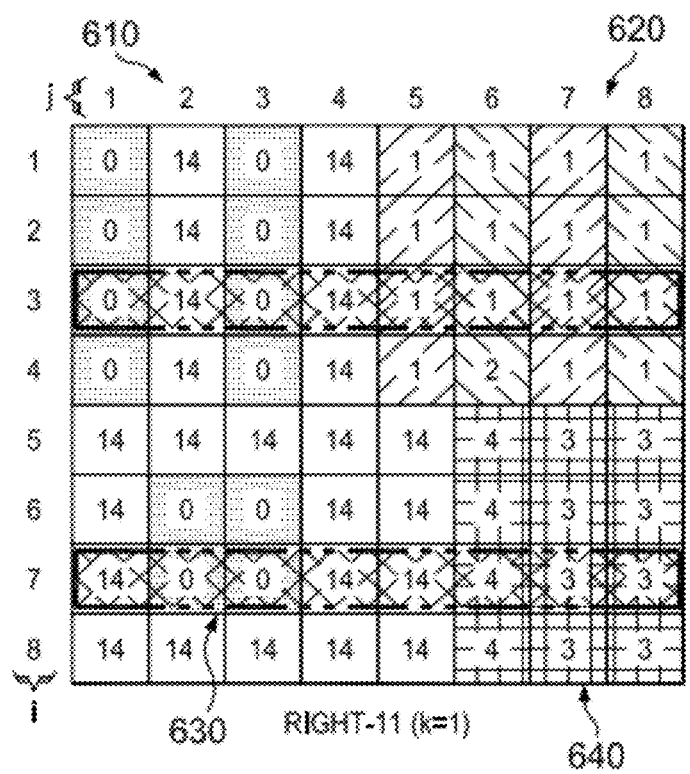
Figures 6I, 6J:
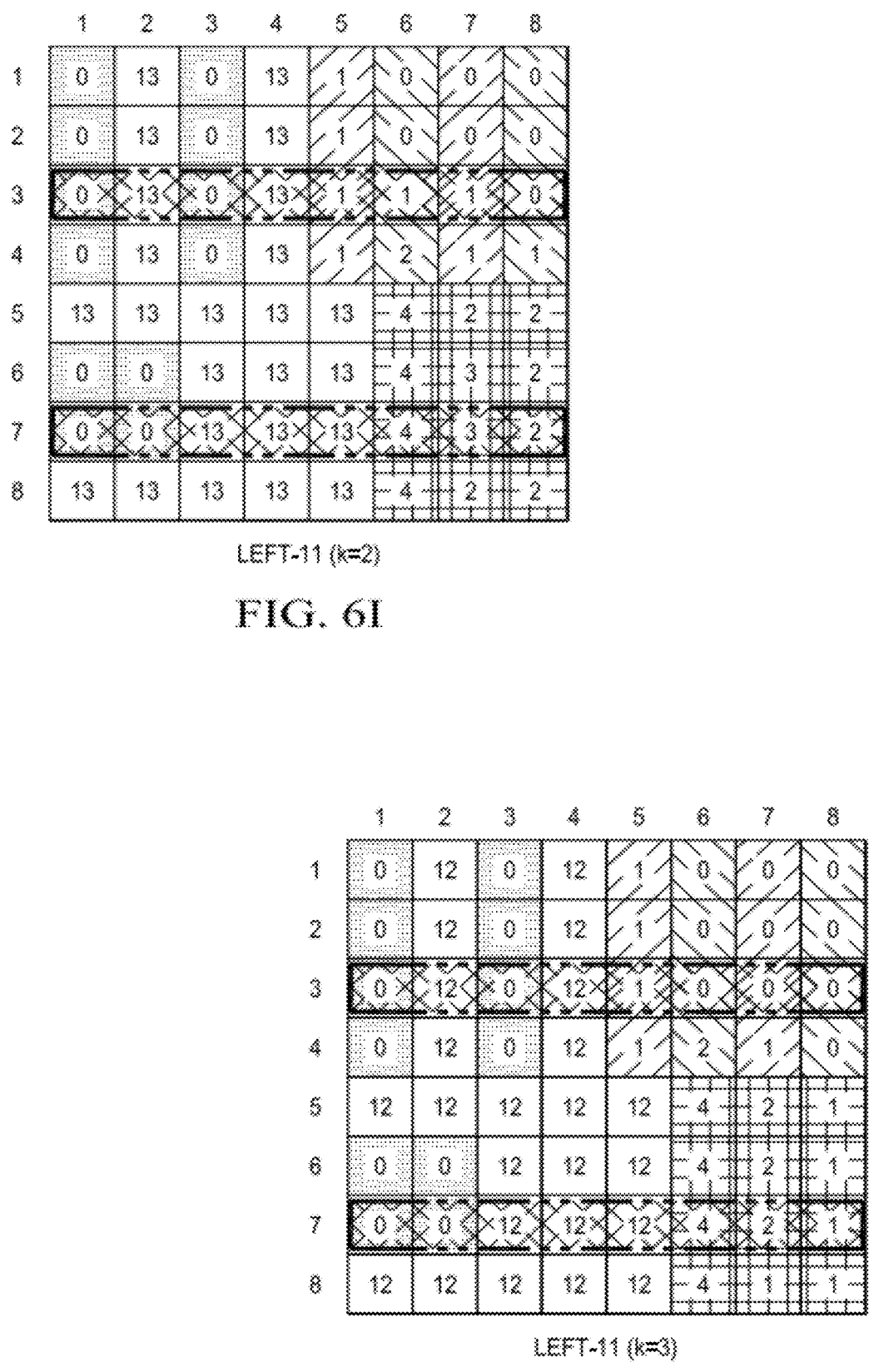
Figures 6M, 6N:
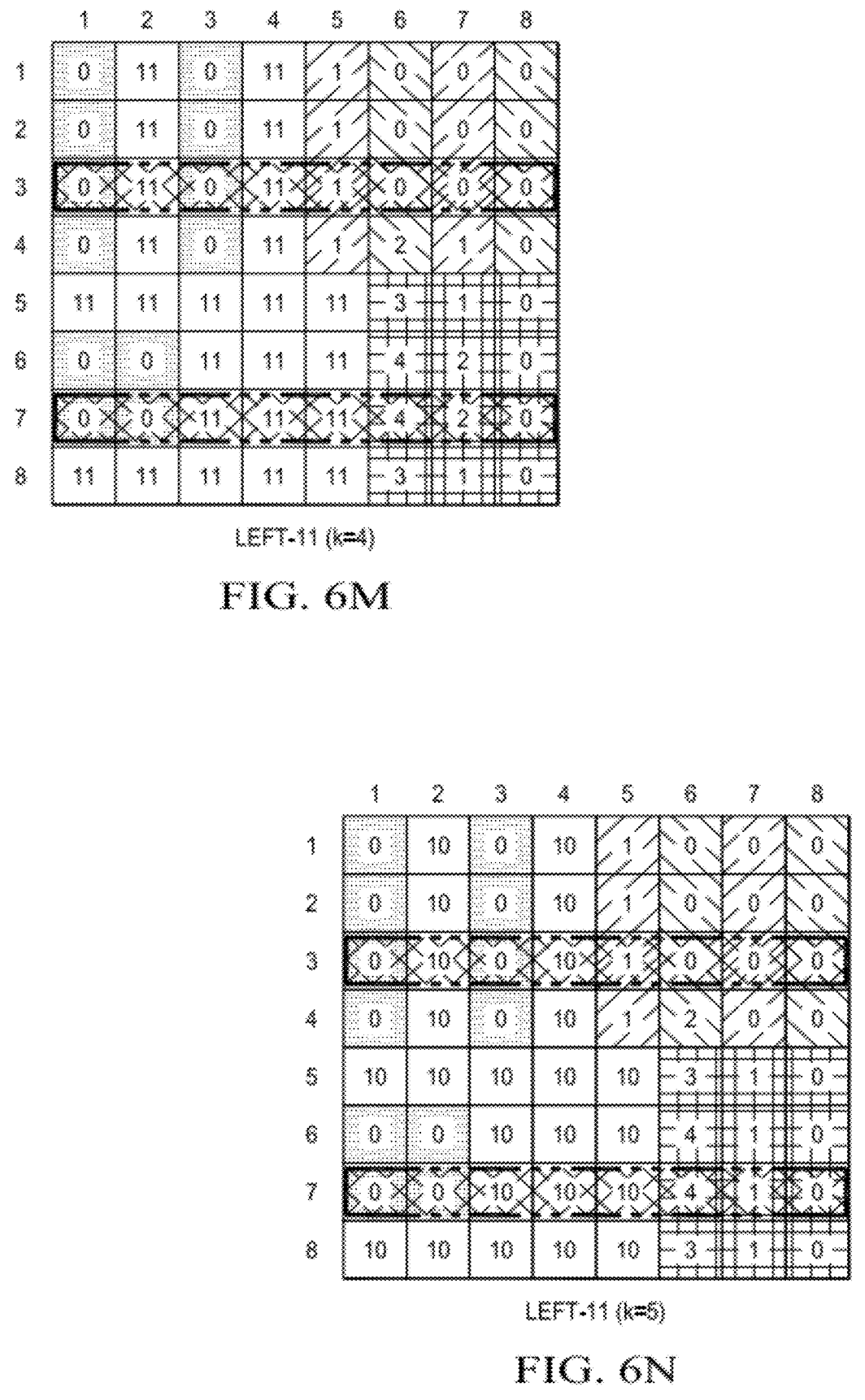
Figures 6O, 6P:
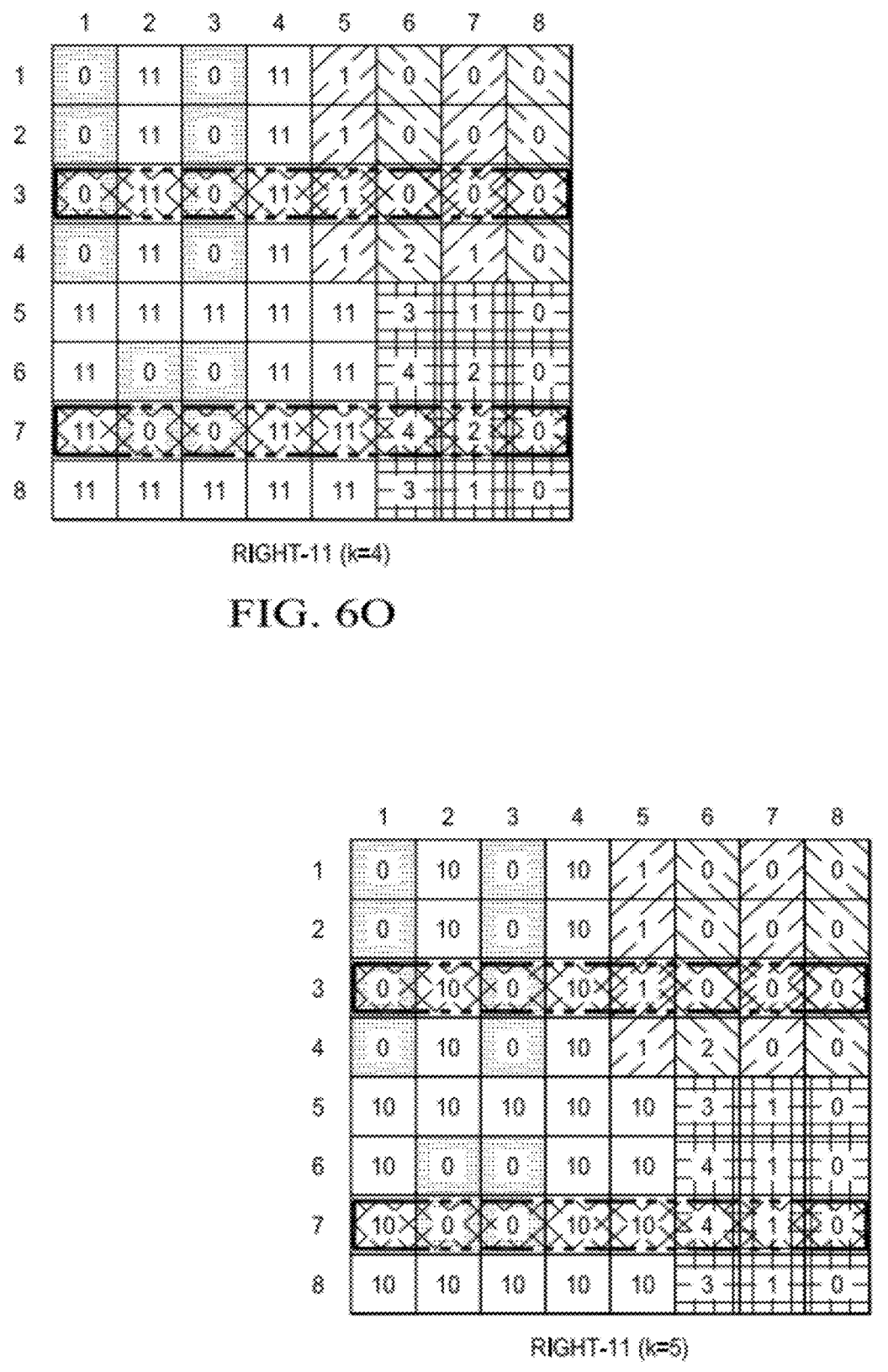
Figures 6Q, 6R:
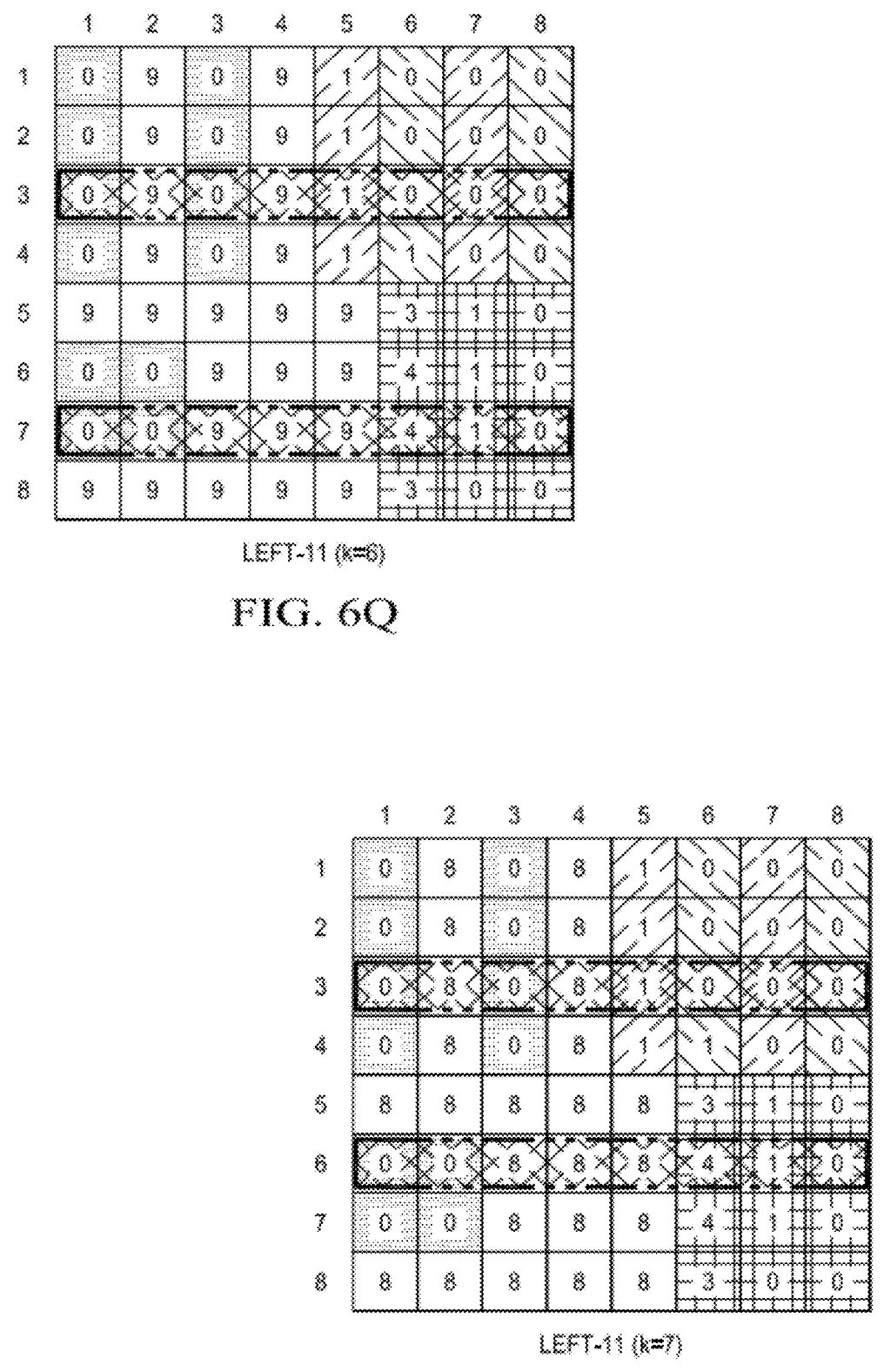
Figures 6S, 6T:
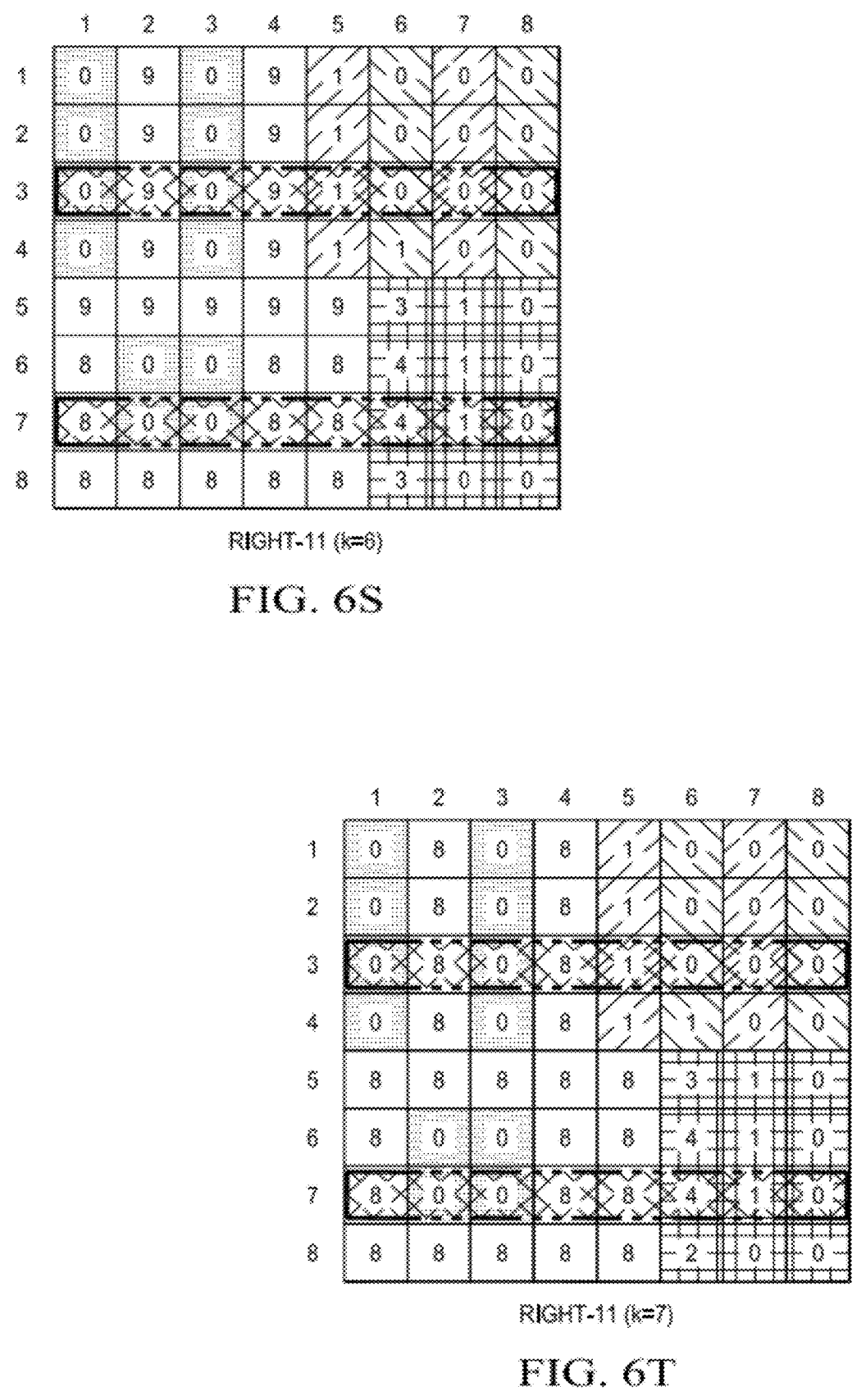
Figures 6U, 6V:
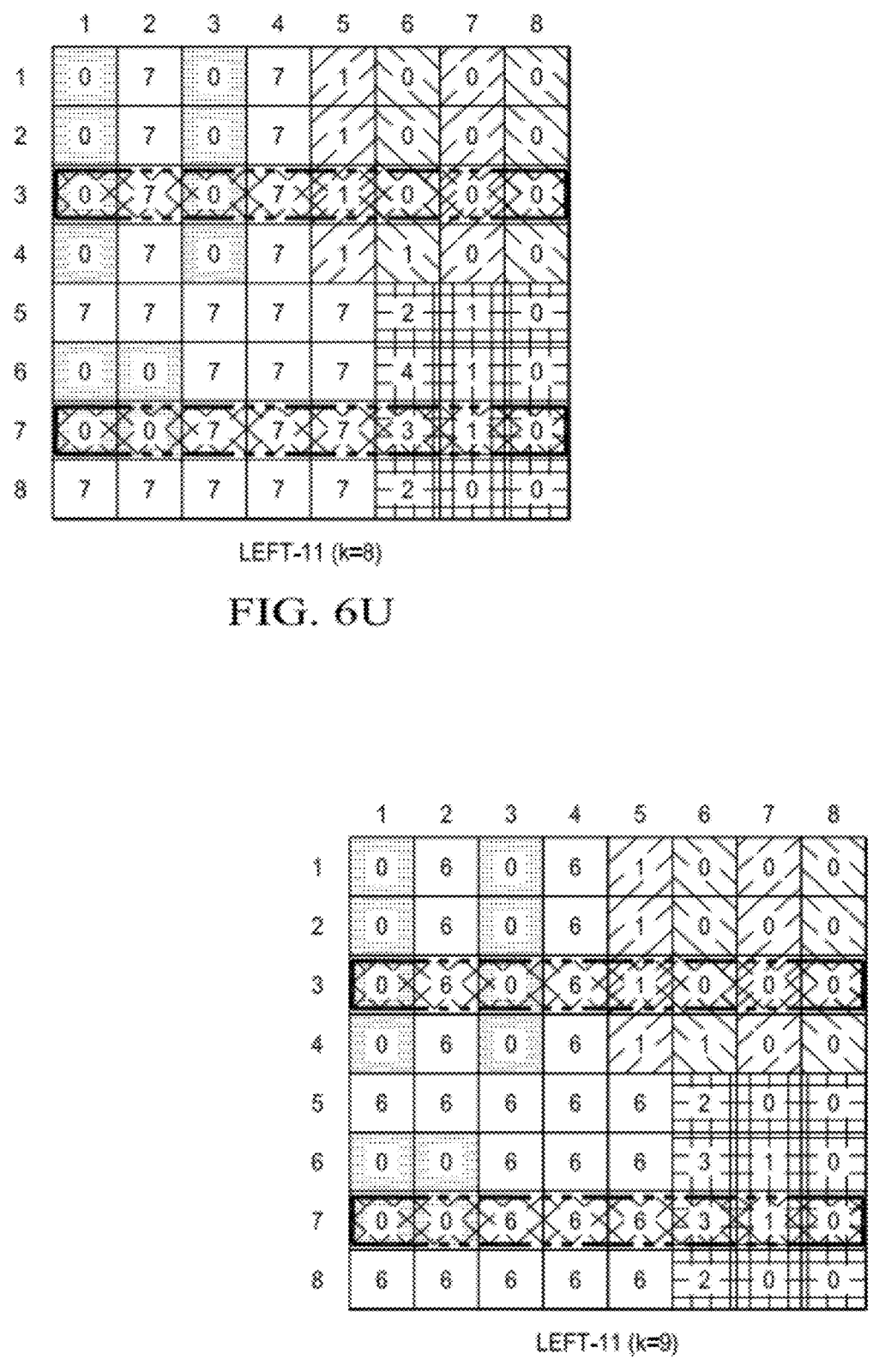
Figures 6W, 6X:
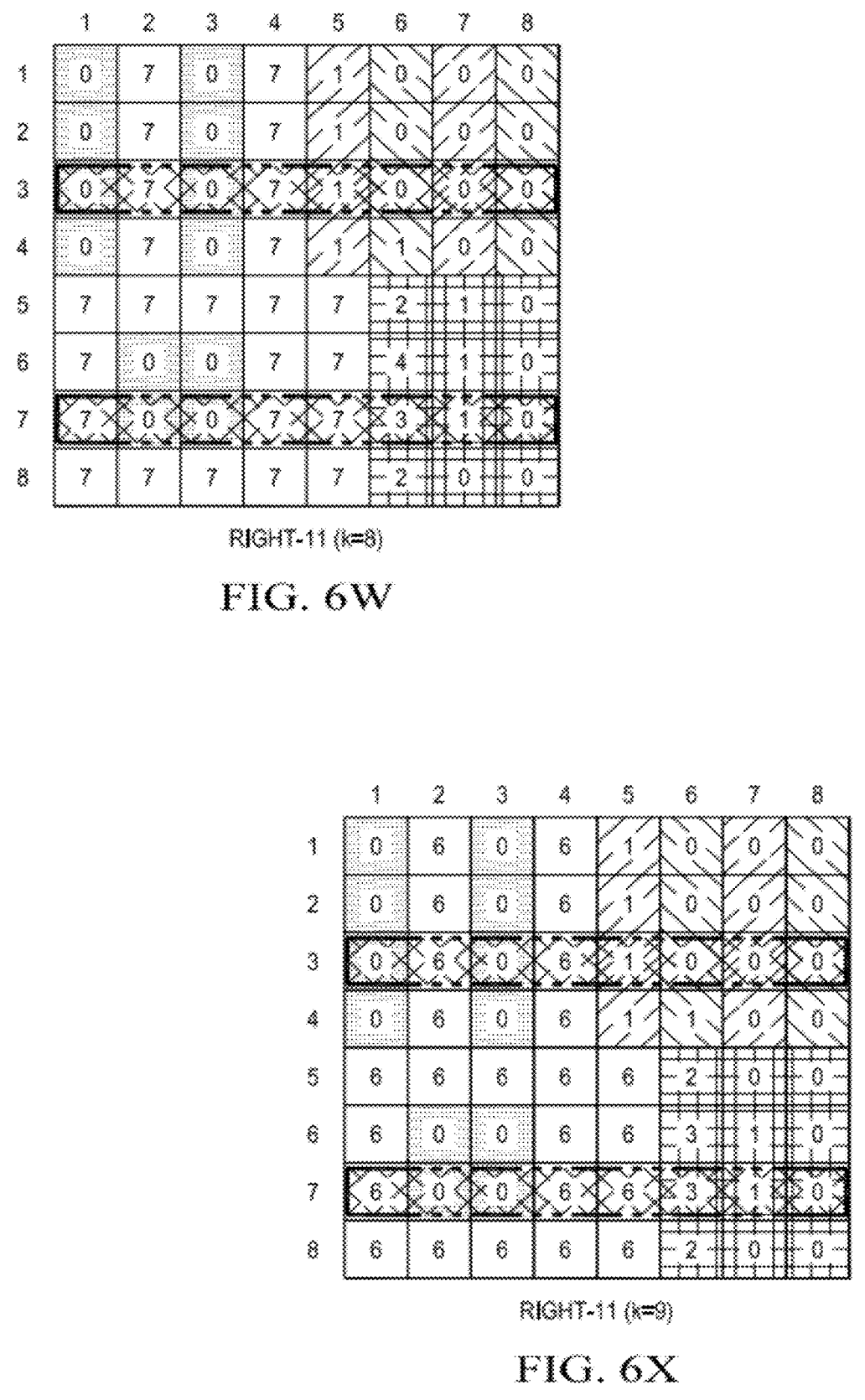
Figures 6Y, 6Z:
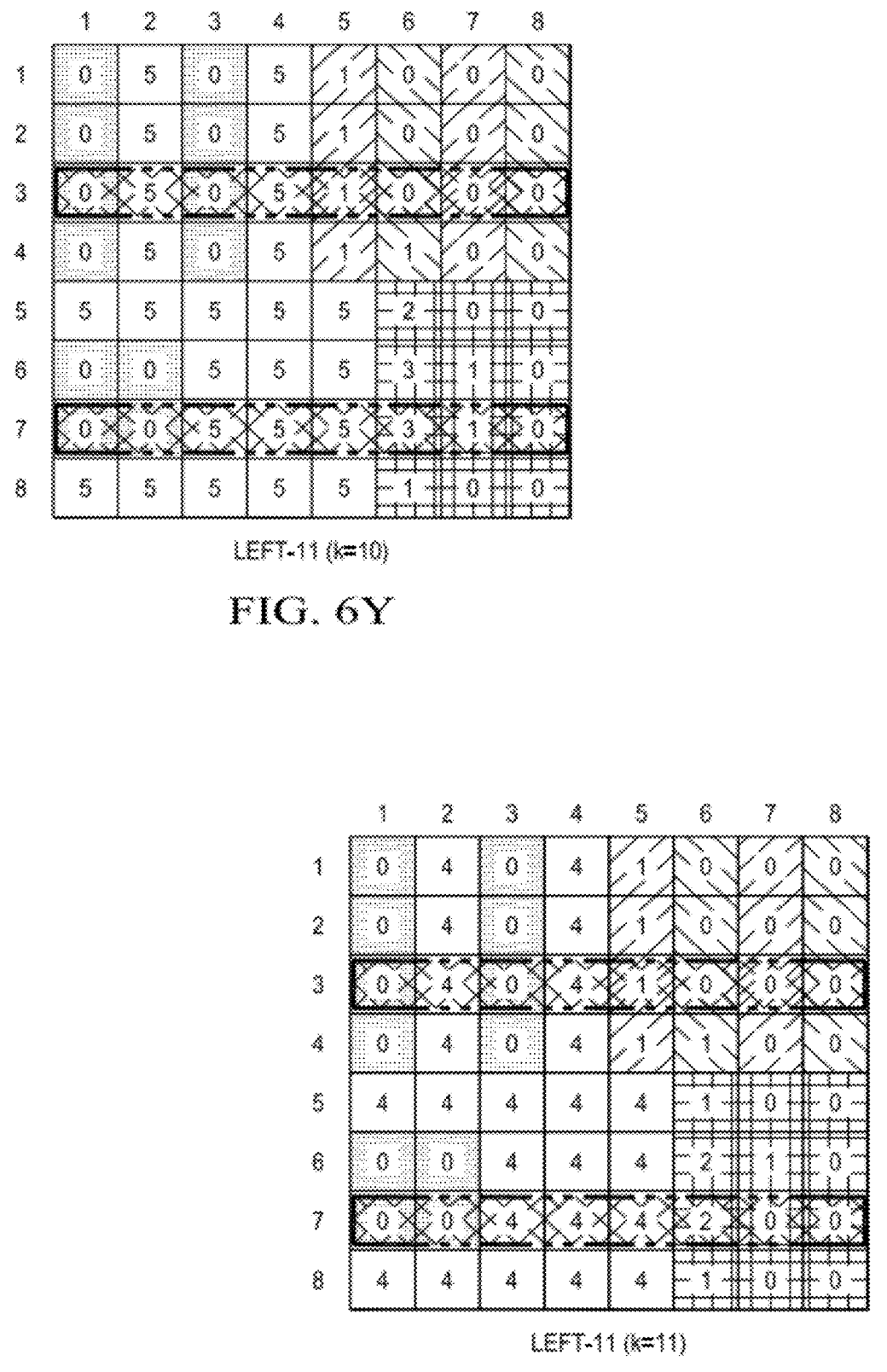
Figure 6K:
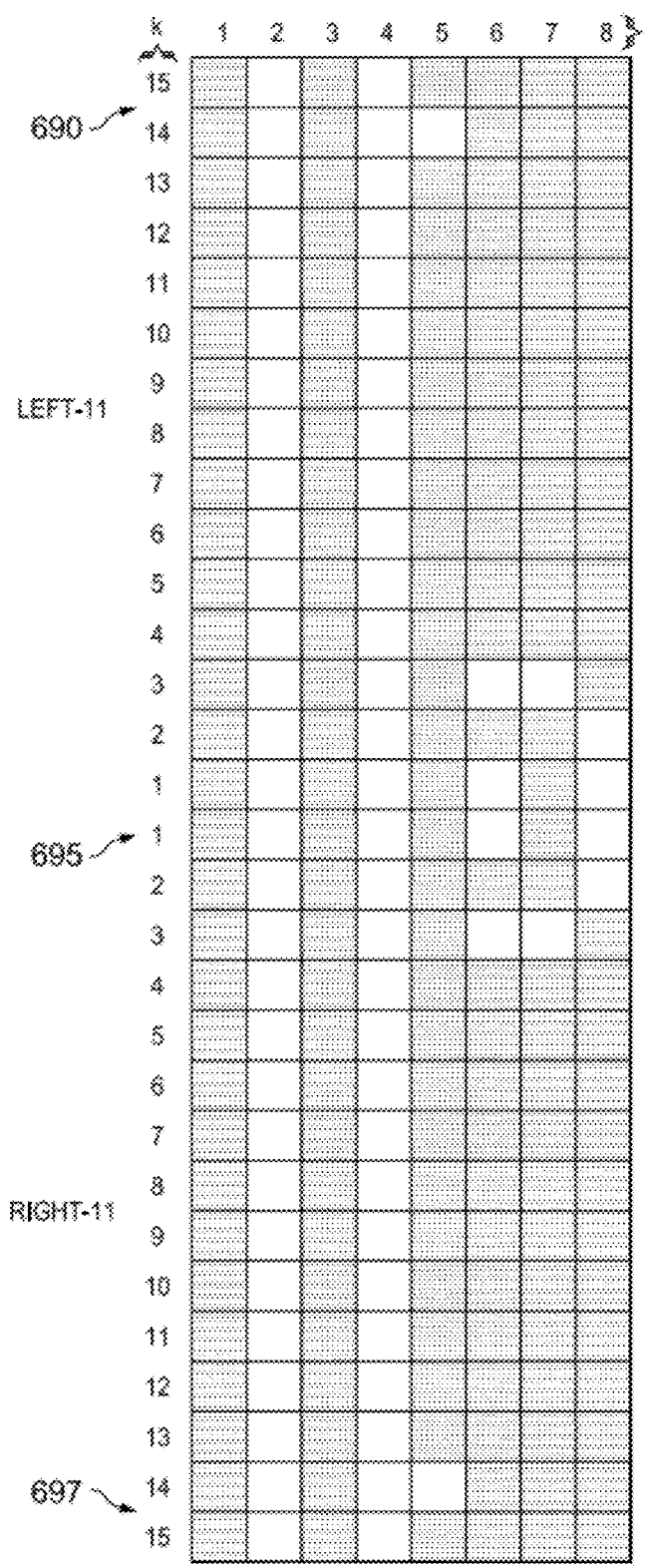
Figure 6K:
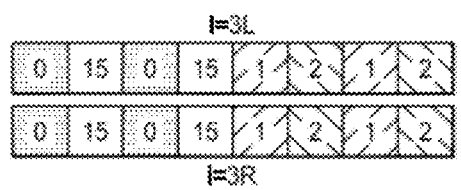
Figure 6L:
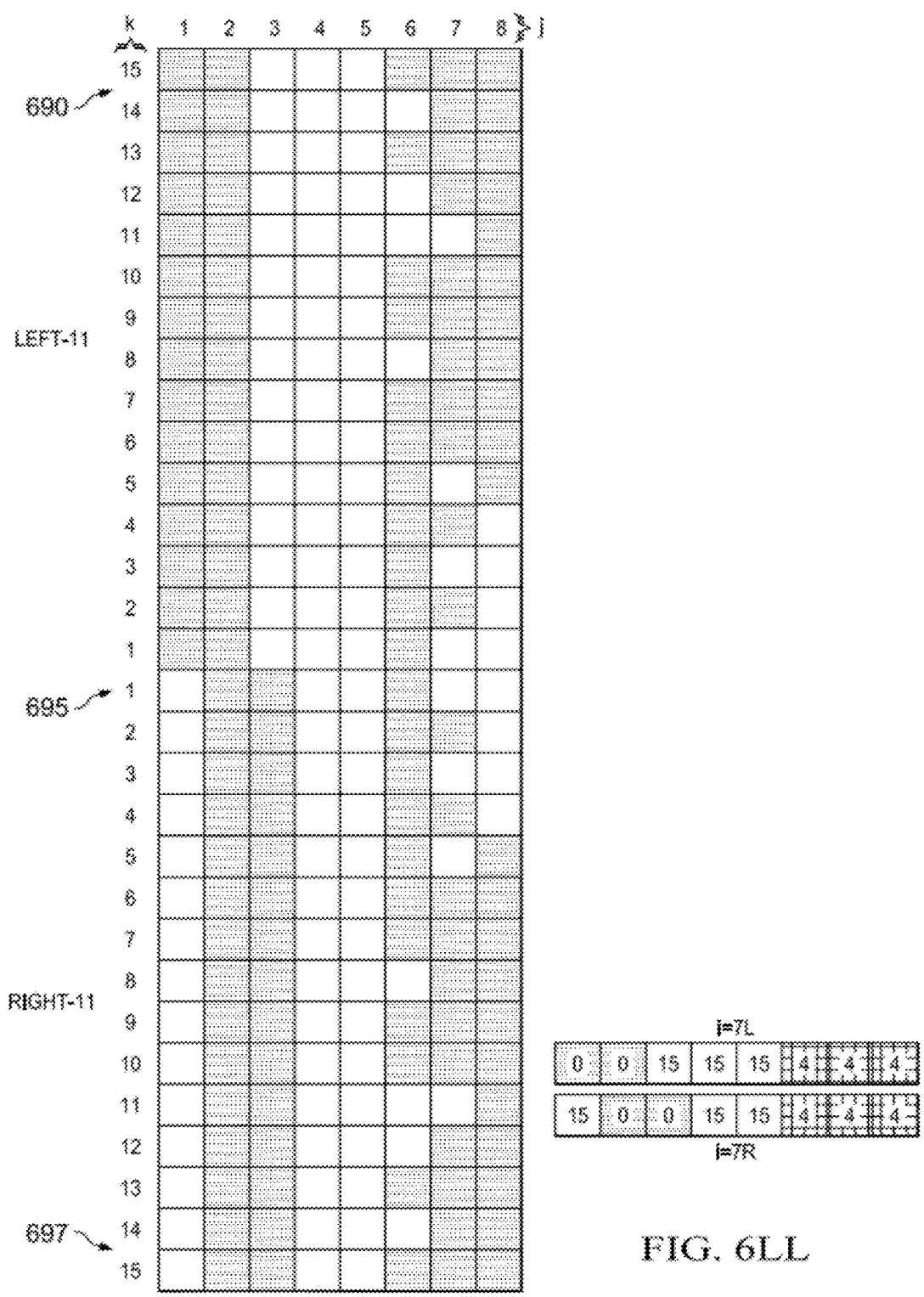

Due to the nature of the particular algorithm given above, any zero pixel 245 value, such as x[3,3]=0, remains a zero value, since $1 \le x_k[3,3]=0$ is false for all $0 \le k \le 15$, where $x_{k=0}[i,j]≡x[i,j]$ for all rows and columns, and the corresponding bit-plane values $b_k[3,3]=0$ for all $1 \le k \le 15$, as shown, for example in the third column of FIG. 6KK Additionally, again due to the nature of the algorithm given above, any maximal pixel 245 value, such as $x[7,4]=15=x_0[7,4]$ will have corresponding bit-plane values $b_k[7,4]=1$ for all $1 \le k \le 15$, as shown, for example in the fourth column of FIG. 6LL.

As described above, the M bit-planes $b_k[i,j]$ calculated for every pixel 245 for every portion of every field time of every frame time may be further examples of redistributed bit sequences 280 for the corresponding words 240. As shown in FIG. 6E, for example, showing the left image Left-11, as the kernels 650 and 660 move along their respective rows 3 and 7, as indicated (in phantom) at 680 and 685, respectively, the corresponding M bit-planes $b_k[3,j]$ and $b_k[7,j]$, for $1 \le k \le M$, may be calculated, as described above.

As shown in FIG. 6G, for example, showing the right image Right-11, one or more kernels, such as the kernels 650 and 660, may move along their respective rows and/or columns, and the corresponding M bit-planes $b_k[i,j]$, for $1 \le k \le M=15$, $1 \le i,j \le 8$, may be calculated, as described above. The M bit-plane values $b_k[i,j]$ for pixels 245 at one or more edges of the array of pixels 245 may be specified by any convenient and/or appropriate and/or suitable algorithm, such as the one used to calculate the values as shown in FIGS. 6KK and 6LL, which merely sets equal to zero all values outside of the respective edge pixels 245 and/or corner pixels 245, as needed.

As shown in FIG. 6KK, for example, the $M=M_L=15$ bit-planes $b_k[3,j]$, k=1, 2, ...,15 for the third row (i=3 L) of the left image Left-11 (as shown at 680 in FIG. 6E) and the $M=M_R=15$ bit-planes $b_k[3,j]$, k=1, 2, ...,15 for the third row (i=3 R) of the right image Right-11 (as shown at 680 in FIG. 6G) may be schematically illustrated. The $M=M_R=15$ bit-planes $b_k[3,j]$, $k=1, 2, \ldots, 15$ for the third row (i=3) of the right image Right-11 may be shown in reverse order, starting from $b_{15}[3,j]$ at the bottom 697 (the beginning of the frame time) up to $b_1[3,j]$ at the middle 695 (about the middle of the frame time), and then the $M=M_L=15$ bit planes $b_k[3,j]$, $k=1,2,\ldots,15$ for the third row (i=3) of the left image Left-11 may be shown, in order, starting from $b_1[3,j]$ at the middle 695 (about the middle of the frame time) and proceeding upward to $b_{15}[3,j]$ at the top 690 (the end of the frame time). The M=15 bit-planes $b_k[i,j]$, $k=1,2,\ldots,15$ for all the i rows (i=1,2,\ldots,8) of all the left and right images may be processed similarly. FIG. 6LL, for example, schematically illustrates the bit-planes for the seventh rows (i=7 L) and (i=7 R), as shown at 685 in FIG. 6E and 6G, processed similarly. The bit-plane values $b_k[i,j]$, $k=1, 2, \ldots, 15$ for the various levels $k=1, 2, \ldots, 15$ may be tabulated by comparing the algorithmic image values shown in FIGS. 6F and 6H-6JJ for neighboring levels. Note also that the number of white squares in each half column in FIGS. 6KK and 6LL equals the respective pixel value in the corresponding rows 680 and 685 shown in FIGS. 6E and 6G In this way, the bit-planes having more details of the respective images, the more frequently alternating bit-planes, show up near the center of the frame time and/or field time for the respective image. Note that, even in this highly simplified example, according to this illustrative algorithm, the more frequently alternating bit-planes $b_k[i,j]$, which may be associated with the portions of the images 600 with the higher-frequency, more detailed, higher sub-band spatial components (the relatively high contrast foreground stripes 610 and 620, for example, as shown at the left in FIGS. 6KK and 6LL), show up near the center 695 of the frame time and/or field time. Correspondingly, the less frequently alternating bit-planes $b_k[i,j]$, which may be associated with the portions of the images 600 with the lower-frequency, less detailed, lower sub-band spatial components (the dark background object 630 against a lot of relatively low contrast bright background and/or foreground, for example, as shown at the right in FIGS. 6KK and 6LL), show up near the beginning 697 and/or the end 690 of the frame time and/or field time. Note also that the stereoscopic parallax shift of the dark background object 630 relative to the relatively high contrast foreground stripes 610 may be clearly visible in the bit-planes displayed, as shown in FIG. 6LL, for example.

Figure 7A:
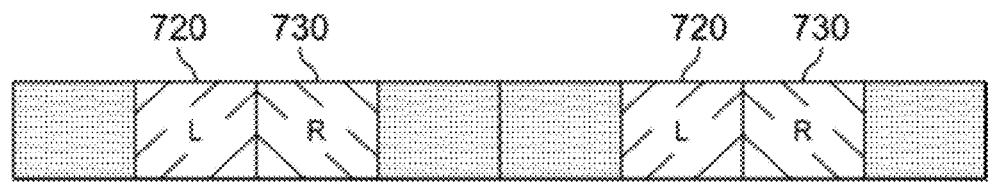
FIGS. 7A-7D schematically illustrate various illustrative embodiments of a method and system useful for reducing stereoscopic phase-lag distortion under motion in a 3-dimensional video display, according to the present disclosure, by using a front-weighted thermometer scale for the right image and a back-weighted thermometer scale for the left image.
Figure 7B:
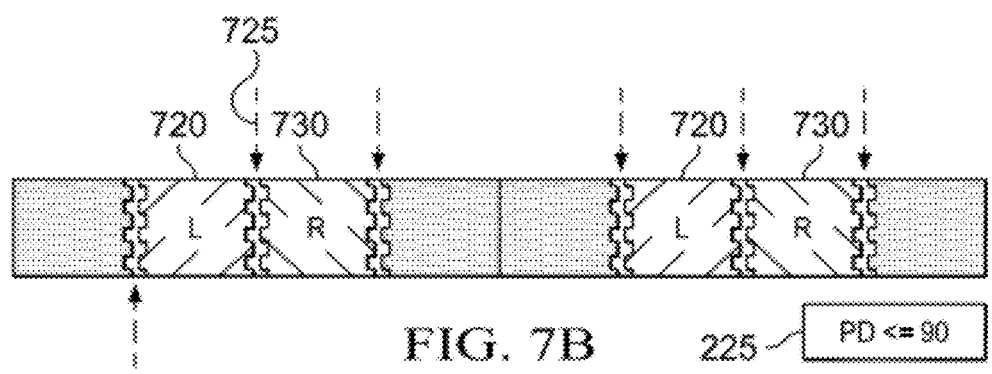
Figure 7C:
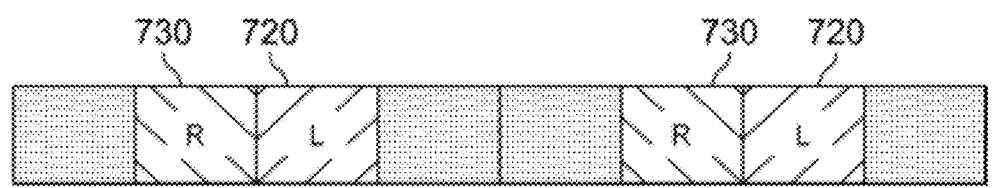
Figure 7D:
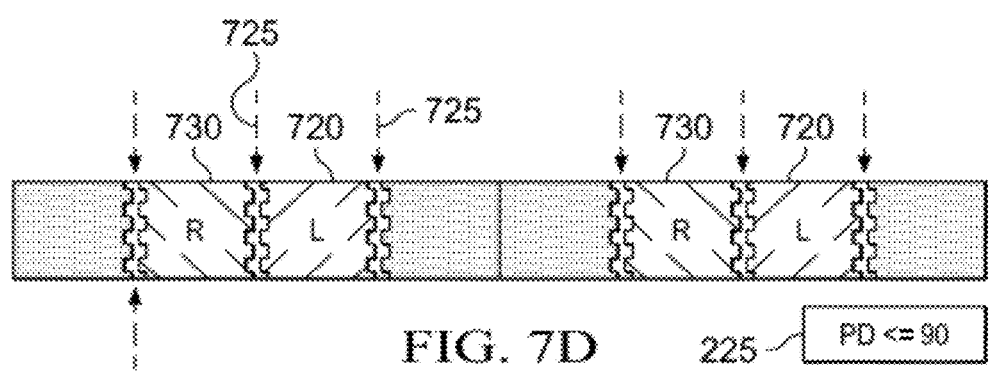

FIGS. 7A-7B schematically illustrate various illustrative embodiments of a method and system useful for reducing stereoscopic phase-lag distortion under motion in a 3-dimensional video display, according to the present disclosure, by using a front-weighted thermometer scale for the right image 730 and a back-weighted thermometer scale for the left image 720. In various aspects, the method may further comprise introducing a blanking interval, as indicated by the (phantom) arrows 725 as shown in FIG. 7B, for example, for a portion of a non-zero switching time of a polarizer arranged to switch between the left image 720 and the right image 730, depending on a brightness level of at least one pixel 245 of the left image 720 and/or the right image 730, wherein the blanking intervals 725 may be introduced unless the brightness level is greater than a predetermined threshold brightness level. The blanking intervals 725 may help alleviate the problem of light leakage between the left image 720 and the right image 730 that is caused by the non-zero switching time of the polarizer arranged to switch between the left image 720 and the right image 730. In various illustrative embodiments, this leakage problem may be addressed by introducing the blanking interval 725, as shown in FIG. 7B, for example, for at least a portion of the non-zero switching time of the polarizer. The blanking interval 725 provides an interval of time that is blanked during at least a portion of the non-zero switching time of the polarizer.

The blanking segment or interval 725 may also be turned "on" (by not being introduced, for example) for the brightest levels, so as not to reduce brightness, such as peak brightness, for example. FIG. 7B, for example, schematically illustrates using blanking intervals 725, in combination with the thermometer scale, as used in various illustrative embodiments described above, as shown in FIGS. 2A-2H, 2J-2K, and FIG. 7A, for example. Alternative illustrative embodiments may use the blanking intervals 725 with other pulse width modulation (PWM) sequences, as well. At dimmer light levels, the blanking intervals 725 may still be used, with appropriate widths and/or for suitable intervals of time, while at the highest light levels, the blanking intervals 725 may not need to be used. FIG. 7A, for example, may schematically illustrate the "full on" state obtained by not using any blanking intervals 725.

FIG. 8 schematically illustrates various alternative illustrative embodiments of a method and system useful for reducing stereoscopic phase-lag distortion under motion in a 3-dimensional video display, according to the present disclosure. For example, as shown in FIG. 8, the higher-frequency (higher sub-band, more detailed, less blurry) spatial components of the image may be treated differently than the lower-frequency (lower sub-band, less detailed, more blurry) spatial components of the image. The higher-frequency (higher sub-band, more detailed, less blurry) spatial components of the right (R) image 830 may be placed as close together as possible with the higher-frequency (higher sub-band, more detailed, less blurry) spatial components of the left (L) image 820, as indicated by the arrows at 840, to reduce the phase difference 825 as much as possible for those higher-frequency (higher sub-band, more detailed, less blurry) spatial components. The phase difference 225 of the lower-frequency (lower sub-band, less detailed, more blurry) spatial components of the right (R) image 830 from the lower-frequency (lower sub-band, less detailed, more blurry) spatial components of the left (L) image 820 may be allowed to be larger than the phase difference 825, as indicated (in phantom) by the arrows at 850, but this may not matter much since the shifting of something blurry is not as noticeable as the shifting of something detailed.

The phase difference 825 may be almost zero for the highest-frequency (highest sub-band, most detailed, least blurry) spatial components and may increase as the frequency of the spatial components decreases. However, since the shifting of a blurry sub-image is not as noticeable as the shifting of a detailed sub-image, the overall effect is an apparent phase difference 825 of something very close to zero and/or substantially zero for the entire image 820, 830.

There may be more expenses involved in the implementation of various illustrative embodiments using more advanced algorithms than various illustrative embodiments using only the thermometer scale, because of the filtering involved in decomposing the images 820, 830 into the higher-frequency (higher sub-band, more detailed, less blurry) spatial components and the lower-frequency (lower sub-band, less detailed, more blurry) spatial components. However, less distortion may be introduced in various illustrative embodiments using more advanced algorithms than in various illustrative embodiments using only the thermometer scale, because various illustrative embodiments using more advanced algorithms may not introduce distortion caused by the phase difference (phase shift) 225 depending on the gray level, perhaps not just eye-to-eye, but also pixel-to-pixel for one eye, in various illustrative embodiments using only the thermometer scale, as described above. There are many ways to accomplish this decomposition of the images 820, 830 into the higher-frequency (higher sub-band, more detailed, less blurry) spatial components and the lower-frequency (lower sub-band, less detailed, more blurry) spatial components, as described in more detail below.

FIGS. 9A-9D schematically illustrate a 2-dimensional image of an object (a man looking through a camera on a tripod) moving to the right at 12 pixels per frame, providing a simulated example with elements that are representative of various illustrative embodiments of a method and system useful for reducing stereoscopic phase-lag distortion under motion in a 3-dimensional video display, according to the present disclosure. As shown in FIG. 9A, for example, in this particular simulation, the original image was processed by the algorithm discussed above, where bit-planes $b_k[i,j]$ were calculated using the following:

```
k = 1
while k ≤ M
  b_k[i,j] = (L_h{x[i,j]} ≤ x[i,j]]∩1 ≤ x[i,j])
  x[i,j] = x[i,j]−b_k[i,j]
  k = k + 1
end while
``` with M=64, where (y∩z) is the logical AND operation, which only returns a value of 1 when both y and z are true, and otherwise returns a value of 0, and the operator $L_h\{x[i,j]\}$ calculates a local average around the pixel 245 $x[i,j]$ based on some kernel h. For the simulated example, as shown in FIGS. 9A, 9B, and 9D, the kernel $$h = \begin{bmatrix} 0 & 1 & 1 & 1 & 0 \\ 1 & 1 & 1 & 1 & 1 \\ 0 & 1 & 1 & 1 & 0 \end{bmatrix}$$

was used. For the simulated example, as shown in FIGS. 9A, 9B, and 9D, the operator $L_h\{x[i,j]\}$ was chosen to take the mean of maximum and minimum pixel 245 values $x[i,j]$ over the neighborhood defined by the kernel $$h = \begin{bmatrix} 0 & 1 & 1 & 1 & 0 \\ 1 & 1 & 1 & 1 & 1 \\ 0 & 1 & 1 & 1 & 0 \end{bmatrix},$$

for example.

FIG. 9B, in this particular simulation, shows how the row corresponding to the phantom line 900 in FIG. 9A may be displayed, for this 2-dimensional image, similar to the way the bit-planes $b_k[i,j]$ for the row 680 with i=3 in the left image Left-11 of FIG. 6E and the right image Right-11 of FIG. 6G may be displayed in FIG. 6KK, for the 3-dimensional stereographic images. The bit-planes $b_k[i,j]$ are first shown in reverse order starting from the top 990 down to the middle 995, and then again, in order, starting from the middle 995 and proceeding downward to the bottom 997. In this way, bit-planes $b_k[i,j]$ containing the details of the image show up near the center or middle 995 of the frame time (and/or field time portion thereof). FIG. 9C schematically illustrates the image of FIG. 9A under motion and moving without processing according to the algorithm described above. FIG. 9D schematically illustrates the image of FIG. 9A under motion and moving with processing according to the algorithm described above. Comparing FIG. 9C with FIG. 9D indicates that the algorithm described above may cause the image to look much sharper under motion. In this simulated example, there is horizontal motion by 12 pixels per frame.

Figure 10:
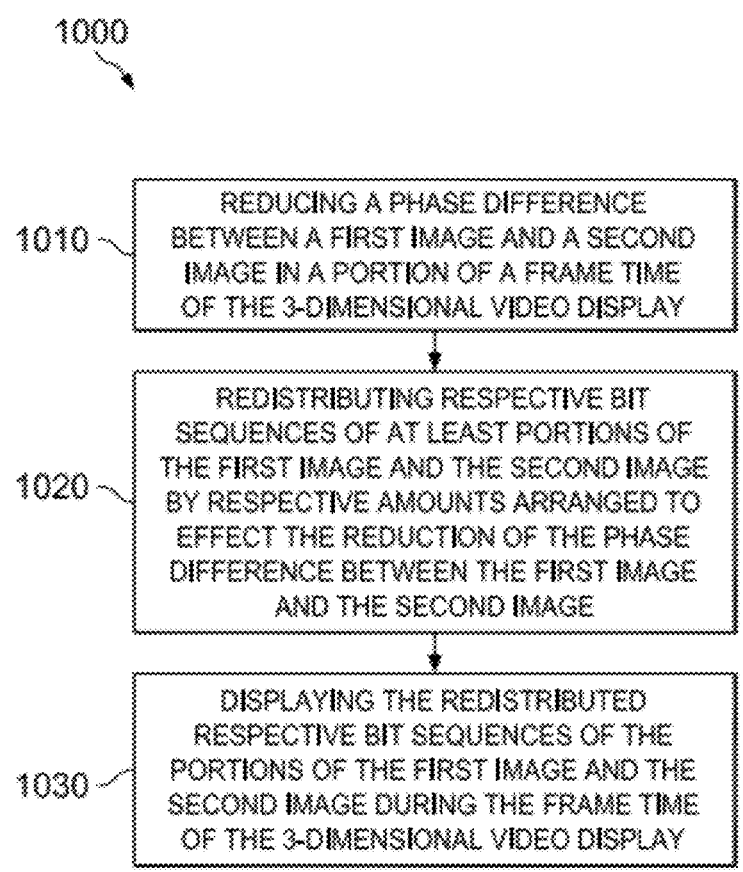
FIG. 10 schematically illustrates various illustrative embodiments of a method useful for reducing stereoscopic phase-lag distortion under motion in a 3-dimensional video display, according to the present disclosure.

FIG. 10 schematically illustrates various illustrative embodiments of a method 1000 useful for reducing stereoscopic phase-lag distortion under motion in a 3-dimensional video display, according to the present disclosure. The method 1000 comprises reducing a phase difference between a left image and a right image in a portion of a frame time of the 3-dimensional video display, as shown at 1010. The method 1000 also comprises redistributing respective bit sequences of at least portions of the left image and the right image by respective amounts arranged to effect the reduction of the phase difference between the left image and the right image, as shown at 1020. The method 1000 also comprises displaying the redistributed respective bit sequences of the portions of the left image and the right image during the frame time of the 3-dimensional video display, as shown at 1030.

In accordance with the present disclosure, a device, a system, and a method are disclosed that are useful for reducing stereoscopic phase-lag distortion under motion in a 3-dimensional video display. According to various illustrative embodiments, a device, system, and method for reducing stereoscopic phase-lag distortion under motion in a 3-dimensional video display are described. In one aspect, a method comprises reducing a phase difference between a first image and a second image in a portion of a frame time of the 3-dimensional video display. The method also comprises redistributing respective bit sequences of at least portions of the first image and the second image by respective amounts arranged to effect the reduction of the phase difference between the first image and the second image. The method also comprises displaying the redistributed respective bit sequences of the portions of the first image and the second image during the frame time of the 3-dimensional video display.

In various aspects, the method further comprises using a thermometer scale.

In various aspects, the method further comprises using a front-weighted thermometer scale for the second image and a back-weighted thermometer scale for the first image.

In various aspects, the method further comprises reducing the phase difference depending on a gray scale value being displayed.

In various aspects, the method further comprises reducing an average phase difference to substantially less than about 90°, depending on a gray scale value being displayed.

In various aspects, the method further comprises treating a first portion of higher-frequency spatial components of the first image and the second image differently than a second portion of lower-frequency spatial components of the first image and the second image.

In various aspects, the method further comprises treating a first portion of higher-frequency spatial components of the first image and the second image differently than a second portion of lower-frequency spatial components of the first image and the second image by having the first portion of the higher-frequency spatial components of the first image placed as close together as possible to the first portion of the higher-frequency spatial components of the second image.

In various aspects, the method further comprises treating a first portion of more detailed spatial components of the first image and the second image differently than a second portion of less detailed spatial components of the first image and the second image.

In various aspects, the method further comprises treating a first portion of more detailed spatial components of the first image and the second image differently than a second portion of less detailed spatial components of the first image and the second image by having the first portion of the more detailed spatial components of the first image placed as close together as possible to the first portion of the more detailed spatial components of the second image.

In various aspects, the method further comprises introducing a blanking interval for a portion of a non-zero switching time of a polarizer arranged to switch between the first image and the second image, depending on a brightness level of at least one pixel of at least one of the first image and the second image, wherein the blanking interval is introduced unless the brightness level is greater than a predetermined threshold brightness level.

In another aspect, a method of reducing stereoscopic phase-lag distortion under motion in a 3-dimensional video display comprises reducing a plurality of phase differences between a plurality of first images and a corresponding plurality of second images in a plurality of portions of a plurality of frame times of the 3-dimensional video display. The method also comprises redistributing respective pluralities of bit sequences comprising bit planes of at least portions of the plurality of the first images and the corresponding plurality of the second images by respective amounts arranged to effect the reduction of the plurality of the phase differences between the plurality of the first images and the corresponding plurality of the second images. The method also comprises displaying the redistributed respective pluralities of the bit sequences comprising the bit planes of the portions of the plurality of the first images and the corresponding plurality of the second images during the plurality of the frame times of the 3-dimensional video display.

In various aspects, the method further comprises using a thermometer scale.

In various aspects, the method further comprises using a front-weighted thermometer scale for the plurality of the second images and a back-weighted thermometer scale for the corresponding plurality of the first images.

In various aspects, the method further comprises reducing the plurality of the phase differences depending on a gray scale value being displayed.

In various aspects, the method further comprises treating a first portion of higher-frequency spatial components of the plurality of the first images and the corresponding plurality of the second images differently than a second portion of lower-frequency spatial components of the plurality of the first images and the corresponding plurality of the second images.

In various aspects, the method further comprises treating a first portion of higher-frequency spatial components of the plurality of the first images and the corresponding plurality of the second images differently than a second portion of lower-frequency spatial components of the plurality of the first images and the corresponding plurality of the second images by having the first portion of the higher-frequency spatial components of the plurality of the first images placed as close together as possible to the first portion of the higher-frequency spatial components of the corresponding plurality of the second images.

In various aspects, the method further comprises treating a first portion of more detailed spatial components of the plurality of the first images and the corresponding plurality of the second images differently than a second portion of less detailed spatial components of the plurality of the first images and the corresponding plurality of the second images.

In various aspects, the method further comprises treating a first portion of more detailed spatial components of the plurality of the first images and the corresponding plurality of the second images differently than a second portion of less detailed spatial components of the plurality of the first images and the corresponding plurality of the second images by having the first portion of the more detailed spatial components of the plurality of the first images placed as close together as possible to the first portion of the more detailed spatial components of the corresponding plurality of the second images.

In various aspects, the method further comprises treating a first portion of higher sub-band spatial components of the plurality of the first images and the corresponding plurality of the second images differently than a second portion of lower sub-band spatial components of the plurality of the first images and the corresponding plurality of the second images producing an apparent plurality of phase differences between the plurality of the first images and the corresponding plurality of the second images of substantially close to zero for substantially all of the plurality of the first images and the corresponding plurality of the second images.

In yet another aspect, a 3-dimensional video display system for reducing stereoscopic phase-lag distortion under motion is provided, the 3-dimensional video display system comprising a device arranged to reduce a phase difference between a first image and a second image in a portion of a frame time of the 3-dimensional video display, the device comprising a bit sequence redistributor arranged to redistribute respective bit sequences of at least portions of the first image and the second image by respective amounts arranged to effect the reduction of the phase difference between the first image and the second image and a spatial light modulator arranged to spatially modulate the redistributed respective bit sequences. The 3-dimensional video display system also comprises a display device arranged to display the spatially modulated redistributed respective bit sequences of the portions of the first image and the second image during the frame time of the 3-dimensional video display.

In accordance with the present disclosure, a device, a system, and a method useful for reducing stereoscopic phase-lag distortion under motion in a 3-dimensional video display are disclosed. In various aspects, a device in accordance with the present disclosure may comprise means for reducing stereoscopic phase-lag distortion and means for enabling the means for reducing the stereoscopic phase-lag distortion, both the means for reducing the stereoscopic phase-lag distortion and the means for enabling the means for reducing the stereoscopic phase-lag distortion covering corresponding structures and/or materials described herein and equivalents thereof.

In various other aspects, a system in accordance with the present disclosure may comprise means for reducing the stereoscopic phase-lag distortion, means for enabling the means for reducing the stereoscopic phase-lag distortion, and means for using the means for reducing the stereoscopic phase-lag distortion, all of the means for reducing the stereoscopic phase-lag distortion, the means for enabling the means for reducing the stereoscopic phase-lag distortion, and the means for using the means for reducing the stereoscopic phase-lag distortion covering corresponding structures and/or materials described herein and equivalents thereof. In yet various other aspects, a method in accordance with the present disclosure may comprise steps for reducing the stereoscopic phase-lag distortion and steps for enabling the steps for reducing the stereoscopic phase-lag distortion, both the steps for reducing the stereoscopic phase-lag distortion and the steps for enabling the steps for reducing the stereoscopic phase-lag distortion covering corresponding acts described herein and equivalents thereof.

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present claimed subject matter. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed is:

1. A method of reducing stereoscopic phase-lag distortion under motion in a display of 3-dimensional video images, the method comprising:
reducing a phase difference between a first image and a second image in a portion of a frame time of the display of the 3-dimensional video images, including:
using a redistributor, redistributing respective bit sequences of at least portions of the first image and the second image by respective amounts arranged to effect the reduction of the phase difference between the first image and the second image; and
displaying the redistributed respective bit sequences of the portions of the first image and the second image during the frame time of the display of the 3-dimensional video images.

2. The method of claim 1, wherein reducing the phase difference between the first image and the second image further comprises using a thermometer scale.

3. The method of claim 1, wherein reducing the phase difference between the first image and the second image further comprises using a front-weighted thermometer scale for the second image and a back-weighted thermometer scale for the first image.

4. The method of claim 1, wherein reducing the phase difference between the first image and the second image further comprises reducing the phase difference depending on a gray scale value being displayed.

5. The method of claim 1, wherein reducing the phase difference between the first image and the second image further comprises reducing an average phase difference to substantially less than about 90°, depending on a gray scale value being displayed.

6. The method of claim 1, wherein reducing the phase difference between the first image and the second image further comprises treating a first portion of higher-frequency spatial components of the first image and the second image differently than a second portion of lower-frequency spatial components of the first image and the second image.

7. The method of claim 1, wherein reducing the phase difference between the first image and the second image further comprises treating a first portion of higher-frequency spatial components of the first image and the second image differently than a second portion of lower-frequency spatial components of the first image and the second image by having the first portion of the higher-frequency spatial components of the first image placed as close together as possible to the first portion of the higher-frequency spatial components of the second image.

8. The method of claim 1, wherein reducing the phase difference between the first image and the second image further comprises treating a first portion of more detailed spatial components of the first image and the second image differently than a second portion of less detailed spatial components of the first image and the second image.

9. The method of claim 1, wherein reducing the phase difference between the first image and the second image further comprises treating a first portion of more detailed spatial components of the first image and the second image differently than a second portion of less detailed spatial components of the first image and the second image by having the first portion of the more detailed spatial components of the first image placed as close together as possible to the first portion of the more detailed spatial components of the second image.

10. The method of claim 1, wherein displaying the redistributed respective bit sequences of the portions of the first image and the second image further comprises introducing a blanking interval for a portion of a non-zero switching time of a polarizer arranged to switch between the first image and the second image, depending on a brightness level of at least one pixel of at least one of the first image and the second image, wherein the blanking interval is introduced unless the brightness level is greater than a predetermined threshold brightness level.

11. The method of claim 1, wherein:
reducing the phase difference comprises reducing a plurality of phase differences between a plurality of first images and a corresponding plurality of second images in a plurality of portions of a plurality of frame times of the display of the 3-dimensional video images;
redistributing the respective bit sequences comprises redistributing respective pluralities of bit sequences comprising bit planes of at least portions of the plurality of the first images and the corresponding plurality of the second images by respective amounts arranged to effect the reduction of the plurality of the phase differences between the plurality of the first images and the corresponding plurality of the second images; and
displaying the redistributed respective pluralities of the bit sequences comprises displaying the redistributed respective pluralities of the bit sequences comprising the bit planes of the portions of the plurality of the first images and the corresponding plurality of the second images during the plurality of the frame times of the display of the 3-dimensional video display.

12. The method of claim 1, wherein displaying the redistributed bit sequences comprises using a spatial light modulator to spatially modulate the redistributed respective bit sequences.

13. The method of claim 1, wherein using the spatial light modulator comprises loading the spatial light modulator to cause respective micro-mirrors to reflect or not reflect light from a light source.

14. A 3-dimensional video display system for reducing stereoscopic phase-lag distortion under motion, the 3-dimensional video display system comprising:

a device arranged to reduce a phase difference between a first image and a second image in a portion of a frame time of the 3-dimensional video display, the device comprising:
  a bit sequence redistributor arranged to redistribute respective bit sequences of at least portions of the first image and the second image by respective amounts arranged to effect the reduction of the phase difference between the first image and the second image; and
  a spatial light modulator arranged to spatially modulate the redistributed respective bit sequences; and
  a display device arranged to display the spatially modulated redistributed respective bit sequences of the portions of the first image and the second image during the frame time of the 3-dimensional video display.

15. The system of claim 14, wherein the device arranged to reduce the phase difference between the first image and the second image further comprises the device being arranged to use a thermometer scale.

16. The system of claim 14, wherein the device arranged to reduce the phase difference between the first image and the second image further comprises the device being arranged to use a front-weighted thermometer scale for the second image and a back-weighted thermometer scale for the first image.

17. The system of claim 14, wherein the device arranged to reduce the phase difference between the first image and the second image further comprises the device being arranged to reduce the phase difference depending on a gray scale value being displayed.

18. The system of claim 14, wherein the device arranged to reduce the phase difference between the first image and the second image further comprises the device being arranged to treat a first portion of higher-frequency spatial components of the first image and the second image differently than a second portion of lower-frequency spatial components of the first image and the second image.

19. The system of claim 14, wherein the device arranged to reduce the phase difference between the first image and the second image further comprises the device being arranged to treat a first portion of higher-frequency spatial components of the first image and the second image differently than a second portion of lower-frequency spatial components of the first image and the second image by having the first portion of the higher-frequency spatial components of the first image placed as close together as possible to the first portion of the higher-frequency spatial components of the second image.

20. The system of claim 14, wherein the device arranged to reduce the phase difference between the first image and the second image further comprises the device being arranged to treat a first portion of more detailed spatial components of the first image and the second image differently than a second portion of less detailed spatial components of the first image and the second image.

21. The system of claim 14, wherein the device arranged to reduce the phase difference between the first image and the second image further comprises the device being arranged to treat a first portion of more detailed spatial components of the first image and the second image differently than a second portion of less detailed spatial components of the first image and the second image by having the first portion of the more detailed spatial components of the first image placed as close together as possible to the first portion of the more detailed spatial components of the second image.

22. A computer-readable medium encoded with instructions that, when executed by a computer, perform a method for reducing stereoscopic phase-lag distortion under motion in a 3-dimensional video display, the method comprising:
  reducing a phase difference between a first image and a second image in a portion of a frame time of the 3-dimensional video display;
  redistributing respective bit sequences of at least portions of the first image and the second image by respective amounts arranged to effect the reduction of the phase difference between the first image and the second image; and
  displaying the redistributed respective bit sequences of the portions of the first image and the second image during the frame time of the 3-dimensional video display.

* * * * *